US 7,831,024 B2

(12) United States Patent
Metzler et al.

(10) Patent No.: US 7,831,024 B2
(45) Date of Patent: Nov. 9, 2010

(54) SLIT-SLAT COLLIMATION

(75) Inventors: Scott Metzler, Haddonfield, NJ (US); Roberto Accorsi, St. Davids, PA (US); Robert M. Lewitt, Stratford, NJ (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 88 days.

(21) Appl. No.: 12/293,422

(22) PCT Filed: Mar. 19, 2007

(86) PCT No.: PCT/US2007/006807

§ 371 (c)(1),
(2), (4) Date: Feb. 2, 2009

(87) PCT Pub. No.: WO2007/109227

PCT Pub. Date: Sep. 27, 2007

(65) Prior Publication Data

US 2009/0304150 A1     Dec. 10, 2009

Related U.S. Application Data

(60) Provisional application No. 60/783,077, filed on Mar. 17, 2006, provisional application No. 60/839,666, filed on Aug. 24, 2006.

(51) Int. Cl.
*G21K 1/04* (2006.01)

(52) U.S. Cl. .................. 378/150; 378/149; 250/363.1

(58) Field of Classification Search .............. 378/149, 378/150; 250/363.1
See application file for complete search history.

(56) References Cited

U.S. PATENT DOCUMENTS

| | | | | |
|---|---|---|---|---|
| 4,118,632 A * | 10/1978 | Luig | ................... | 250/363.1 |
| 4,340,818 A * | 7/1982 | Barnes | ................... | 378/155 |
| 4,584,478 A * | 4/1986 | Genna et al. | ........... | 250/363.04 |
| 5,099,134 A * | 3/1992 | Hase et al. | ............... | 250/505.1 |
| 5,459,320 A * | 10/1995 | Danet et al. | ........... | 250/363.04 |
| 6,353,227 B1 * | 3/2002 | Boxen | ................... | 250/363.1 |
| 6,552,349 B2 * | 4/2003 | Gagnon et al. | ........... | 250/363.1 |
| 6,762,413 B2 * | 7/2004 | Zeng | ................... | 250/363.1 |
| 6,795,529 B1 * | 9/2004 | Barnes et al. | ............... | 378/155 |
| 7,274,022 B2 * | 9/2007 | Soluri et al. | ............. | 250/363.1 |
| 7,491,941 B2 * | 2/2009 | Olden et al. | ............. | 250/363.1 |
| 7,498,582 B2 * | 3/2009 | Joung | ................... | 250/363.1 |
| 2003/0001098 A1 * | 1/2003 | Stoddart et al. | ........ | 250/363.04 |
| 2006/0000978 A1 * | 1/2006 | Engdahl et al. | .......... | 250/363.1 |

* cited by examiner

*Primary Examiner*—Edward J Glick
*Assistant Examiner*—Thomas R Artman
(74) *Attorney, Agent, or Firm*—Pearl Cohen Zedek Latzer, LLP; Mark S. Cohen

(57) ABSTRACT

This invention is directed to a collimator and collimation techniques. Specifically, the invention is directed to a collimator and method for collimation wherein the collimator combines the resolution and sensitivity properties of pinhole Single Photon Emission Computed Tomography (SPECT) imaging with the 2D complete-sampling properties of fan-beam collimators.

60 Claims, 55 Drawing Sheets

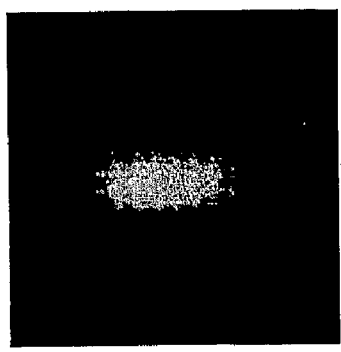
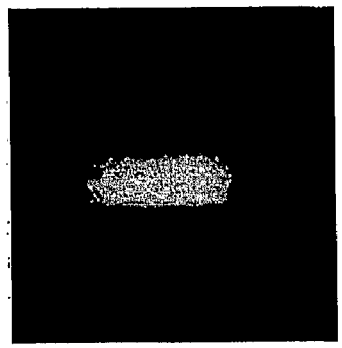
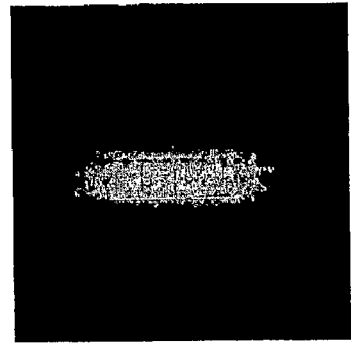
Figure 54a     Figure 54b     Figure 54c
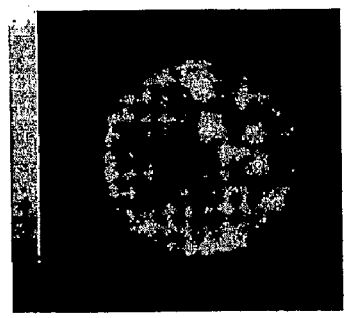
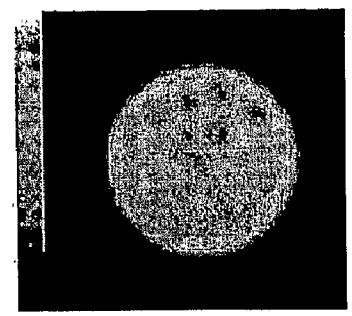
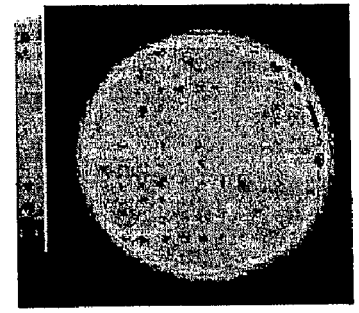
Figure 54d     Figure 54e     Figure 54f
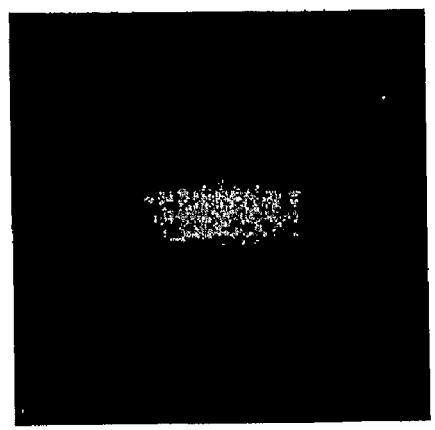
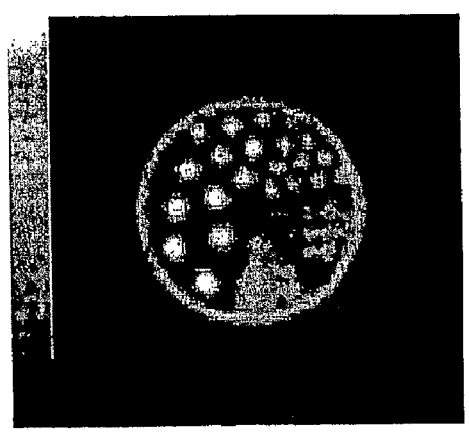
Figure 55a            Figure 55b

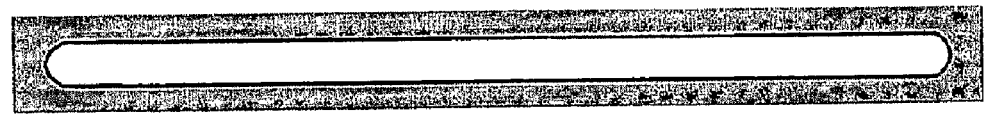
Figure 65
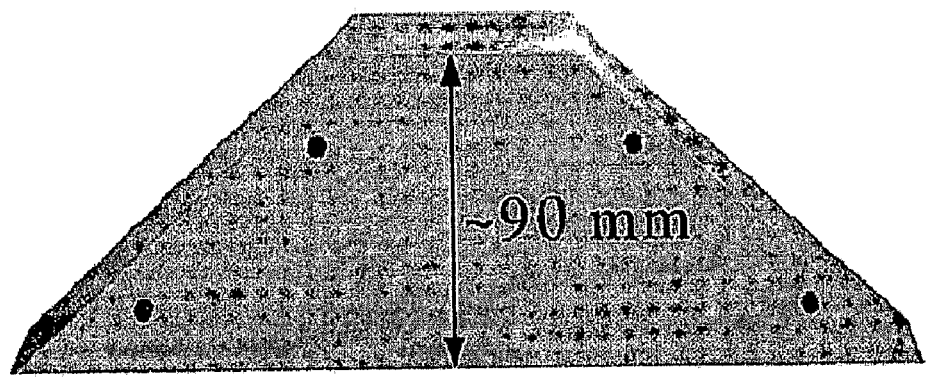
Figure 66
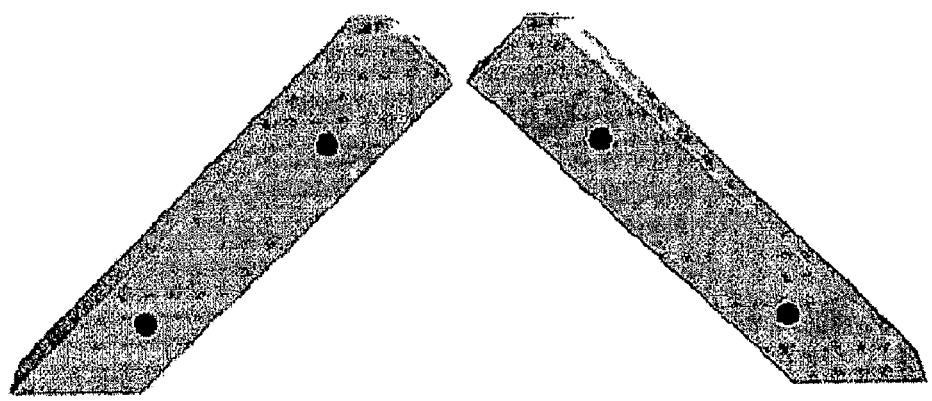
Figure 67

SLIT-SLAT COLLIMATION

CROSS-REFERENCE TO RELATED APPLICATIONS

This application is a National Phase Application of PCT International Application No. PCT/US07/06807, International Filing Date Mar. 19, 2007, claiming priority of U.S. Provisional Patent Applications, 60/783,077, filed Mar. 17, 2006 and US Provisional Patent Applications, 60/839,666, filed Aug. 24, 2006, all which are incorporated herein by reference in their entirety.

FIELD OF INVENTION

This invention is directed to a collimator and collimation techniques. Specifically, the invention is directed to a collimator and method for collimation wherein the collimator combines the resolution and sensitivity properties of pinhole Single Photon Emission Computed Tomography (SPECT) imaging with the 2D complete-sampling properties of fan-beam collimators.

BACKGROUND OF THE INVENTION

Single Photon Emission Computed Tomography (SPECT) is a nuclear-medicine imaging modality capable of providing 3D maps of in vivo radiopharmaceutical distributions. It is very similar to conventional nuclear medicine planar imaging, but in SPECT a gamma ray camera is used. In the same way that a plain X-ray is a 2-dimensional (2D) view of a 3-dimensional (3D) structure, the image obtained by a gamma ray camera is a 2D view of the 3D distribution of a radionuclide. An important objective in nuclear medicine is to make SPECT more useful by utilizing and improving its quantitative capabilities. The availability of SPECT is well established. The cost-effectiveness of SPECT as a diagnostic imaging modality is demonstrated by the large number of installed systems worldwide. SPECT is an important clinical imaging modality and research tool, not only in the United States, but throughout the world. Consequently, the qualitative and quantitative improvement of SPECT has great clinical and research significance.

SPECT imaging is performed by using a gamma camera to acquire multiple 2-D images (projections), from multiple angles. SPECT scans typically are performed on general-purpose instruments with a collimator made of dense material such as lead. The collimator restricts the photons from the radioactive decay to come from certain lines of sight. A single view records photons for a period of time while the camera is motionless. The camera is then rotated by a few degrees and a second projection is recorded. From a large set (~120) of projections, the 3D distribution of the radiolabeled pharmaceutical can be reconstructed through computer algorithms.

SPECT has many pharmaceuticals that are useful for imaging function of various organs. For example, cardiac imaging is performed to assess left ventricular function with gated radionuclide ventriculography, and to evaluate myocardial perfusion with agents such as thallium-201 and Tc-99m labeled compounds (Sestamibi, Tetrofosmin); I-123 labeled MIBG has been used as a method for measuring cardiac sympathetic innervation. Also, Biscisate, Sestamibi, HMPAO, IMP, and ECD can be used with SPECT for visualizing cerebral blood perfusion. TRODAT and other compounds are useful for imaging dopamine receptors for differential diagnosis of Parkinson's disease. Amyloid plaque imaging is used in the diagnosis of Alzheimer's disease. Tc-99m-labeled Sestamibi is also used to image breast cancer. Limb imaging is used for sarcoma, osteomyelitis (infection), and stress fractures.

A collimator is a device that filters a stream of photons so that only those traveling parallel to a specified direction are allowed through. Collimators are used in SPECT imaging because it is currently not possible to focus radiation with such short wavelengths into an image through the use of lenses as is routine with electromagnetic radiation at optical or near-optical wavelengths.

Without a collimator, rays from all directions would be recorded by the gamma ray camera; for example, gamma rays from the top of a specimen to be imaged may travel in both upward and downward directions. Thus, the image of the top of the specimen may be recorded at both the top and bottom of the gamma ray detector. Such an effect would occur for all parts of the specimen, resulting in an image so blurred and indistinct as to be useless.

When a collimator made of lead or other materials that absorb instead of pass gamma ray radiation is used, only gamma rays that are traveling nearly parallel to the openings in the collimator pass through the collimator to the gamma ray camera. Any other gamma rays are absorbed by hitting the collimator surface or the sides of an opening. This ensures that only gamma rays perpendicular to the gamma ray camera are recorded. In other words, gamma rays from the top of a specimen can only pass through the top of the collimator, thus ensuring that a clear image is produced.

Although collimators improve the resolution of the recorded image by blocking incoming radiation that would result in a blurred image, by necessity they also reduce the intensity (sensitivity) of the recorded image. In fact, most lead collimators let less than 1% of incident gamma rays through to the gamma ray camera.

The choice of collimator is a key decision in the quality of the resulting reconstruction. There are multiple types of existing collimators: parallel-beam, fan-beam, cone-beam, pin-hole, and some other custom collimators. These collimators determine the trade-off between sensitivity (the number of recorded photons), the resolution (how well the line of a particular photon from the specimen to the gamma ray camera is known) and the field of view (the maximum size of the object to be imaged). Within a collimator family (e.g., parallel-beam), trade-offs are also possible, such as using longer lead holes to get better resolution at the cost of reduced sensitivity.

Cone-beam collimation has its best resolution near the collimator and its best sensitivity near the focal spot (i.e., far from the detector). Analogously, fan-beam has its best resolution near the collimator and its best sensitivity near the focal line. Fan beam collimation also offers the advantage of 2D complete-sampling using a circular orbit. However, the magnification is smaller, resulting in worse resolution. Although, single-pinhole collimation typically cannot offer 2D complete-sampling using a circular orbit, it has both its best resolution and sensitivity near the focal spot (aperture). Thus, single-pinhole is most advantageous when a small Radius of Rotation (ROR) may be achieved.

Thus, it is highly desirable to blend these techniques to create a collimator with more favorable characteristics for some imaging scenarios. In particular, it is highly desirable to develop a new collimator and collimation technique that combines the resolution and sensitivity properties of pinhole Single Photon Emission Computed Tomography (SPECT) imaging with the 2D complete-sampling properties of fan-beam collimation. Briefly, the possible advantages over single-pinhole SPECT for clinical use are: (i) increased sensitivity; (ii) improved complete-sampling properties; (iii) easier scan setup; and (iv) faster reconstruction times. The primary advantage over fan-beam is improved resolution and/or sensitivity.

Such an inventive collimator and collimation technique is herein referred to as a slit-slat collimator and a slit-slat collimation technique. When multiple slits are employed, such an inventive collimator and collimation technique is herein referred to as a multislit-slat collimator and a multislit-slat collimation technique

SUMMARY OF THE INVENTION

In one embodiment, provided herein is a slit-slat collimator including a collimator frame having a frusto-pyramidal housing disposed thereon, the frusto-pyramidal housing having a rectangular base, a rectangular top and open sides defined by a trapezoidal shape, wherein the housing provides lead shielding. The collimator may further include a plurality of axial septa. The collimator may further include a plurality of spacers. The collimator may further include a means for alignably stacking the axial septa and the spacers. The collimator may further include an adjustable aperture plate mounted on the rectangular top including at least one adjustable aperture members.

In one embodiment, provided herein is a slit-slat collimator including a collimator frame having a frusto-pyramidal housing disposed thereon, the frusto-pyramidal housing having a rectangular base, a rectangular top and open sides defined by a trapezoidal shape, wherein the housing provides lead shielding. The collimator may further include an aperture forming unit selected from the group consisting of a pair of symmetric aperture forming members, an axial septum or both. The collimator may further include a means for alignably stacking the aperture forming unit. The collimator may further include an adjustable aperture plate mounted on the rectangular top comprising at least one aperture forming unit.

In another embodiment provided here in is a method of collimating electromagnetic radiation including the steps of selecting a particular electromagnetic radiation for collimation, the radiation output from a specimen of interest. The method may further include positioning a detector of the particular radiation in a location useful for gathering information about the specimen and associated with the particular radiation. The method may further include using a slit-slat collimator including a collimator frame having a frusto-pyramidal housing disposed thereon, the frusto-pyramidal housing having a rectangular base, a rectangular top and open sides defined by a trapezoidal shape, wherein the housing provides lead shielding. The collimator may further include a plurality of axial septa. The collimator may further include a plurality of spacers. The collimator may further include a means for alignably stacking the axial septa and the spacers. The collimator may further include an adjustable aperture plate mounted on the rectangular top including at least one adjustable aperture members. The method may further include adjusting the aperture plate to adjust collimation aperture.

In another embodiment provided here in is an imaging system including an electromagnetic radiation point source. The imaging system may further include a detector panel having an array of detector elements disposed thereon. The imaging system may further include a slit-slat collimator including a collimator frame having a frusto-pyramidal housing disposed thereon, the frusto-pyramidal housing having a rectangular base, a rectangular top and open sides defined by a trapezoidal shape, wherein the housing provides lead shielding. The collimator may further include a plurality of axial septa. The collimator may further include a plurality of spacers. The collimator may further include a means for alignably stacking the axial septa and the spacers. The collimator may further include an adjustable aperture plate mounted on the rectangular top including at least one adjustable aperture members.

BRIEF DESCRIPTION OF THE DRAWINGS

FIG. 54a shows a projection for w=3.0 mm. The phantom is a micro hot-rod.

FIG. 54b shows a projection for w=3.0 mm. The phantom is a micro cold-rod.

FIG. 54c shows a projection for w=3.0 mm. The phantom is a mini cold-rod.

FIG. 54d shows a reconstruction for w=3.0 mm. The phantom is a micro hot-rod.

FIG. 54e shows a reconstruction for w=3.0 mm. The phantom is a micro cold-rod.

FIG. 54f shows a reconstruction for w=3.0 mm. The phantom is a mini cold-rod.

FIG. 55a shows a projection for w=1.0 mm. This is a micro hot-rod phantom.

FIG. 55b shows a reconstruction for w=1.0 mm. This is a micro hot-rod phantom.

FIG. 65 shows a conceptual diagram of an aperture plate with pinholes (top) and a conceptual drawing of a slit aperture (bottom).

FIG. 66 shows axial septa that are trapezoidal and less than 1 mm thick. The height of the trapezoid is determined through simulations (90 mm is given to set an approximate scale). The four clearance holes allow the interchangeable pieces to be stacked and held together with rods.

FIG. 67 shows two symmetric pieces used to form an aperture. The clearance holes match those in FIG. 66 so that they can be stacked to form an alternating septa-aperture unit as in FIG. 68.

DETAILED DESCRIPTION OF THE INVENTION

Brief Description of an Embodiment of Slit-Slat Collimation

Figure 1:
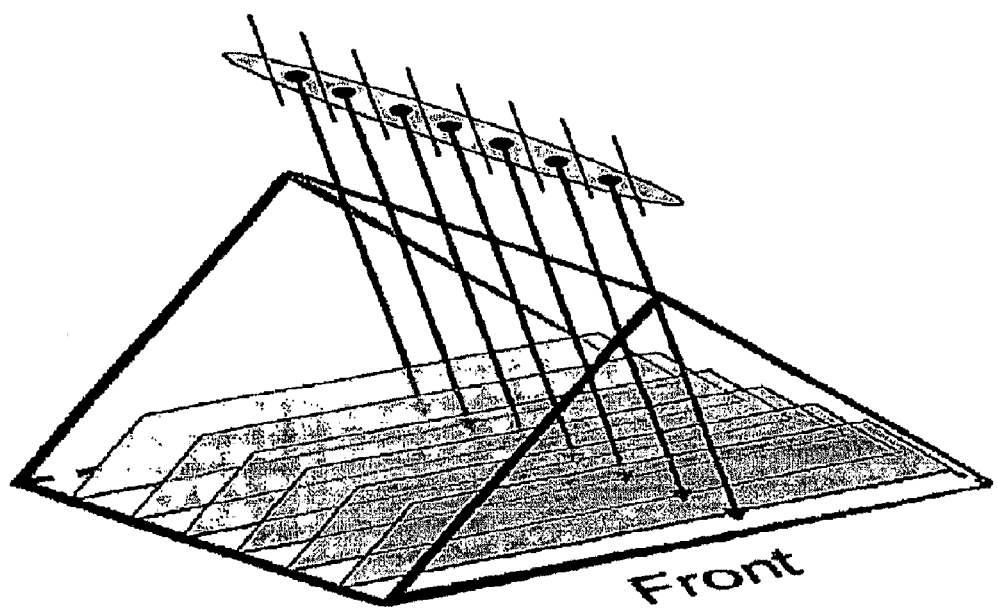
FIG. 1 shows a Perspective conceptual drawing of a slit-slat collimator. Axial slices are separated by septa (slats); each axial slice of the object maps to an axial slice of the detector. Transaxially, the collimator is similar to a single-pinhole.

In one embodiment slit-slat collimation behaves like pinhole collimation in the transverse directions, but septa spaced axially are used to restrict incoming photons so that only in-plane photons are accepted. FIG. 1 shows a schematic diagram of an embodiment of such a collimator. Since photons are restricted by the axial septa to come from their axial slice of origination, the imaging properties have similarities with fan-beam collimation: there is a focal line (where the apertures are located) and each detector slice is translationally invariant (i.e., the collimator can be translated axially and still produce the same projection). On the other hand, there is still transaxial magnification to improve resolution.

Comparison of Collimation Techniques

Cone-beam collimation focuses to a point. This gives larger magnifications and sensitivity than fan-beam, but at the cost of axial field of view. By analogy, an embodiment of slit-slat collimation, when compared with single-pinhole, has a larger axial field of view and completely sampled data at the cost of axial magnification and reduced sensitivity in the central transverse plane. A possible disadvantage of an embodiment of slit-slat collimation is that axial resolution may be compromised, but this may be overcome with long axial septa.

In an embodiment of slit-slat collimation has its best resolution and sensitivity near the focal line. Thus, when a small radius of rotation (ROR) may be achieved, single-pinhole and slit-slat collimation offer improved resolution and sensitivity when compared with cone-beam and fan-beam collimation.

Figure 2:
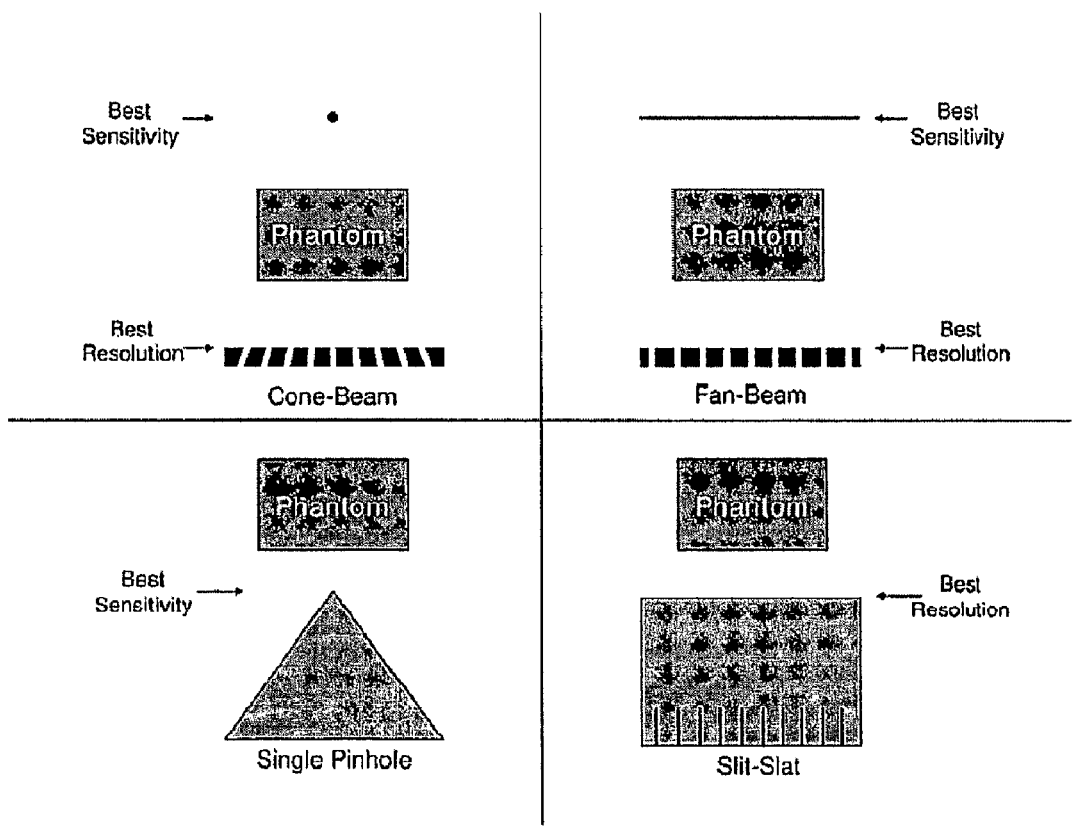
FIG. 2 shows an axial comparison of cone-beam and fan-beam collimation (top), which have virtual focusing to a point and line, respectively, with single-pinhole and slit-slat (bottom), which have their focus at the aperture. The best sensitivity for cone-beam and fan-beam occur at the focal point and focal line, respectively, whereas the best resolution is near the collimator. That is, for cone-beam and fan-beam collimation the best sensitivity and resolution occur at locations approximately 40-50 cm apart. On the other hand, for single-pinhole and slit-slat, both the best sensitivity and best resolution occur at the focal point (i.e., the aperture).
Figure 3:
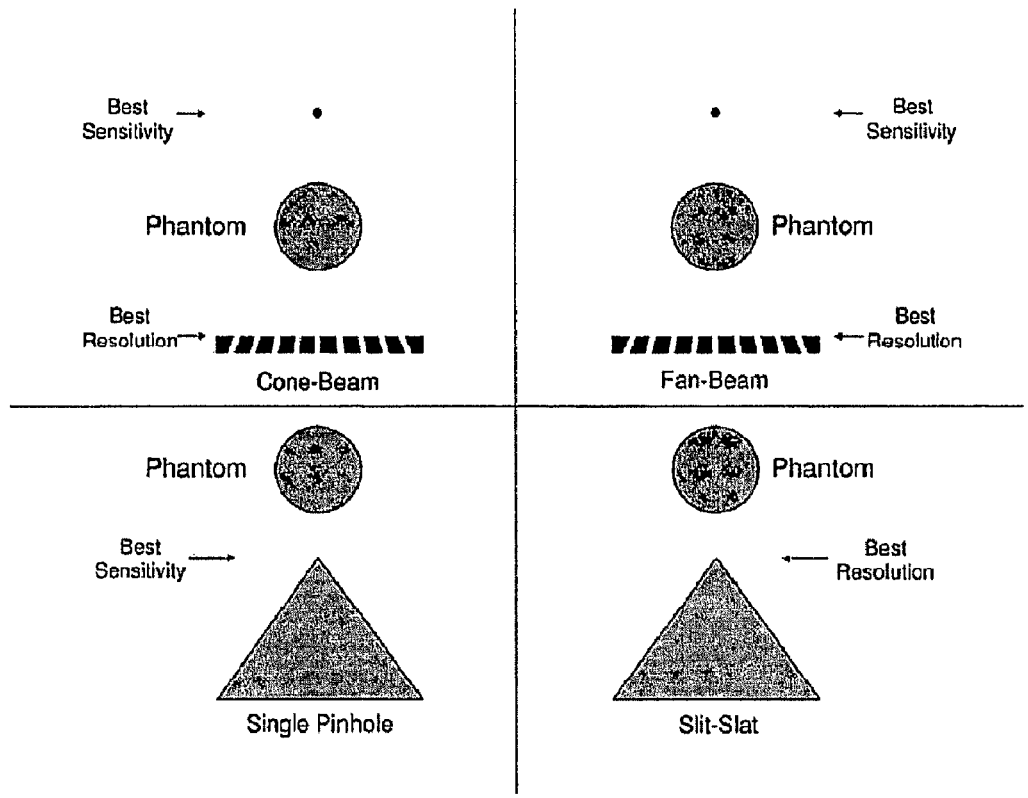
FIG. 3 shows a transaxial comparison of cone-beam and fan-beam collimation (top) with single-pinhole and slit-slat (bottom). The locations of the best resolution and sensitivity are indicated. Unlike FIG. 2, this figure shows that in the transaxial direction cone-beam and fan-beam are very similar and single-pinhole and slit-slat are very similar. The AOR is into the page.

FIG. 2 shows a view of cone-beam, fan-beam, single-pinhole, and an embodiment of slit-slat along the axis of rotation. In this view one can distinguish cone-beam from fan-beam and single-pinhole from slit-slat since the collimation on the left has a focal point and the collimation on the right has a focal line. FIG. 3 shows a transaxial slice. The left and right columns look the same in this view. In both views, one can see a cylindrical object of interest (e.g., a phantom, brain, small animal).

As compared to fan-beam and single-pinhole collimation, an embodiment of slit-slat collimation offers (i) due to the similar magnification geometry, high resolution in transverse planes; (ii) as for a pinhole, high sensitivity at points close to the slit; and (iii) when the slats are parallel, extended axial field of view as for a fan-beam collimator, which also has the advantage of complete sampling, but comes at the price of a loss in axial resolution. This loss is due to the lack of axial magnification and the distance from the detector necessary to achieve high magnification in the transverse direction. Literature approaches for recovering axial resolution have been proposed and involve shifting axially the imager by half a slat pitch and applying resolution recovery techniques during reconstruction.

In many ways, an embodiment of slit-slat collimation is similar to fan-beam with a short focal length. However, there are substantial difficulties with fabricating fan-beams and cone-beams with short focal lengths, despite potentially large gains in brain imaging. For both foil collimators and cast collimators, the hole lengths at the edge become too long, which result in manufacturing problems that are very formidable to overcome. For example, if one uses pins to cast a collimator, the standard pins that are used for clinical collimators are not long enough to span the distance between the photo-etched plates that are used to support and locate the pins. Also, with casting methods the angle and length of the pins may make them susceptible to bending/breaking due to the forces from the lead's contraction. Thus, hole angulation may be compromised. For short focal length foil collimators, the specialized molds that are required are very difficult and expensive to make. There may also be a large variation in the septal thicknesses between the front and back of the hole. The lead foil must be markedly distorted in order to maintain parallel collimation in the axial direction while simultaneously being highly convergent in the transaxial direction. Again, accurate hole angulation may be difficult to achieve.

Clinical Applications and Significance

The following sub-sections describe how slit-slat collimation may be used as the appropriate collimation for any imaging scenario, taking advantage of slit-slat's high sensitivity and good resolution for small ROR.

Cardiac Imaging

The data shows that an embodiment of multislit-slat offers higher sensitivity for the same resolution for cardiac scans compared with both parallel-beam and fan-beam. In one embodiment, cardiac imaging is performed with truncated projection data, but the cardiac region is completely sampled. Since the heart is displaced from the center of the body, in such an embodiment multislit-slat can get near the heart for a typical left posterior oblique (LPO) to right anterior oblique (RAO) (i.e., a 180 degree) scan. In addition to the sensitivity advantage, in such an embodiment, multislit-slat has an advantage in sampling completeness over fan-beam since LPO to RAO completely samples the cardiac region for slit-slat, but not for fan-beam. Since just over half of all nuclear medicine scans are cardiac (8.0 million of 15.8 million in 2004; Society of Nuclear Medicine), improvements in cardiac imaging could have a large clinical impact.

Brain Imaging

The data shows that an embodiment of slit-slat offers higher sensitivity and/or resolution than fan-beam for objects up to about 27 cm in diameter. In addition, in many ways, one embodiment of slit-slat imaging has similarities to a short focal length fan-beam or cone-beam, shown in simulation to make a large improvement in brain imaging, but without the aforementioned fabrication difficulties.

Breast Imaging

An embodiment of slit-slat collimation may be a good choice for imaging prone patients with a general-purpose SPECT scanner, where the long axis of the patient is parallel with the scanner's axis of rotation (AOR). The breast may be centered on the AOR so that a small radius of rotation may be achieved. In such an embodiment, complete sampling or nearly complete sampling may be achieved with a partial circular orbit for one gamma camera, roughly from the sternum to the axilla. In such an embodiment, sensitivity and/or resolution is improved compared to fan-beam and parallel-beam collimation since a small ROR may be achieved. In another embodiment, the slit-slat collimator may be complemented with a fan-beam collimator on a different camera head in order to improve sampling and sensitivity; this second head would rotate behind the patient.

Limb Imaging

In another embodiment, limbs are imaged for sarcoma, osteomyelitis, and stress fractures. In such an embodiment very small RORs may be achieved.

Pediatric Imaging

Pediatric imaging covers a large range of patient sizes from newborns to young adults. For many imaging situations, the patients are very young and in one embodiment a small ROR may be achieved. In these scenarios, an embodiment of slit-slat collimation is likely to be a better choice than fan-beam or parallel-beam. Two common pediatric scans are ictal/interictal epilepsy and renal DMSA, both of which are cold-spot imaging, which particularly benefits from no multiplexing.

Animal Imaging

An embodiment of slit-slat is likely to be a good choice for mid-size animals such as rabbits and baboons. Such an embodiment may also be a good choice for whole-body small-animal imaging.

Complete Sampling

Complete sampling is a critical criterion for SPECT. It is a basic premise of this application that quantitative SPECT requires artifact-free reconstructions, which may be obtained only if the volume is completely sampled. SPECT is based on sampling line integrals of activity concentration through a three-dimensional object. The line integrals have the effect of projecting a three-dimensional (x,y,z) object onto a two-dimensional (bin,slice) detector. By measuring the line integrals from several different vantage angles, the third dimension may be recovered, if the object is completely sampled.

Necessary and sufficient conditions for reconstruction from projection sampling have been developed by S. S. Orlov (Theory of three dimensional reconstruction. I. Conditions for a complete set of projections. Soviet Physics Crystallography, 1975. 20(3): p. 312-314) for electron microscopy and by both H. Tuy and B. Smith for cone-beam SPECT (An inversion formula for cone-beam reconstruction. SIAM Journal on Applied Mathematics, 1983. 43(3): p. 546-552 and Image reconstruction from cone beam projections: Necessary and sufficient conditions and reconstruction methods. IEEE Transactions on Medical Imaging, 1985. MI-4(1); p. 14-25). Orlov's condition requires that the entire completely sampled volume be seen by the same set of view angles (e.g., untruncated, parallel-beam collimation). As part of the work in understanding sampling issues, it has been recently shown that these two geometric conditions are related allowing Tuy's condition to be re-written in the language of Orlov (see Metzler, S. D., J. E. Bowsher and R. J. Jaszczak: Geometrical similarities of the Orlov and Tuy sampling criteria and a numerical algorithm for assessing sampling completeness. IEEE Transactions on Nuclear Science, 2003. 50(5): p. 1550-1555).

Tuy's condition indicates that a circular orbit of a single-pinhole aperture completely samples only the plane of the aperture. Incomplete sampling leads to artifacts in reconstruction. Orlov's and Tuy's sampling criteria apply to 3D imaging scenarios in which arbitrary orbits are used. The criterion is much simpler in the case of the slit-slat collimator where each axial slice can be thought of as essentially independent (from a sampling point of view, although the point-spread function may span several axial slices due to resolution). For the proposed collimation with untruncated projections, all points (from all imaged slices) that remain in the field of view for a circular scan (i.e., the common volume [75]) are completely sampled. Truncated projections can lead to complete projection data within a region of interest, even if the whole body is not completely sampled. This is particularly relevant to reconstruction of cardiac scans

Helical Orbit Pinhole SPECT

Helical orbits have been used (R21/33-EB-1543) as one method to address the sampling completeness issues in pinhole SPECT. It has been found that this has worked well for small animals since it allows complete sampling while obtaining good resolution and sensitivity because of a small ROR. Although this works well in a laboratory setting for small animals, there may be some difficulties in translating this work to human imaging. First, the existing system uses an external robotic stage to translate the mouse precisely along the axis of rotation. SPECT scanner beds, even for those capable of translation during a scan, are not aligned as well (they are typically "eye-balled"). Second, the system requires greater user intervention in choosing the appropriate helical parameters (e.g., starting position, stage speed/pitch, etc). Third, the reconstruction takes a significant amount of time due to thorough modeling of the point-spread function and the inherent 3D inversion problem (the system cannot be considered as several 2D problems, because of substantial mixing of axial slices). Although these issues are acceptable—and preferable in some cases for small animals (e.g., using a single pinhole gives very good resolution and the stage allows careful positioning)—they make direct translation of helical pinhole SPECT as a common clinical modality difficult. On the other hand, slit-slat imaging does not require axial translation during the scan and allows the reconstruction to be factored into multiple nearly-2D problems (with some overlap due to resolution).

An embodiment of slit-slat collimation is not intended to be a dedicated system, unlike SPRINT, HEADTOME, Linoview, MarC-SPECT, and CardiAre. Instead, an embodiment of slit-slat uses replaceable collimation on a general-purpose clinical scanner, unlike the six systems. Since an embodiment of a slit-slat collimator is mounted on radially adjustable heads, the ROR of the system can be adjusted to specific imaging scenarios, unlike SPRINT, HEADTOME, and the GE system; MarC-SPECT and CardiArc have some, but limited, adjustability since the path of the slits is fixed relative to the scanner, but the position of the patient has some flexibility. In comparison with SPRINT, MarC-SPECT, CardiArc, and the GE system, the choice of collimation mounted on rotating instead of stationary detectors has the potential advantage of having multiple collimation in one embodiment such as an embodiment of slit-slat combined with fan-beam and/or single pinhole. In comparison with Linoview and the GE system, in one embodiment it is intended for mid-size to large objects, whereas those systems are intended for small animals.

Comparison with Multi-Pinhole SPECT

Several groups are developing multi-pinhole SPECT. Multi-pinhole aperture plates are typically constructed by fabricating several single pinholes as a group. The choice of size and position can potentially lead to improved performance. The additional pinholes give improved overall sensitivity and provide views of different parts of the object. In the above cases, all of which are oriented at small-animal imaging exclusively, projections of the object mix axial slices leading to fully 3D reconstructions.

One embodiment of the slit-slat collimator proposed is, in some sense, a specific type of multi-pinhole collimation where the pinholes are aligned axially (i.e., in the direction of the axis of rotation (AOR)). However, pinhole projections are separated by axial septa to create nearly independent axial slices (as one has for fan-beam collimation). With this pinhole arrangement combined with axial septa, which prevent multiplexing, the complete-sampling properties are emphasized to improve reconstruction performance and usability for clinical settings and some animal-imaging scenarios. An embodiment of the slit-slat collimator, although useful for small-animal imaging, is oriented towards larger objects, especially human imaging. In addition, the use of axial septa makes the imaging scenario 2D (except for overlap due to detector and septa resolution), which makes the reconstruction problem simpler and faster since only nearby axial slices need to be considered. Lastly, in one embodiment slit-slat's septa prevent multiplexing, which is common in multi-pinhole imaging; thus, slit-slat may be used in planar studies.

Quantitative Single Photon Emission Computed Tomography

Like all nuclear medicine imaging techniques (including planar conjugate counting), SPECT quantification is influenced by several factors. The most important factors that limit 3D quantification include: 1) scatter and non-uniform attenuation; 2) geometric collimator/camera response; 3) object size and motion; 4) statistical uncertainties resulting from low count density studies; 5) accurate mechanical and electronic alignment; 6) complete sampling; and 7) characteristics of the reconstruction algorithm. By carefully understanding and accounting for the major factors, SPECT is useful in determining volumes, uptake ratios, concentrations, and total activities. Many investigators, including us, believe the physical characteristics of the SPECT acquisition process must be carefully modeled and effectively incorporated into the reconstruction algorithm.

Addressing Issues Affecting an Embodiment of Slit-Slat SPECT

The following quantification factors are addressed: (2) geometric collimator/camera response; (5) accurate mechanical and electronic alignment; and (6) complete sampling. The other four issues previously mentioned are addressed briefly below.

Compensation for Scatter and Non-Uniform Attenuation

Developing attenuation and scatter compensation techniques is not an aim of this research. However, it is a requirement, in some circumstances, to have attenuation and scatter compensation in order to achieve quantitatively accurate reconstructions. Scatter and attenuation is discussed further below.

Object Size and Motion

This imaging technique is applicable to both human (adult and pediatric) down to small-animal imaging, where the emphasis is on translating what was learned from helical pinhole imaging of small animals (R33-EB-1543) to a technique that is applicable to larger animals (e.g., rabbits, monkeys and sheep) and humans. In one embodiment, slit-slat imaging is most appropriate when a circular orbit with a small radius of rotation may be achieved (e.g., brain, breast, limb, pediatric, and animal), or when the collimator remains close to the region of interest for a partial orbit, such as cardiac.

Both humans and animals may move during data acquisition. These movements may be periodic (e.g., breathing, heart motion) or they may be non-periodic (e.g., limb movement, sagging). Gating can be used to compensate for periodic motion. In addition, four dimensional (4D) techniques are being developed to compensate for non-periodic motion. The problem of motion is beyond the scope of this application. Statically positioned phantoms are used instead. The size of the phantoms matches the intended human imaging targets. In the longer term, this technique may aid dynamic imaging studies since it has higher sensitivity and can offer several complete sets of data per revolution.

Statistical Uncertainties

Statistical uncertainties may be reduced by (1) increasing the available photon counts by increasing the overall sensitivity and by using long scan times; and (2) using iterative algorithms that incorporate statistical uncertainties. Working versions of this code exist already. An additional consideration is the setup of the scan to increase sensitivity. For example, embodiments of slit-slat collimators have high sensitivity when the object-to-aperture distance is small. Thus, as small an ROR as is reasonably achievable is used.

Characteristics of the Reconstruction Algorithm

In one embodiment, iterative reconstruction is used. There are several reasons for using iterative techniques for this project: (1) accurate modeling of the collimator response; (2) accurate modeling of the detector response; (3) accurate modeling of statistical processes; (4) ready inclusion of attenuation compensation; and (5) greater flexibility in scatter-compensation techniques.

Choice of Isotope

In one embodiment, slit-slat collimation is largely independent of isotope. Tc-99m is used primarily because of its availability and cost effectiveness. It is also a common isotope for clinical studies. In addition, I-123 and I-131 may be used on occasion, which are also used in clinical studies because of the relatively easy process of labeling molecules with iodine. These three isotopes have different primary energies and different half lives. The difference in photon energy affects three different parameters in the kernel modeling: aperture penetration, detector depth-of-interaction effect, and detector resolution. Each of these effects are modeled with its own energy-dependent parameter. The different half lives are easily compensated in reconstruction.

Design Considerations for an Embodiment of the Collimator

Collimator Frame

In one embodiment, the collimator frame (FIG. 40) provides lead shielding and mounts for the aperture plate (10) and axial septa (30). The frame itself is bolted to a detector head on the scanner. The frame has a rectangular bottom face (50), which mounts to the detector. There is also a "gable" (45) that extends from the "base" to where the aperture plate is mounted. The gable is the primary determinant of the collimator's focal length since the aperture plates are small.

The design of the focal length considers the following: (i) detector dimensions; (ii) largest field of view desired; (iii) aperture diameter, which determines geometric resolution; (iv) magnification; (v) parallax (depth of interaction effect) and (vi) detector intrinsic resolution which is a component in the object-plane resolution. Optimizations suggest that a likely focal length for this collimator is about 7-12 cm so that it may be used for several different scenarios. As the focal length gets smaller, the field of view gets larger since the magnification is reduced, assuming that the acceptance angle is adjusted (increased) simultaneously; a larger acceptance angle increases the effect of parallax, but reduces the ROR required to avoid truncation. In addition, a shorter focal length combined with a large detector, such as that of the Siemens Symbia T, allows the use of multiple slits, which increase sensitivity. A further advantage is that shorter septa yield the same axial resolution because the detector is closer to the patient. On the other hand, larger magnification helps overcome the effect of intrinsic detector resolution in the transaxial direction.

A mechanism has been developed to mount replaceable axial septa. By using replaceable septa, experiments may be performed to test pitch, thickness, and height, in addition to testing predictions without septa. The mechanism provides enough strength to limit shifting and twisting during scans.

Axial Septa for In-Plane Imaging

In one embodiment, axial septa are used in conjunction with an aperture plate to provide axial and transaxial collimation, respectively. The septa limit overlap from one slice to the next. Anger's geometric resolution formula, applied in the axial direction, gives an estimate of resolution. The formula is:

$$R_g = d(a+b+c)/a_e \quad \text{(EQ. 1)}$$

where d is the distance between slats, a is the slat height, $a_e$ is the effective slat height considering penetration, b is the distance from the top of the slats to the object, and c is the distance from the detector to the slats. From FIG. 23, it is clear that the distance a+b+c is the distance from the detector to the object (source); this distance is constant regardless of the position of the septa. If the focal length is determined by transaxial magnification issues, the distance from the detector to the point source is fixed. Therefore, the collimator's ratio of d/a should be adjusted to obtain the desired axial resolution, taking into account detector blurring. The on-axis geometric sensitivity for slit-slat may be factored as:

$$g = \left(\frac{w}{4\pi h}\right)\left(\frac{d}{a}\right)\left(\frac{d}{d+t}\right) \quad \text{(EQ. 2)}$$

where w is the slit width, h is the distance from the point to the slit, and t is the slat thickness. Since the first and second terms are fixed for a given point in space and resolution, sensitivity is maximized by maximizing the term d/(d+t), which can be interpreted as the open fraction of slats (i.e., the gap between slats divided by the period of the slats). The largest sensitivity for fixed t is obtained by maximizing d. To maintain resolution, a is scaled proportionally (i.e., d/a is fixed). Thus, the current understanding is that maximum sensitivity for a given resolution is achieved by using tall slats, which is limited by the focal length of the aperture slit, with a relatively large gap between them. All parameter choices may be validated through simulation.

Adjustable Aperture Plate

In one embodiment, the aperture, plates mount to the top, of the collimator frame. By having a replaceable plate, different geometric configurations may be studied. For example, it is possible to have plates of fixed or variable geometric parameters. In addition, it is possible to have plates that have the central slit in the same plane as the side slits and a different plate that has offset planes. It is economical to have several plates fabricated since no other part of the collimator needs to be adjusted.

In another embodiment, the aperture plate will contain the pinholes aligned axially, termed "multi-pinhole" aperture plate (FIG. 65, top).

In another embodiment, the aperture plate will contain an axial slit (FIG. 65, bottom). This aperture plate is fabricated by forming a "knife-edge" that runs axially. This shape is complemented by the axial septa so that there will be little overlap from one slice to the next. One possible advantage of this shape is increased sensitivity without loss of transaxial resolution since the transaxial resolution is determined by the transaxial shape of the aperture plate. If the photons are limited to their plane of origination by the septa, then the slit also causes no further loss in axial resolution.

Design

Figure 40:
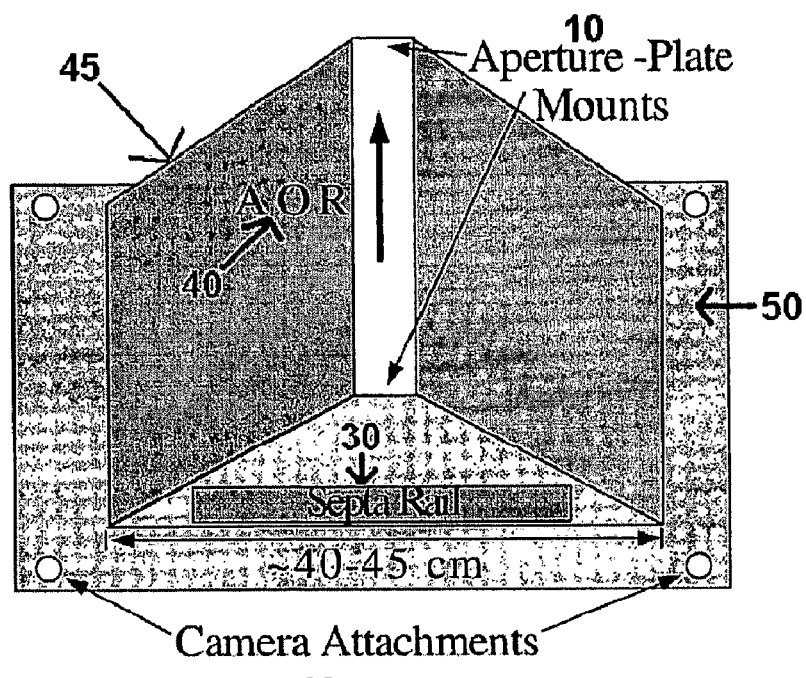
FIG. 40 shows conceptual design of the prototype collimator frame, which is fabricated using lead sheet, with a likely thickness of ⅜" (1 cm). The base plate (50) bolts to the gamma camera through clearance holes (20). A "gable" (45)—coming out of the page—is used to mount the aperture plate. The aperture plate mounts to the top (10). A rail (30) may be inserted towards the bottom for axial septa; alternatively, they may be attached near the aperture plate. The direction of the axis of rotation (AOR) is indicated (40).

A design has been developed that considers the concepts discussed above. In one embodiment, a collimator frame, similar to that in FIG. 40 is used. This prototype is used on the Picker Prism 3000 XP. The design has been refined to have separate septa and slits, each of which is adjustable.

Figure 41:
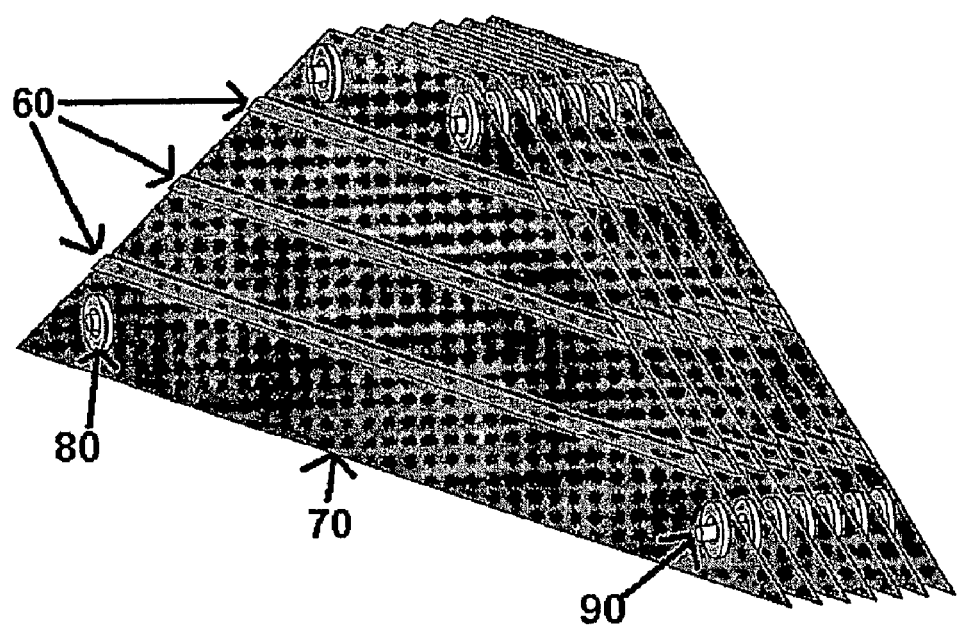
FIG. 41 shows a stack of axial slats. The slats (70) in this design are held together with four rods (90). The rods have spacers (80) to accurately control the slat pitch. There are also three Rohacell strips (60) running transaxially to keep the slats straight.

In one embodiment, the axial septa are stacked on support rods (FIG. 41), similar to what was done for the data. In one embodiment, the rods hold the tungsten septa separated by spacers; it is possible to use different spacers to obtain different configurations. In addition, in one embodiment the septa have several narrow strips of Rohacell between them to keep the septa straight, a problem encountered acquiring the data. However, the Rohacell cannot completely fill the gap between the septa because the attenuation over the length of the slats would be substantial ($\mu \approx 0.025$ cm$^{-1}$ for Tc-99m, measured experimentally by Dr. Jaszczak). Techniques using tension to hold the septa straight, which will alleviate the need for the narrow Rohacell strips are also investigated.

Figure 42:
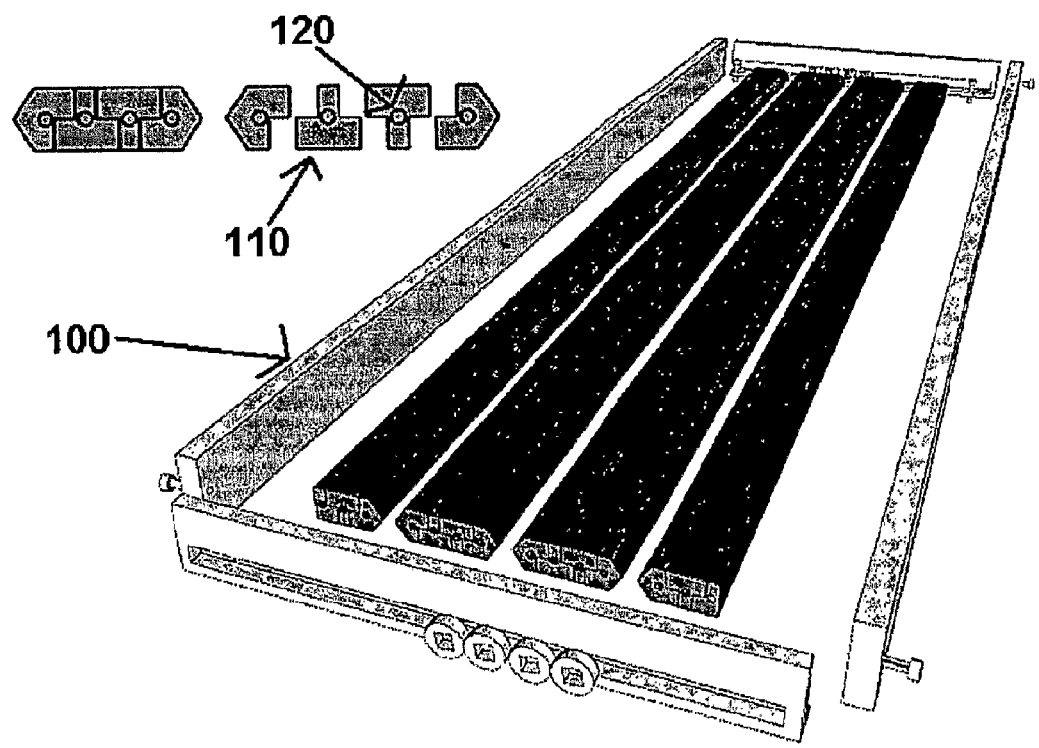
FIG. 42 shows a slit assembly. An aluminum frame (100) holds "T"-shaped lead pieces (110) that form the axial slits. Single or multiple slits can be formed and the slit widths and spacing may be adjusted. A view along the axis of rotation is shown in the upper left. The exploded view shows the individual pieces. The "T" pieces may be about 1 cm thick, similar to the pinhole apertures in the lab. They may have threaded inserts (120) in the ends so that screws may hold them securely in the frame. The frame is slightly oversized so that all bolts and gaps in the assembly are well shielded by the housing.
Figure 43A:
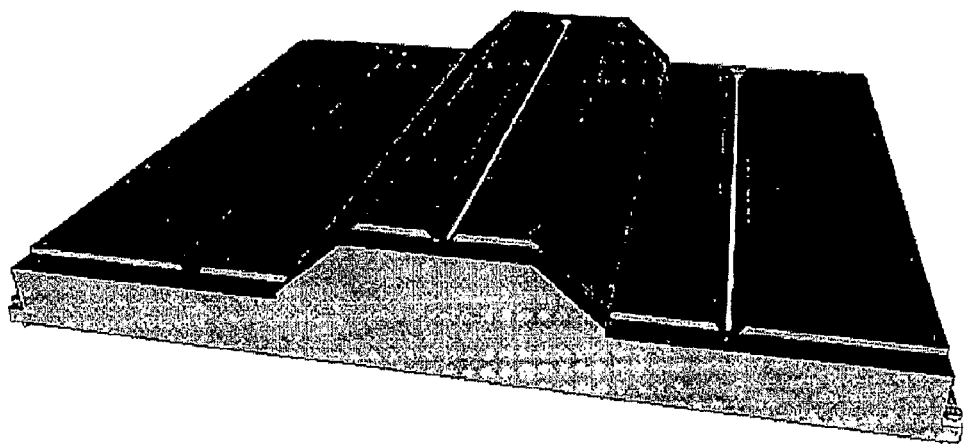
FIG. 43a shows a potential aperture plate with a raised center slit, which will give reduced magnification for the side slits, so that they will not truncate. Solid plates can also form focused slits.
Figure 43B:
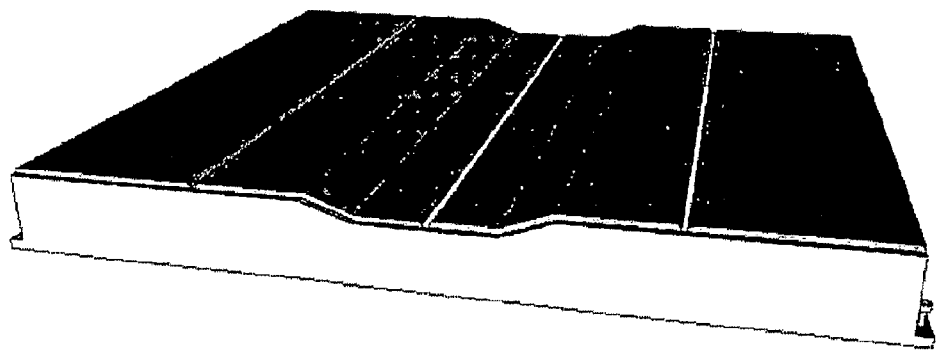
FIG. 43b shows a potential aperture plate with body-contouring plate; the side slits are elevated to get closer to the body. Solid plates can also form focused slits.
Figure 43C:
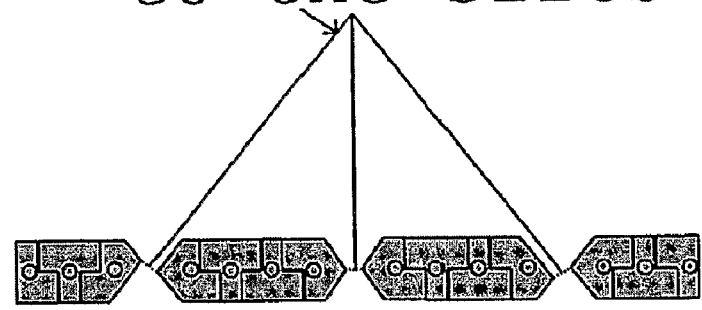
FIG. 43c shows a potential aperture plate with focused apertures with "T" pieces. Solid plates can also form focused slits.

In one embodiment, the prototype aperture plate uses interchangeable and adjustable lead or tungsten "T" pieces (FIG. 42). The "T" pieces can be adjusted to give different slit widths and slit spacings. In addition, in one embodiment this plate can accommodate both single-slit and multislit configurations. In one embodiment, the plate can also be removed to try alternative configurations. For example, FIG. 43a shows a configuration where the central slit is elevated, which may be useful to obtain three untruncated projections of the object. FIG. 43b shows a configuration that elevates the side slits, which may be useful to follow the contour of the object, which could improve sensitivity and resolution. FIG. 43c shows a variation in the "T" pieces that allows focused aperture slits. Solid lead plates in a shape similar to that formed by the individual "T" pieces may also be used, as shown in FIG. 42 (upper left).

In one embodiment for the septa, tungsten is used. In one embodiment, the aperture "T" pieces are made of lead; tungsten may be used for the knife-edge aperture pieces to improve durability and attenuation. In one embodiment, the frame is also made of lead. In one embodiment, the collimator's mass is roughly 50 kg for the Prism 3000 XP and 75 kg for the Siemens scanner, both of which are well less than the maximum weights of other collimators for these scanners.

Figure 68:
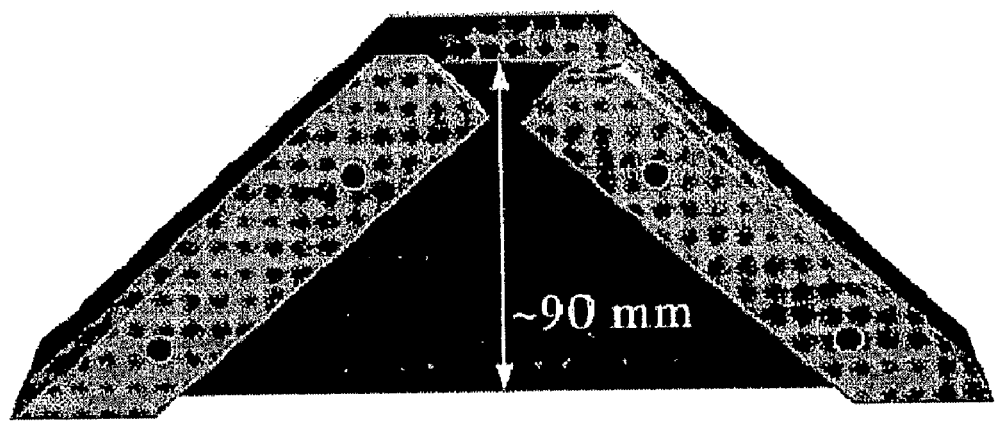
FIG. 68 shows aperture pieces with septa to form a unit. Many units will be stacked together using rods to form the aperture plate. The height of 90 mm is an estimate.

In another embodiment, the axial septa have a trapezoidal shape (FIG. 66). The apertures are constructed out of two symmetric (in fact, identical) pieces, as in FIG. 67. The aperture pieces are mated with the septa as in FIG. 68 to form a unit. The unit is repeated many times on the stack to form the aperture plate.

In another embodiment, the use of interchangeable pieces provides a great deal of flexibility in configuration. For example, it is possible to make the repeated unit two septa followed by two apertures. In other words, make the septa twice as thick and the aperture twice as long as the basic one-and-one configuration. It is also be possible to make the unit two aperture pieces and one septum. That would result in an aperture that is twice as long, but the septa would be the same as compared to the basic unit. Another configuration of interest would be to stack many aperture pieces together without the septa. That would result in an axial slit as in FIG. 65, bottom.

Figure 69:
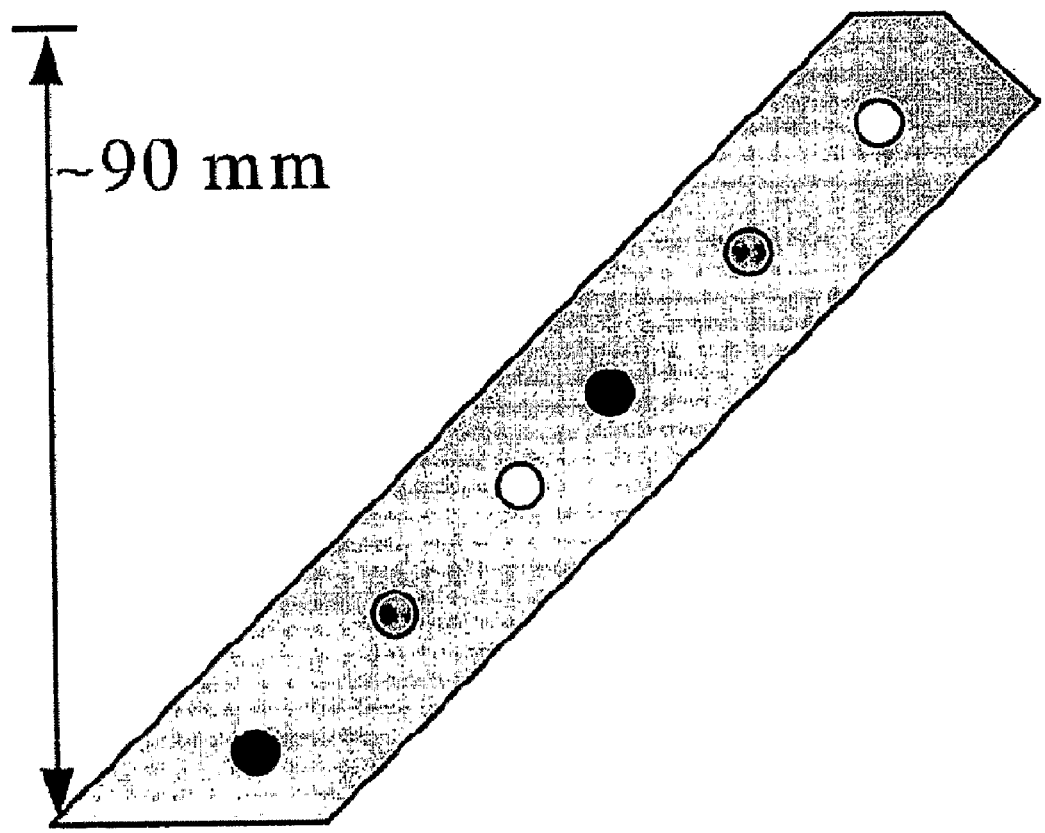
FIG. 69 shows a conceptual drawing of an aperture piece with multiple holes to allow for adjustable "width". Three pairs (black, gray, and white) of holes are shown. It is imagined that the septal pieces would also have corresponding pairs because the desired aperture sizes (e.g. 1, 2, 3 mm) would require the holes to be close to each other for just one pair. The height of 90 mm is an estimate.

In another embodiment, a further consideration in designing these interchangeable pieces is to have an adjustable aperture. That can be accomplished by having a suitable set of holes drilled in the aperture and septa pieces. FIG. 69 shows how different aperture diameters (since it is really one dimensional, a better term may be widths) can be set using a single interchangeable piece by having multiple alignment holes. In addition, a design is considered that allows for continuously adjustable aperture slits.

In another embodiment, one weakness in designing the above pieces is that small axial gaps may exist between pieces. Methods are considered to alleviate this potential problem. For example, one could fabricate the pieces so that there is an axial step (i.e., a labyrinth) somewhere in each piece. However, this could greatly add to the difficulty of construction. On the other hand, one could design a top or bottom cover to reduce this problem, if it exists. Another possibility would be to split the pieces so that there is a top and a bottom. One could then offset the tops and bottoms by half of a piece thickness to remove the gap. This last solution would double the number of pieces, but each would be straightforward to make.

Adjusting the Collimator and Orbit for Each Scan

Figure 44:
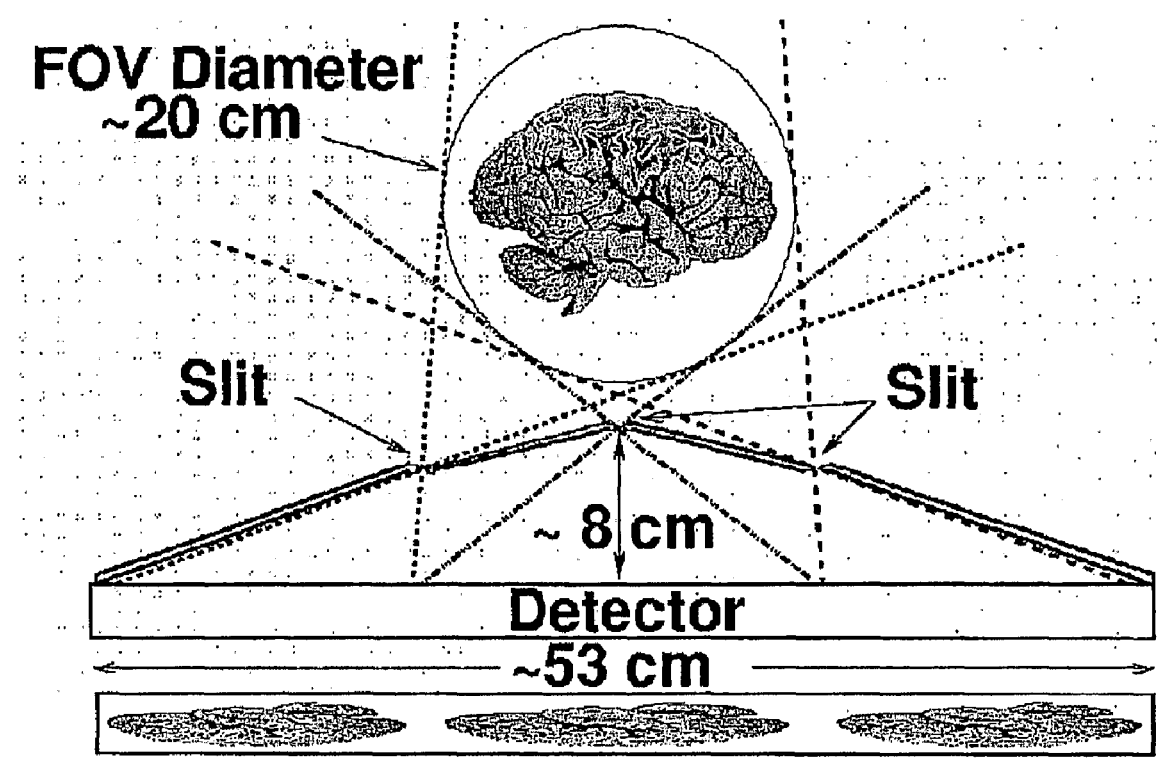
FIG. 44 shows a conceptual drawing of a multislit aperture. The radius of rotation is adjusted to fill the central portion of the detector. The spacing between the central slit and the side slits is adjusted to control the field of view (FOV). The side slits may also be tilted towards the center of the FOV. The lines indicate the FOV of each aperture slit. Three images of the object are shown on bottom.

In one embodiment, the radius of rotation of the collimator may be adjusted to fill the central section of the detector without truncating the object (FIG. 44). In one embodiment, the other two slits are displaced transaxially from the central slit. In the clinical case above, in one embodiment the slit displacement is pre-determined as indicated by research. A goal of the research and development is to gain experience and perform calculations to determine the optimal position of the additional slits. Please note that the side slits may truncate the object, depending on the configuration (e.g., FIGS. 43a, 43b, and 43c); despite this, complete data are obtained from the central slit. Also, the optimization for the multislit determines the position that maximizes average sensitivity and maintains the same resolution. In one embodiment, this resolution is maintained by using the same slit width, focal length, and aperture orientation. This orientation is such that the slit plane is parallel to the detector plane, just as for the central slit. However, it may be better to orient the slit towards the center of the object. Thus, the results present a lower bound on how multislit performs relative to fan-beam since this degree of freedom has not yet been explored. Further, in one embodiment tilting the slits may alleviate a potential problem with multislit: eliminating overlap of the projections from each side slit with that of the central projection. By tilting the side slits, the projection of the detector is moved; this is because a different portion of the object is projected through the aperture. Physical intuition would suggest that the best choice for imaging would be to point the aperture plane towards the center of the object, but this needs validation. Alternatives include adjusting the side slits' locations or narrowing their acceptance angles, either symmetrically or asymmetrically.

Development of Analytic and Numerical Formulas for Sensitivity and PSF

Accurate models of the sensitivity and PSF are important for good resolution and quantification in the reconstruction. To develop accurate models of the geometric and penetrative components of sensitivity and the PSF, analytic calculations are used, based on the calculated path length of a photon through attenuating material: $\Delta L$. Numerical models are also developed. Lastly, experimental results are an important validation of the analytical and numerical models.

Determination of Sensitivity and PSF for Axial Slit

An analytic form is determined for sensitivity and PSF when an axial slit, complemented by axial septa, is used for collimation; this geometry is equivalent to the Design, which uses interchangeable pieces. $\Delta L$ of the aperture is determined. From this, the sensitivity and PSF is determined analytically. The accuracy of this model can be tested through numerical and experimental methods. For the experimental methods, the axial septa are removed to test the slit component of the sensitivity and PSF. The effect of axial septa on sensitivity and PSF is then included by applying techniques developed in the above section.

Analytic geometry methods are used to determine $\Delta L$, as was done for the calculation of $\Delta L$ for single-pinhole collimation. Cylindrical coordinates are used to match the symmetry of the problem. The calculation of sensitivity due to penetration in Metzler, S. D., J. E. Bowsher, K. L. Greer and R. J. Jaszczak (Analytic determination of the pinhole collimator's point-spread function and RMS resolution with penetration. IEEE Transactions on Medical Imaging, 2002. 21(8): p. 878-887) for a point source a perpendicular distance h from the aperture plane was:

$$\text{sensitivity} = \frac{\sin^3\theta}{4\pi h^2} \int_0^{2\pi} d\beta \int_{d/2}^\infty d\rho \rho e^{-\mu \Delta L} \quad \text{(EQ. 3)}$$

where $\theta$ is the incidence angle of the photon (see Metzler et al. "Pinhole collimator's point-spread function" for more details), $\mu$ is the linear attenuation coefficient, and d is the diameter of the aperture. The integral over $\beta$ and $\rho$ are for the polar coordinates of the photon's intersection with the aperture plane. The trigonometric term $\sin^3\theta$ can be replaced using rectangular coordinates x and z for the position of the point source relative to the aperture. Note that the distance in the y direction is h. Then, EQ. 3 can be written as:

$$\text{sensitivity} = \frac{h}{4\pi[h^2 + x^2 + z^2]^{3/2}} \int_0^{2\pi} d\beta \int_{d/2}^\infty d\rho \rho e^{-\mu \Delta L} \quad \text{(EQ. 4)}$$

Since the point source is always in the axial plane of the aperture (i.e., z=0), it is likely that the initial calculation is:

$$\text{sensitivity} = \frac{h}{2\pi[h^2 + x^2]^{3/2}} \int_{-s/2}^{s/2} dz \int_{d/2}^{\infty} dx\, e^{-\mu\Delta L} \quad (EQ. 5)$$

where the integral over z represents the axial septa, scaled to the aperture plane, and the integral over x is in the transverse direction. Due to the symmetry about the x axis, only the positive branch is integrated and the term in front has been multiplied by a factor of 2.

Once the appropriate form for ΔL has been determined, the PSF is given by EQ. 73 for the case of untilted (unfocused) slits. The appropriate modifications are made for the focused case, as has been done for focused pinholes.

Effect of Axial Septa

In one embodiment, the axial septa reduces sensitivity (compared with the case of an axial slit in the same locations without septa) at the same time that they limit the photons' axial spread. However, it is hypothesized that this is a worthwhile tradeoff since the information quality of each photon increases (i.e., the axial slice of origin is known better). By counter example, if the only goal were to detect as many photons as possible, collimators would not be used in SPECT. The reason the information contained in each photon improves is that axial overlap is greatly reduced.

Figure 45:
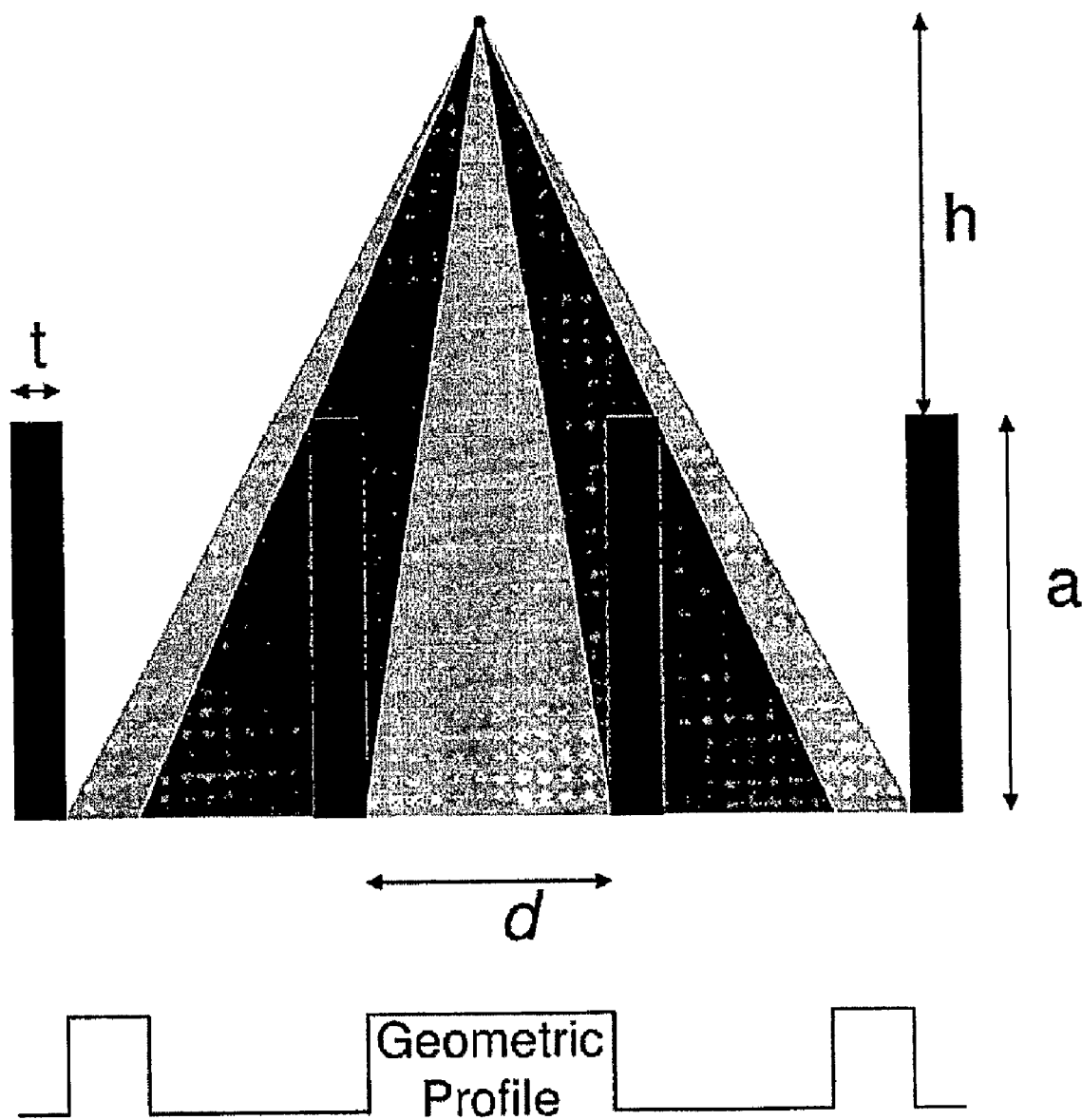
FIG. 45 shows the effect of axial septa on point-source projection. The source is a distance h above the septa, which have height a and thickness t. The light-shaded regions are geometrically allowed; dark-shaded are not. The geometric profile at the bottom of the septa is shown.

The impact of the septa depends on the detailed design. However, FIG. 45 shows a simple model of the geometric PSF for a point source centered between two septa. This figure shows the case where the point is sufficiently close to the septa that only the central slice (i.e., directly below the source) and the two adjacent slices allow geometric photons. Of course, penetration increases the counts in adjacent slices. As the source moves further from the septa, a larger percentage of photons are detected in slices other than the central slice; this results in increasing (worsening) resolution, as predicted by EQ. 1. However, as the septal height and thickness increase the axial resolution improves, at the cost of sensitivity.

Figure 23:
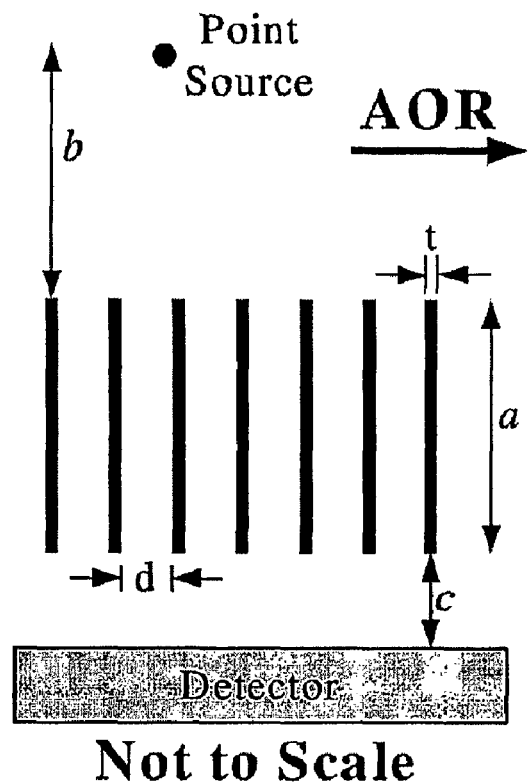
FIG. 23 shows axial septa with thickness t and height a. The distance between septa is d. The distances from the septa to the source and detector are b and c, respectively. The source-to-detector distance is a+b+c. The direction of the AOR is indicated.
Figure 24:
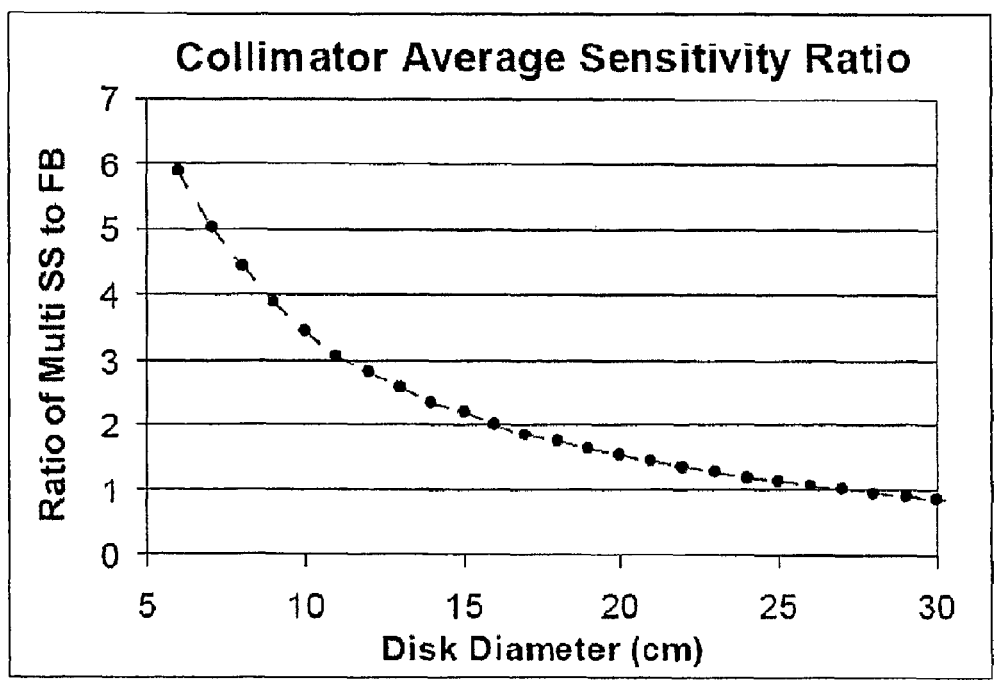
FIG. 24 shows the ratio of the sensitivity of multislit-slat to fan-beam as a function of disk diameter. The average resolutions are matched. This uses the data from FIGS. 21a-21c, but presents it as a ratio on a linear scale.

The effect of the septa is analytically and numerically modeled, including the penetrative term, on the sensitivity and PSF, so that the prototype is designed with sufficient flexibility to increase the septal height (a in FIGS. 23 and 45). These quantities are calculated, averaging over point-source position relative to the septa. However, below, the variation of the sensitivity and PSF on large and small scales is measured.

Calculation of Effective Diameters

Based on the total ΔL (i.e., aperture and axial septa), the appropriate formulas for the resolution- and sensitivity-effective diameters are calculated following the procedures outlined in Accorsi, R. and S. D. Metzler: (Analytic determination of the resolution-equivalent effective diameter of a pinhole collimator. IEEE Transactions on Medical Imaging, 2004. 23(6): p. 750-763). In summary, when the path lengths of photons through attenuating material give attenuation factors of k, the PSF is reduced to k times its maximum: $e^{-\mu\Delta L} = k$. For example, if k=0.5, the half maximum is determined, leading to the calculation of full width at half maximum. Hence, the resolution-effective diameter that gives the full width at half maximum of the PSF may be calculated.

Figure 46:
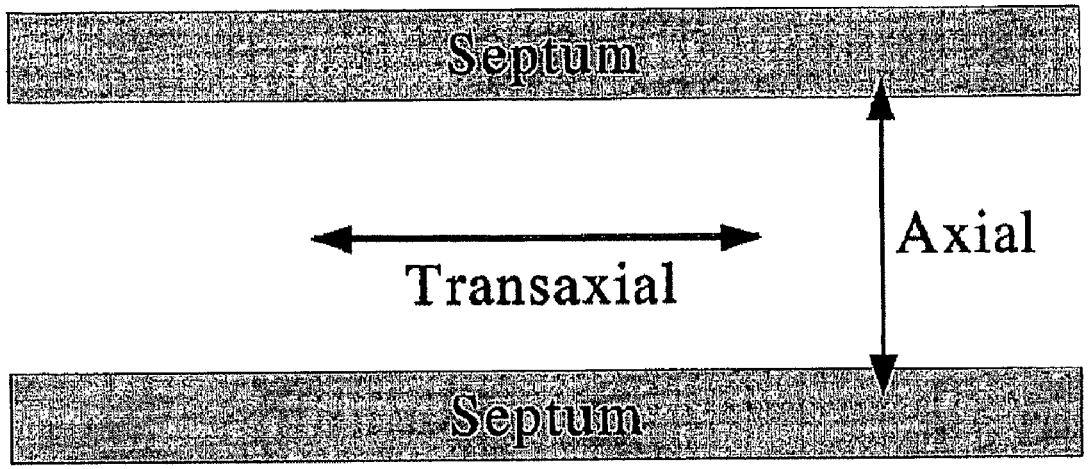
FIG. 46 shows the PSF/effective diameter in the axial direction will be determined by the septa. The spread in the transaxial direction will be determined by the aperture plate.

The data shows that there are two directions of interest for single-pinhole. These directions were along the tilt axis (i.e., the axis used to measure θ) and the axis in the aperture plane perpendicular to this axis. This bifurcation leads to a non-isotropic PSF (i.e., it is not circular even though the aperture is circular). It is expected in this slit-slat case that there are also two directions of interest: axial and transaxial (FIG. 46). The effective diameters in each direction are calculated by constraining ΔL to be along that direction.

It is expected that the calculation of the effective diameters yields insight to the collimation properties of the aperture and septa. This is useful for designing appropriate configurations.

Numerical Methods

Ray-tracing methods are used to calculate the sensitivity and PSF numerically. Geometry-modeling software has been developed. A specific model for the slit-slat aperture, including axial septa has been developed. This model is used to determine the attenuation path length so that the appropriate weighting factor may be applied to each simulated photon. This is how the sensitivity and PSF for single-pinhole collimation were calculated.

These numerical results are an important cross-check for validating the analytic formulas. Further, it is possible to turn on and off features of the model (e.g., axial septa) to determine their effects on the calculations. Additionally, a geometry model has been recently developed for slit-slat in the framework of the GEANT4 simulation package.

Comparison with Experimental Results

Experimental results are an important validation tool. The sensitivity and PSF are measured as described below. In addition, the measurements are repeated without the axial septa in place as further validation of the numerical model, where septa can be turned off, and the first-pass analytic model described above. In addition, different size aperture slits and different photon energies (i.e., isotopes) are used in order to measure the dependence on the geometrical as well as the penetrative parameters.

Development of Iterative Reconstruction Software

Maximum-Likelihood Estimation-Maximization (MLEM) with Appropriate Choice of Probability Weights The mathematical formalism of iterative statistical reconstruction represents the orbits and collimator/camera configurations through a system of linear equations:

$$M_i(\vec{\lambda}) = b_i + \sum_{j=1}^{nvox} P_{ij}\lambda_j \quad (EQ. 6)$$

where $M_i$ is the expected number of photons detected at projection bin i, $\lambda_j$ is the expected number of photons emitted from voxel j, $P_{ij}$ is the probability that a photon emitted from voxel j is detected at bin i, and $b_i$ is the expected number of background photons detected at bin i from processes not modeled in $P_{ij}$, such as scatter. Noise in the projection data is well described as Poisson, so a log-likelihood function is defined as:

$$l(\vec{\lambda}) = \sum_{i=1}^{nbin} -M_i + y_i \ln M_i \quad (EQ. 7)$$

where $y_i$ is the measured number of photons detected at bin i. One of the iterative statistical reconstruction methods utilized is the widely employed ordered subsets expectation maximization (OSEM) algorithm, which updates the image to increase $l(\vec{\lambda})$ on each iteration (an increase is not guaranteed but almost always results in practice), and which is typically run for several iterations until an acceptable trade-off is obtained between noise and resolution.

Iterative pinhole reconstruction software has already been developed. The software uses "kernels" to model the point-response (including aperture penetration, detector parallax, and detector resolution) and sensitivity. For each reconstruction voxel, the response of each detector bin near the expected center of a voxel's projection is pre-calculated according to the models and formulas described above. In addition, parallax and Gaussian resolution are numerically convolved. Further, the software allows for any generic orbit to be used and for joint reconstruction of multiple collimator types. This existing reconstruction software is the basis (i.e., starting point) for the new slit-slat reconstruction program described below.

Determination of Attenuation Map

The effect of attenuation is small when using micro phantoms. This is true with pinhole imaging, where compensation in reconstruction is not used. The effects are larger when scanning larger phantoms, and must be compensated for accurate quantification. The inherently co-registered CT image from the Symbia T SPECT/CT scanner is used for attenuation map.

Figure 47:
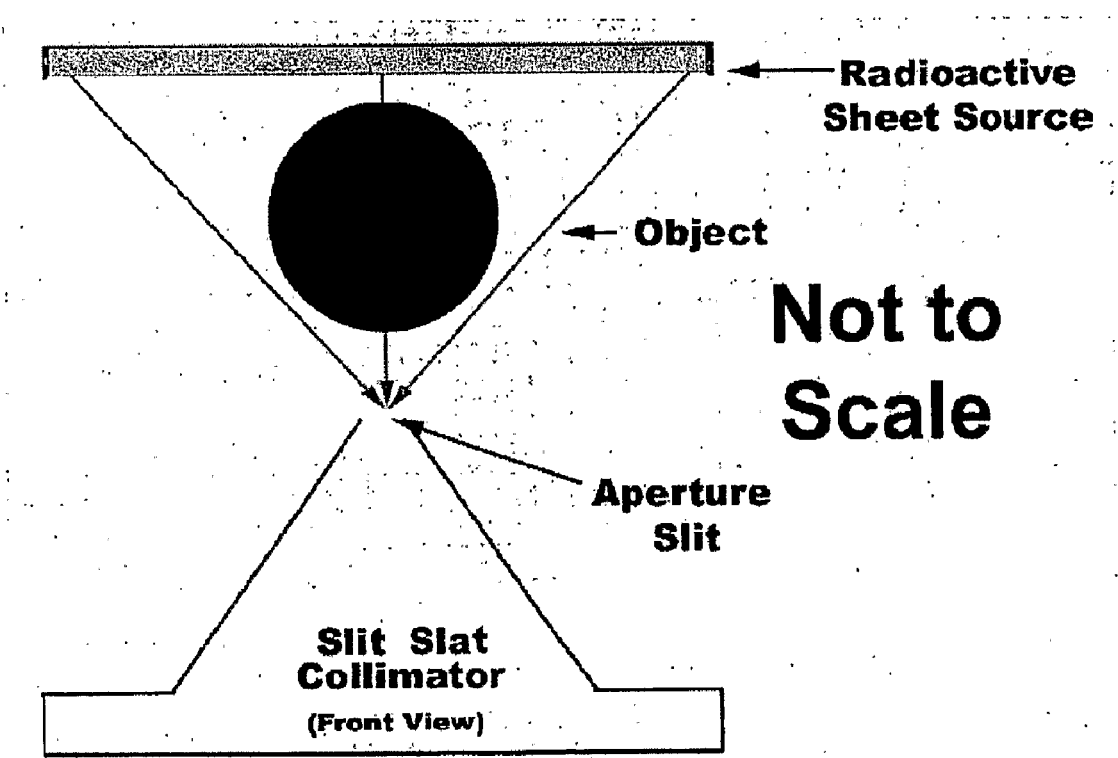
FIG. 47 shows an attenuation mapping system using a sheet source opposite the slit-slat collimator. The source would be collimated with a fan-beam collimator (not shown) to reduce scatter and patient dose; the fan-beam's focal length would match the distance to the aperture slit.

Since the photons must go through the slit, which is a focal line, the natural choice for transmission would be a sheet source. To reduce scatter and dose, the sheet would be collimated with a fan-beam collimator whose focal-length matched the distance to the slit (FIG. 47). Complete sampling for the local region can be obtained from a 180° scan; complete sampling over the entire body would require a scan of 180° plus the full fan angle. In addition, it is becoming increasingly more common for new SPECT systems to ship with a CT unit.

Software Compensation for Attenuation and Scatter

OSEM iterative reconstruction can incorporate attenuation compensation within its framework. The algorithm requires knowledge of $P_{ij}$, which is the probability that a photon emitted from voxel j is detected at bin i. The current reconstruction code does not consider attenuation compensation; $P_{ij}$, currently considers only collimator and detector effects—geometric and penetrative sensitivity, detector parallax, and detector resolution. Attenuation reduces the expected number of photons from voxel j detected at bin i by a known quantity, $$e^{-\int \mu d\vec{l}_{ij}},$$

where $\int \mu d\vec{l}_{ij}$ is the line integral through the object of the linear attenuation coefficient, $\mu$, along a line from voxel j to bin I. As a result, the total probability of detecting a photon emitted from voxel j at bin i can be approximated as $$P_{ij}^{Total} = P_{ij}^{Geometric} \cdot e^{-\int \mu d\vec{l}_{ij}} \qquad (EQ.\ 8)$$

Because $P_{ij}^{Geometric}$ is determined by the pinhole kernel program and $\int \mu d\vec{l}_{ij}$ can be determined by the attenuation map, $P_{ij}^{Total}$ can be calculated and used to produce attenuation-corrected reconstructions.

There are many techniques in the literature for scatter compensation. Jaszczak et al. have reconstructed a secondary energy window as an estimate of the background. The dual window method is used to estimate the scatter contribution to the projection data.

Calibration Parameter Determination and Implementation in Reconstruction

Figure 48:
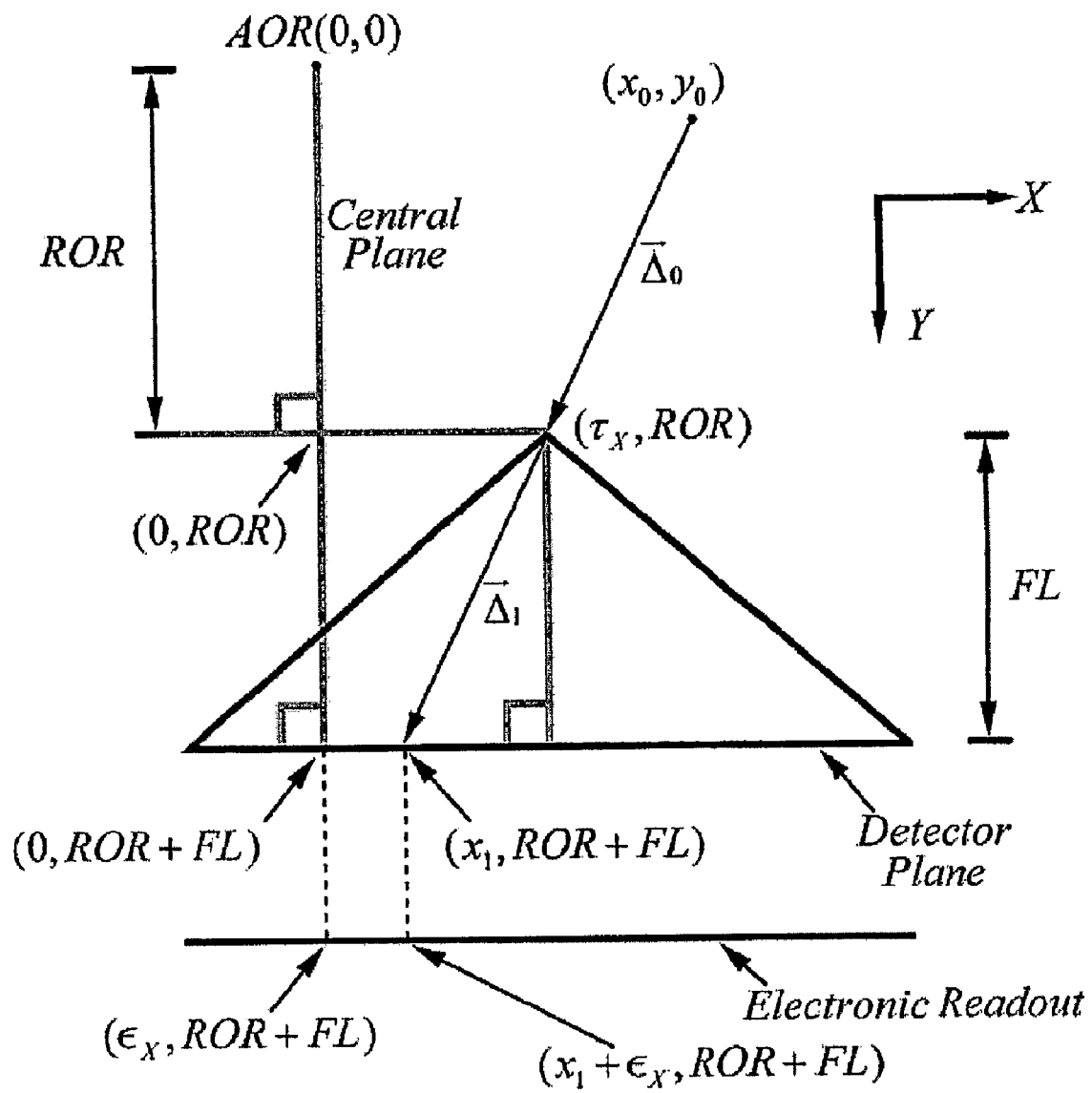
FIG. 48 shows geometry of mechanical and electronic shifts for slit-slat imaging.

Three types of calibrations need to be performed: mechanical shifts, electronic shifts, and ROR measurements. FIG. 48 shows a schematic drawing of the mechanical and electronic shifts for an embodiment of slit-slat collimation. This is similar to FIG. 34, except that everything is now 2D. It is assumed that the source is in the particular axial slice shown. That can be accomplished experimentally by either moving the point source and repeating the scan or by using a line source that is aligned approximately parallel to the AOR.

Measuring Mechanical and Electronic Shifts with a Point Source

In the data, a point-source method is described for measuring the mechanical and electronic shifts based on the expected centroid of EQ. 75. This equation was used in a maximum-likelihood fit to determine the parameters for single-pinhole imaging. There are two modifications that need to be made for slit-slat imaging: (1) the transverse (x) and the axial (z) components are no longer fit simultaneously; and (2) the mechanical shift should now be parameterized as a line instead of a point since it may change with z. For single pinhole imaging, both the transverse and axial components depend on the aperture and point-source locations. For slit-slat imaging, the axial slices are independent. Thus, only the transverse component is fit:

$$\tau_x + \varepsilon_x + \frac{F(\tau_x - x_0\cos\varphi - y_0\sin\varphi)}{ROR + x_0\sin\varphi - y_0\cos\varphi} \qquad (EQ.\ 9)$$

$\tau_x$ is also parameterized as a linear function of z: $\tau_x(z) = z\tau_{x,m} + \tau_{x,b}$, where the m and b subscripts indicate slope and intercept, respectively. It is unlikely that $\varepsilon_x$ needs to be parameterized as a function of z. Further, a single point source to calibrate the system can no longer be used. However, a line source, aligned approximately with the AOR, should work well. Then, the source distribution can be parameterized with respect to z as a line: $(x_0(z), y_0(z))$. Thus, the final equation to fit is:

$$\tau_x(z) + \varepsilon_x(z) + \frac{F(\tau_x(z) - x_0(z)\cos\varphi - y_0(z)\sin\varphi)}{ROR(z) + x_0(z)\sin\varphi - y_0(z)\cos\varphi} \qquad (EQ.\ 10)$$

where the constants $\tau_x$, $\varepsilon_x$, $x_0$, $y_0$ and ROR have all been replaced with linear functions of z. The measurement of ROR (z) is described below.

ROR Measurements with a Laser

ROR measurements are conducted using the methods above. The collimator is designed to allow for easy mounting of the laser target at different axial slices. Measurements are conducted at several axial slices (three is an appropriate number). Because of the rigid-body nature of the collimator, these three axial measurements fall along the same line (for each gantry angle). That is, the angular dependent ROR is measured for three different axial positions. At each angle, the value of the ROR is known at three different axial positions.

It is possible that there are angular-dependent tilts and/or axial shifts for this collimation. A symptom of this problem would be that at one axial end (e.g., the front) the ROR would be larger than at the other axial end for a range of angles, but smaller for a different range of gantry angles. The problem has already been discovered and compensated for with single-pinhole imaging and a dramatic improvement in resolution has been found. The same effect is seen in parallel-beam.

This problem would cause additional mixing of axial slices in projections (i.e., in addition to detector blurring). Appropriate compensations are then made in the reconstruction software. At the time of design, the software handles such cases. A reasonable method for compensating in software assumes that the reconstruction process simultaneously considers several neighboring slices.

Reconstruction with Truncated Projection Data

There has been recent progress in reconstructing truncated projection data to accurately determine 2D distributions within a region of interest (ROI). In one embodiment, slit-slat collimation is a 2D device in that each axial slice can be reconstructed separately. There are three factors that determine whether there is a unique solution for reconstructing truncated projection data: (i) the ROI must remain in the common field of view (FOV) during the scan; (ii) the FOV must extend to outside the body where the activity concentration (attenuation for CT) is zero; and (iii) each point within the FOV must meet the 2D sampling criteria of having all lines through each point measured. It has been shown that iterative algorithms yield good reconstructions even when there is some (i.e., small) violation of these three criteria.

Figure 49A:
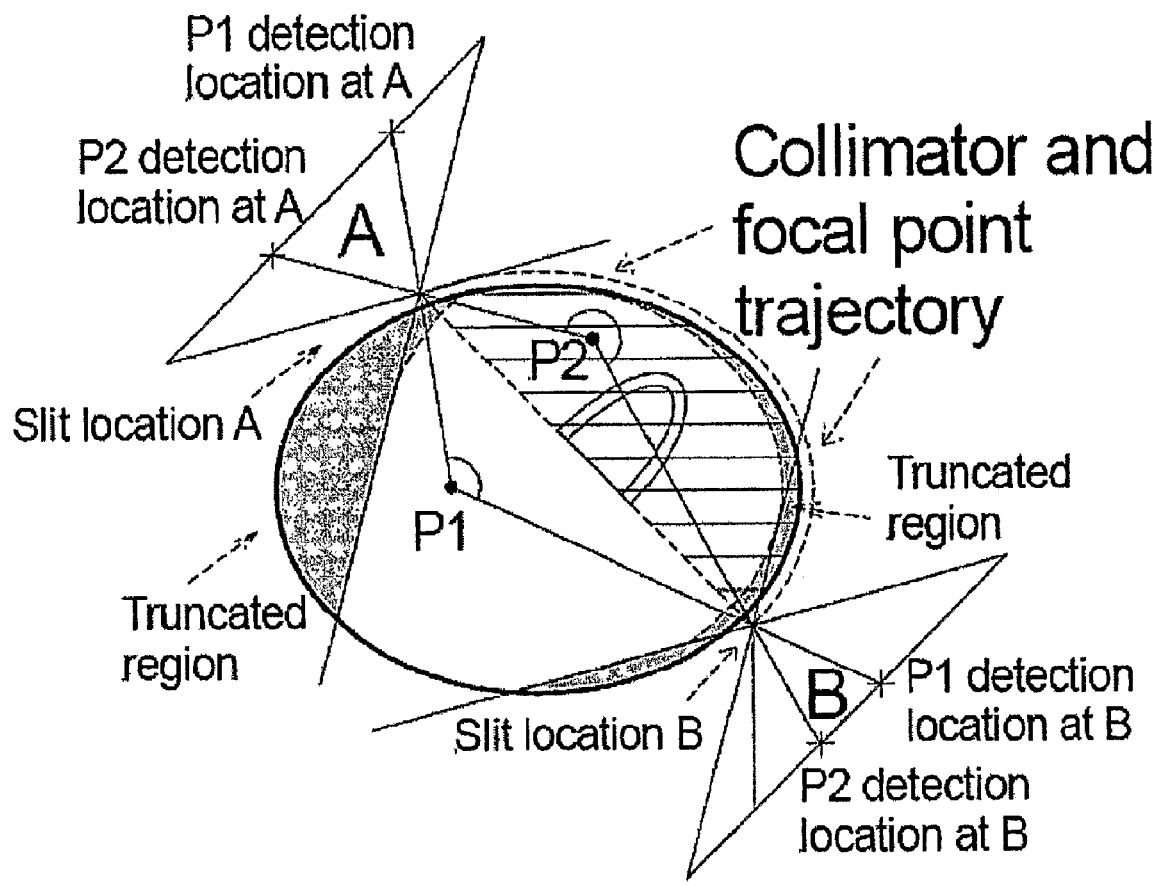
FIG. 49a shows completely sampled region (hatched, unshaded) for cardiac scans from left posterior oblique to right anterior oblique using slit-slat. The path of slit-slat's focal point coincides with the path of the aperture. The completely sampled region is bounded by the path of the focal point and the line connecting the end points. The points P1 and P2 show that those points are either completely sampled (angle greater than 180 deg.) or incompletely sampled. Only the central slit is shown. The truncated region is shaded. Hatched and shaded indicates where complete sampling may be compromised by truncation.
Figure 49B:
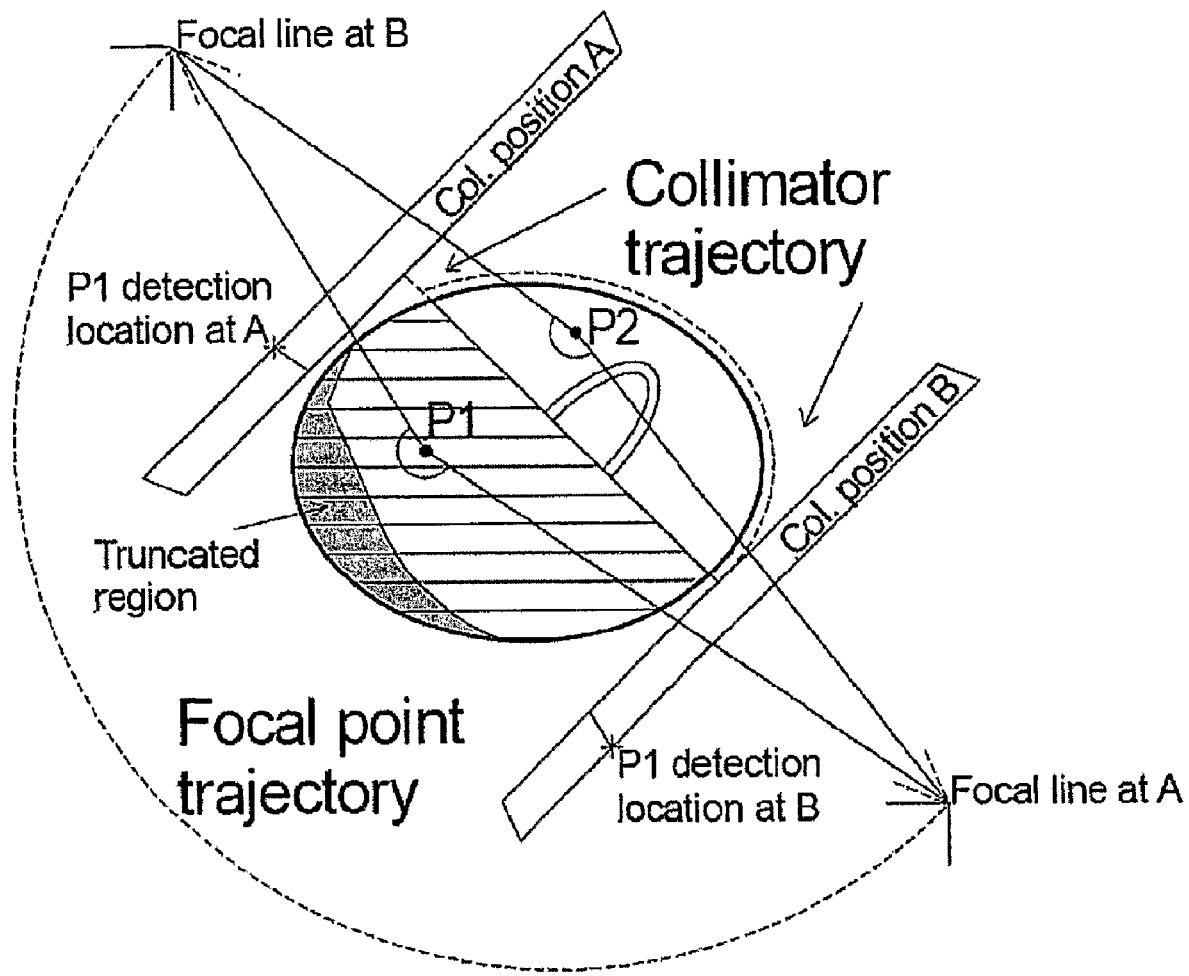
FIG. 49b shows completely sampled region (hatched, unshaded) for cardiac scans from left posterior oblique to right anterior oblique using fan-beam. The fan-beam collimator follows the same orbit as slit-slat in FIG. 49a, but the focal point is opposite the detector. The completely sampled region is bounded by the path of the focal point and the line connecting the end points. The points P1 and P2 show that those points are either completely sampled (angle greater than 180 deg.) or incompletely sampled. The truncated region is shaded. Hatched and shaded indicates where complete sampling may be compromised by truncation.

In one embodiment, there are two advantages in cardiac imaging for multislit-slat collimation over fan-beam collimation. First, when considering truncated projections, fan-beam's radius of rotation (ROR) is limited by the body contour, not truncation on the side nearest the detector; it cannot get closer to the body. Thus, it cannot benefit from loosening the "cannot-truncate" constraint. In fact, truncation potentially worsens for fan-beam on the far-side of the object as the ROR increases. On the other hand, in one embodiment slit-slat's ROR can decrease so that it is limited by the body contour, instead of the need to avoid truncation; this improves both resolution and sensitivity. For example, when imaging the disk of diameter D above without truncation, the ROR was D csc($\alpha$/2)/2, where $\alpha$ was the slit's acceptance angle. With truncated projections, the ROR would be D/2 plus some small margin for clearance (~1 cm). Second, since in one embodiment the focal point of slit-slat coincides with the aperture, one can see in FIG. 49a that the completely sampled region is that outlined by the path of the aperture and the line connecting the endpoints; this region, where sensitivity and resolution are best for cardiac imaging using slit-slat, contains the heart. In contrast, fan-beam's focal point is opposite the detector. When fan-beam follows the same trajectory as slit-slat (left posterior oblique through right anterior oblique), the complementary region is completely sampled. That is, the cardiac region is not completely sampled (FIG. 49b). Fan-beam's completely sampled region can be increased by extending the scan's trajectory. However, this dilutes the best views near the heart for constant scan time and increases the average distance from the heart to the detector, which degrades resolution and increases attenuation.

In evaluations using cardiac phantoms, truncated projection data are used to reconstruct the cardiac region. Orbits that completely sample the cardiac region are determined and necessary changes to the reconstruction software to accommodate the truncated data are then made. A similar advantage in breast imaging is foreseen since an orbit from the sternum to the axilla would completely sample the breast.

Filtered Backprojection Reconstruction

A filtered backprojection (FBP) algorithm is developed to complement the iterative algorithm. The reason for this orthogonal program is comparison and debugging.

Experimental Evaluations

Sensitivity Measurement with Point Source

Figure 57:
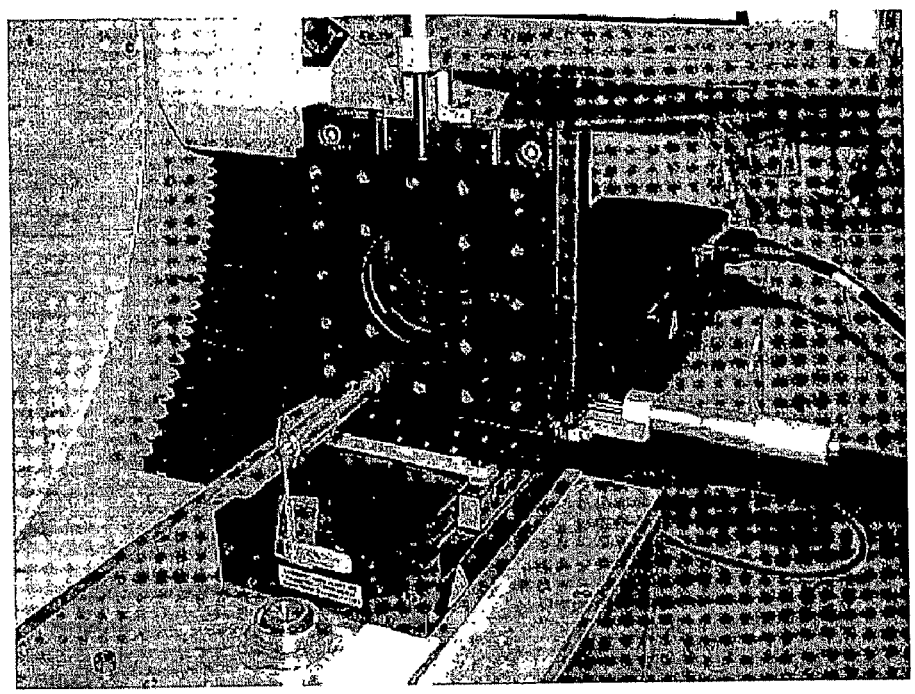
FIG. 57 shows three orthogonal stages (two manual; one robotic) are used to precisely position a point source. One needs to know the mapping from the stage coordinates to the aperture coordinates.

In one embodiment, a point-source mounted on a set of three orthogonal positioning stages is used, as in FIG. 57. The location of the point source may be defined in a coordinate system relative to the center of the aperture plate: $(x_a, y_a, z_a)$ for each axial slice. In this case, $y_a$ is the distance from the aperture measured along a perpendicular from the detector and $x_a$ is measured along a direction parallel to the detector. The third dimension, $z_a$, is defined with respect to the center of the detector. On the other hand, the location of the point source may also be defined with respect to the "set" positions of the orthogonal stages: $(x_s, y_s, z_s)$.

Figure 58:
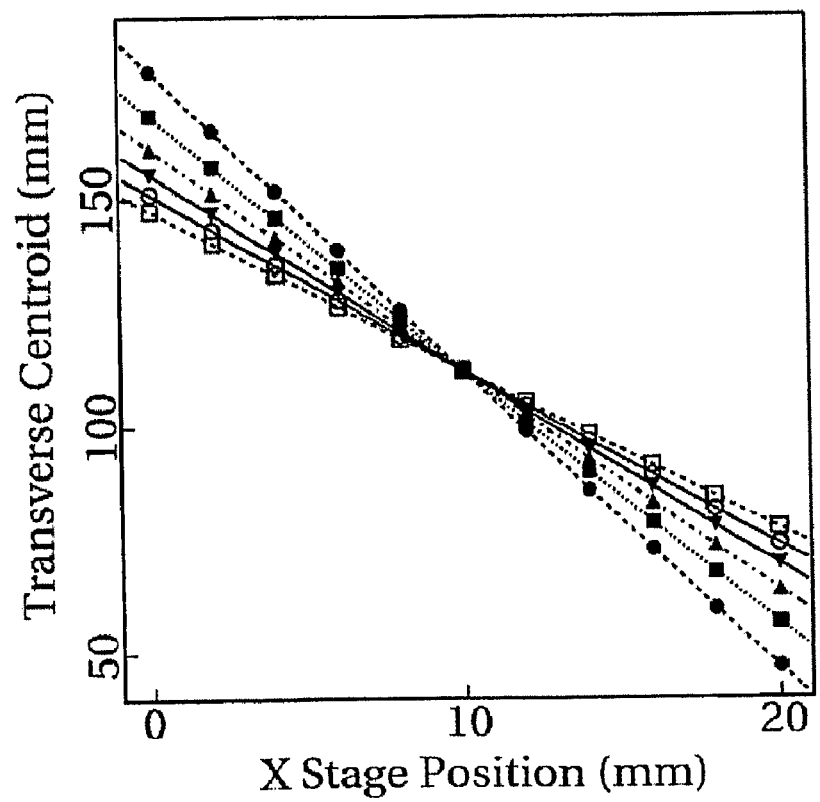
FIG. 58 shows transverse centroids (points) versus x-stage position. Each position gives one centroid that follows a line. The different lines are due to different y-stage values. The lines are the fits to the points.

A "setup" study is performed to determine the relationship between these two coordinate systems. This relationship can be defined by three Euler angles and three offsets, one per dimension. These parameters are determined by changing the values of s x and s y to cover a 2D grid. For each position, the centroid of the projection onto the detector is determined. An additional parameter is used to account for the difference between the aperture's position and the electronic readout. The expected centroid of the projection onto the detector is:

$$\langle x_{d,i} \rangle = -\frac{F}{y_{a,i}} x_{a,i} + E_x; \langle z_{d,i} \rangle = z_{a,i} \qquad (EQ. 11)$$

where i indicates a particular measurement from the data set, F is the focal length of the collimator, and $E_x$ is the electronic offset. This expected value is numerically corrected for parallax and used in a least-squares fit. The fit yields the six parameters (i.e., Euler angles and offsets) that define the relationship between the stages and the aperture. These parameters are inverted so that the stage set positions can be determined for a desired point-source location. FIG. 58 shows experimental centroids for 6 different y values (the six lines) and 11 different x values (the points on the line).

The sensitivity is measured at various angles and distances from the aperture to validate the analytic and numerical models. In addition, the sensitivity is measured at several different axial positions to verify that the sensitivity is independent of axial position. The axial stepping is performed on two different scales: large and small with respect to the axial septa. For example, for the large-scale experiment the point is placed axially about one quarter from each edge of the detector (two positions) and approximately in the middle, for a total of three positions. For the small scale, steps are taken using a robotic stage aligned with the axis of rotation about three slices (i.e., three times the spacing of the septa), in increments of about 0.1 slice. This is automated by programming the scanner and the stage.

PSF Measurement with Point Source

The PSF is measured using the same experimental setup as described for the sensitivity measurements (above). In fact, the measurements are performed simultaneously, since the sensitivity is the 2D integral of the point-spread function. Thus, the projection data are measured at different angles and distances from the aperture, as above. These experimental PSF results have been compared with the theoretical predictions. There are two useful directions: axial and transaxial. The axial resolution, due to the use of the axial septa, is comparable to parallel-beam and fan-beam with similar axial geometries. The transaxial resolution depends in detail on the geometry of the aperture plate.

Evaluation of Reconstruction Resolution with Disk and Rod Phantoms

Disk phantoms are used (as in FIGS. 59 and 32) to measure axial resolution in reconstruction and rod phantoms (as in FIGS. 60 and 36a, 36b, and 36c) to measure transaxial resolution. Least squared difference is the metric used to evaluate the consistency of images. An alternative, and closely related, metric is $\chi^2$. However, $\chi^2$ requires knowledge of the reconstruction's uncertainty on a voxel-by-voxel basis. SPECT does not currently yield accurate estimates of activity-concentration uncertainty. As a result, the least-squared difference is used, which is equivalent to a constant uncertainty. Although not ideal, it should serve as a reasonable quantitative measure of the comparative accuracy and precision of experimental results.

For a three-dimensional binned (voxelized) function, whose value at voxel position (i,j,k) is $V_{ijk}$, the average least squared difference $\overline{L.S.}$ is $$\overline{L.S.} = \frac{1}{N} \sum_{1}^{N} (V_{ijk} - k\langle V_{ijk} \rangle)^2 \quad \text{(EQ. 12)}$$

where the sum is over all N combinations of ijk elements and the expected value of $V_{ijk}$ is $V_{ijk}$.

Figure 59:
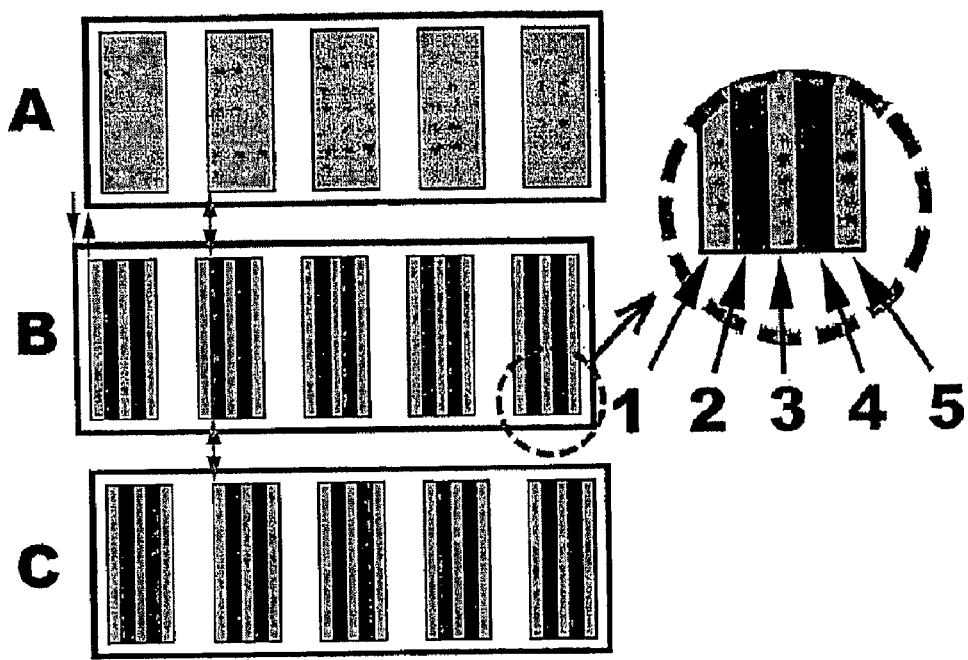
FIG. 59 shows alignment of reconstructions (A) with digital phantom (B). The digital phantom uses smaller voxel size than the reconstruction so that it can be translated and rebinned (C). this will allow the minimum value of the squared difference to be determined.
Figure 60:
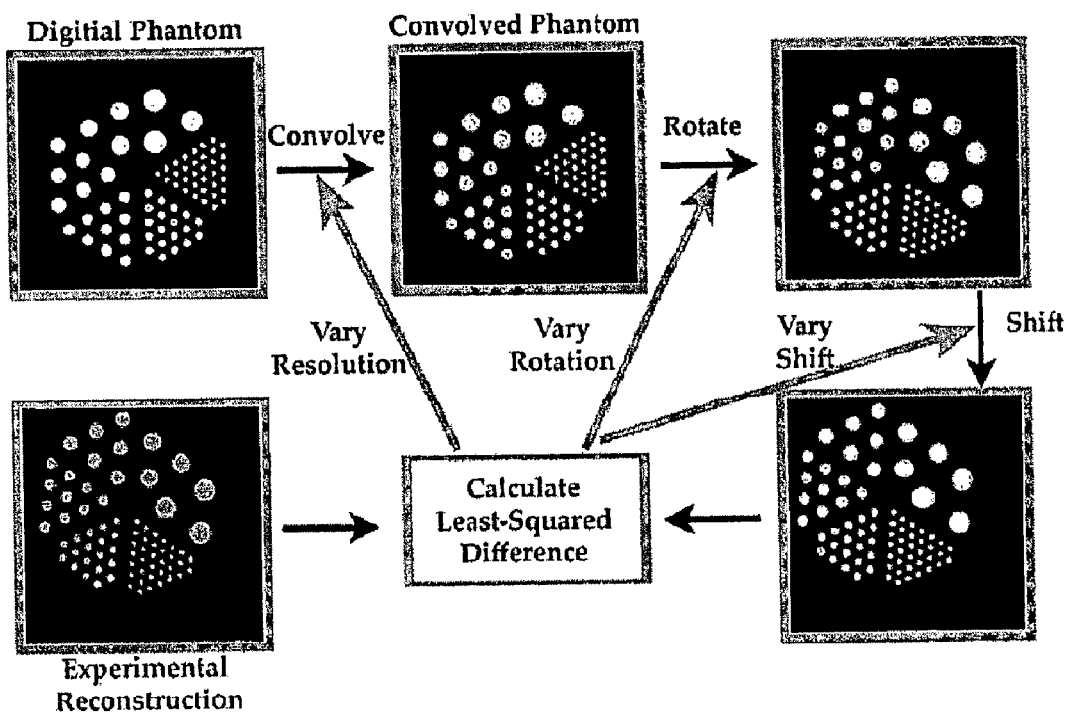
FIG. 60 shows a schematic representation of resolution determination. A digital phantom is manipulated (convolved, rotated, shifted) until the least-squared difference with an experimental reconstruction is found.

In order to evaluate $\overline{L.S.}$, a digital phantom is used to determine $V_{ijk}$. The digital phantom has smaller binning than the reconstruction; the reconstruction's bin size is an integral multiple of the phantom's (FIG. 59). The digital phantom is shifted in all two or three dimensions depending on the phantom (rod phantoms are axially symmetric so only one slice is used) to determine the minimal value of the squared difference; the minimal value is the least squared difference. The digital phantom is also rotated (FIG. 60), if necessary, to get the best match (rotation is not necessary for disk (Defrise) phantoms which are rotationally symmetric).

A scale factor k is used to normalize the least squared difference:

$$\overline{L.S.} = \frac{1}{N} \sum_{1}^{N} (V_{ijk} - k\langle V_{ijk} \rangle)^2 \quad \text{(EQ. 13)}$$

This is minimized with respect to k for each translation and rotation of the digital phantom with respect to the reconstruction. The value of k is given as:

$$\frac{\partial \overline{L.S.}}{\partial k} = \frac{2}{N} \sum_{1}^{N} (kV_{ijk} - \langle V_{ijk} \rangle)V_{ijk} = 0; \; k = \frac{\sum_{1}^{N} V_{ijk} \langle V_{ijk} \rangle}{\sum_{1}^{N} V_{ijk}^2} \quad \text{(EQ. 14)}$$

For each translation and rotation, the digital phantom is rebinned so that its new bin size is the same as the bin size of the reconstruction; this rebinning is accomplished by summing the smaller bins of the digital phantom.

Evaluation of Lesion-Contrast Estimation with Anthropomorphic Phantoms

In one embodiment, the most promising clinical applications for multislit-slat collimation are cardiac, brain, and breast imaging. The reason for this is that a small radius of rotation (<~15 cm) may be obtained. For cardiac, the radius is slightly larger and over a 180 deg. scan; for the digital phantom of above with a torso width of 40 cm, a body-contour orbit ranges in ROR from 14-19 cm from the axis of rotation.

Figure 61A:
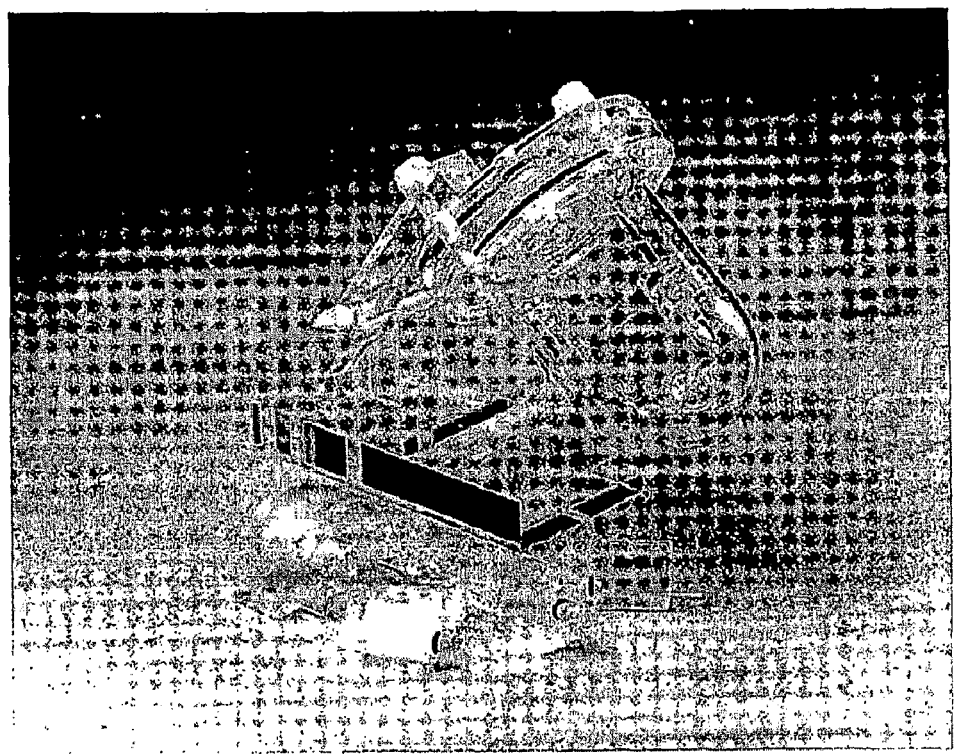
FIG. 61a shows a fillable cardiac insert phantom for use with the Data Spectrum torso phantom in FIG. 61c.
Figure 61B:
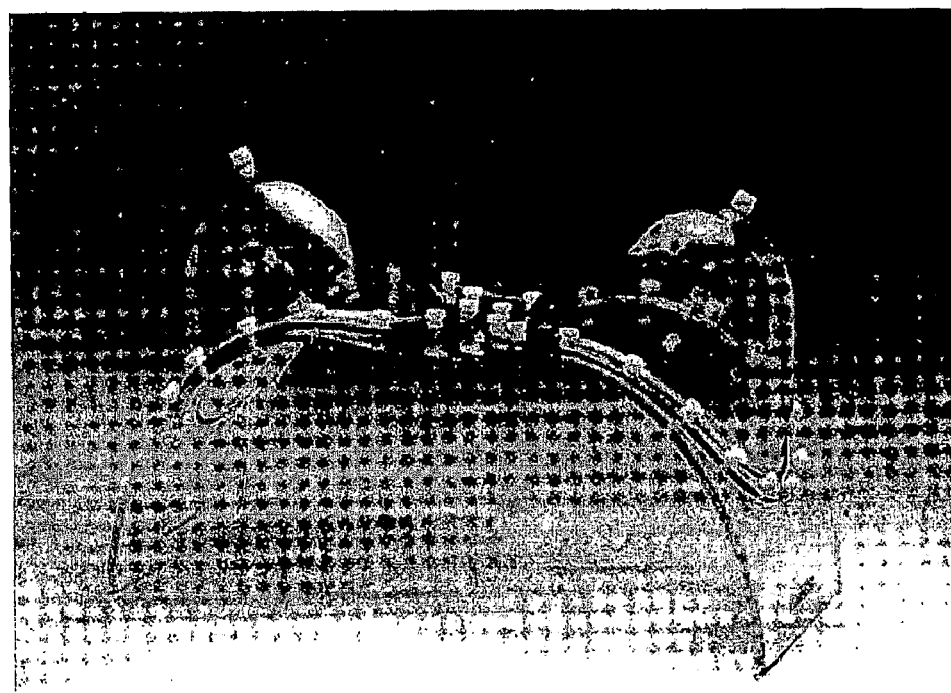
FIG. 61b shows a fillable breast insert phantom for use with the Data Spectrum torso phantom in FIG. 61c.
Figure 61C:
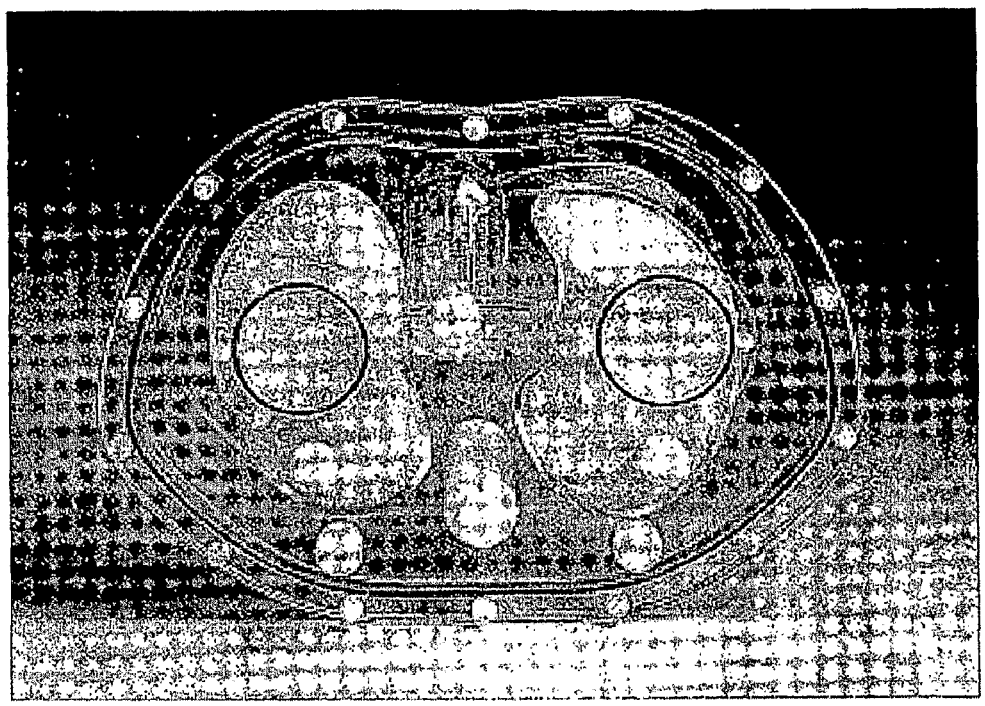
FIG. 61c shows a Data Spectrum torso phantom.
Figure 62:
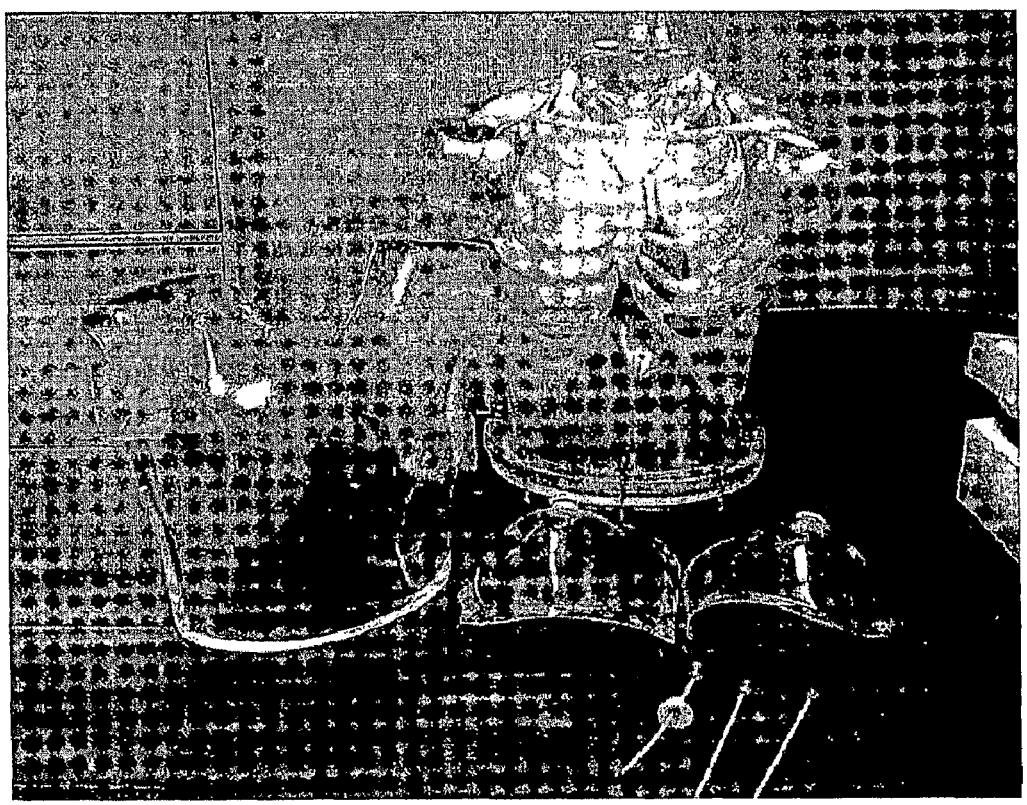
FIG. 62 shows an Alderson body phantom with fillable cardiac, liver and breasts.
Figure 63:
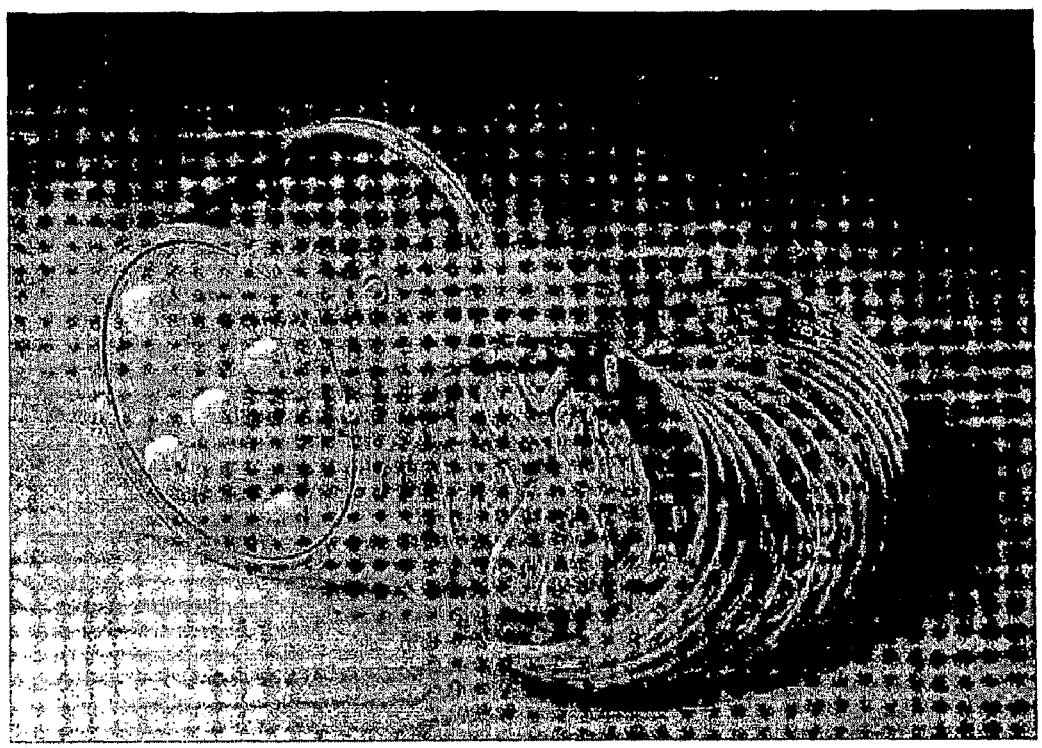
FIG. 63 shows a Hoffman 3D brain phantom.

For cardiac imaging, both the Data Spectrum torso phantom with a cardiac insert (FIGS. 61a, 61b, and 61c) and the Alderson Phantom are used, which has a fillable cardiac region (FIG. 62). The phantom used for brain studies is the Hoffman 3D brain phantom (Data Spectrum Corp., BR/3D/P) (FIG. 63). Simulated lesions are made of small latex balloons filled with Tc-99m; these "lesions" are placed in different locations in the gray matter regions of the Hoffman brain phantom. The breast phantom is Data Spectrum's fillable breast phantom (Model ECT/FIL-BR/P) (FIG. 61b) containing hollow fillable spheres. The breast phantom is mounted on an anthropomorphic torso phantom (Data Spectrum Corp., Model ECT/TOR/P) (FIG. 61c), which has breast attachments. A partial circular orbit is used, which may be complemented with fan-beam on a different camera head. The inherently coregistered attenuation map is obtained by Symbia's CT scanner. Scatter compensation uses the methods of above.

As a general measure of lesion characterization, contrast is measured, defined as c=(l−b)/b, where l and b are radiopharmaceutical concentrations in the region of interest and the background, respectively. As is standard practice, l is determined as the activity per unit volume in a region of interest (ROI) that is centered within and somewhat smaller than the hot/cold lesion, so as to limit overlap of the ROI with blurring near the lesion's edge (i.e., partial volume effects). For sufficiently small lesions, blurring extends almost to the center of the structure and overlap cannot be avoided, causing l on average to underestimate (overestimate) for hot (cold) lesions the true structure concentration $l^T$ and thus c to underestimate (overestimate) the true contrast $c^T$. This bias in l can be reduced by choosing a smaller ROI, but generally at the cost of greater random fluctuations in l and thus in c. The background concentration b is determined as the activity per unit volume in a second ROI positioned near but sufficiently outside the lesion ROI.

As just alluded to, the error in estimated contrast has bias and noise components, where $bias_c = \bar{c} - c^T$, and $noise_c = \sqrt{Var[c]}$; Var [c] is the variance of c and $\bar{c}$ is the expected value of c. The root mean squared error in contrast is $$RMSE_c = \sqrt{\langle (c - c^T)^2 \rangle} = \sqrt{bias_c^2 + noise_c^2}.$$

For a given experimental configuration (e.g., slit-slat-only or fan-beam-only), different pairs ($bias_c$, $noise_c$) can be obtained by varying many factors including lesion:background uptake ratio ($c^T$), lesion-structure size, lesion-structure ROI size, and number of iterations for OSEM. Plotting bias versus noise then provides one or more curves for each configuration. For example, by changing the lesion's true contrast, one can compare the bias-vs-noise curve of slit-slat and fan-beam.

The quantities <c> and Var [c] can be estimated in several ways. Ensemble experimental studies are conducted to determine the mean and variance. Ensembles with lesion present and lesion absent are conducted as a comparative method for estimating background fluctuation. These studies are conducted for fan-beam-only, slit-slat-only, and mixed collimation. In addition, they are conducted with lesions of different sizes. Lastly, variation of aperture size and septal spacing are considered, but it is likely that this is first optimized with Monte Carlo to limit the number of configurations; for the brain-phantom studies it is also likely for these experimental evaluations that the different aperture sizes are acquired by using a different size on each of the three collimators. Acquisitions may be done with several different collimator types simultaneously (e.g., slit-slat, single-pinhole, and fan-beam) so that a direct comparison may be made and also that data may be combined in a joint reconstruction. Since each head separately acquires complete data (except for single-pinhole), this reduces the number of times the phantom needs to be repositioned.

Projection data is acquired separately for each lesion without background activity. The phantom is filled with water so there is a scattering and attenuating medium. After the lesion acquisition, the lesion is removed and the phantom is filled with background activity. The phantom is then be carefully repositioned. This can be done with laser markers. (For cold lesions, the previously mentioned background scan would be conducted in addition to a scan with the phantom filled with background activity and a cold lesion positioned to displace that activity.) This technique has several potential advantages. First, there is no issue with the lesion wall since when taking hot-lesion data the wall is scattering material, just like the rest of the water-filled phantom. On the other hand, when the hot lesion is removed for the background scans, the wall is also removed. Second, the signal to background (contrast) can be adjusted in post-processing by adding different combinations of scans together; since acquisition is a linear process, this technique is legitimate. It is also be possible to continuously vary the contrast by using re-sampling techniques that retain the Poisson nature of the data.

A limitation of the analysis may be that it does not consider the uncertainty in determining the boundaries of small lesion structures. At least in some cases, such uncertainty has been shown to increase the importance of resolution over sensitivity in the collimation/orbital configuration. In addition, by acquiring lesion-only data as described above, it may be possible to better determine the lesion's position.

Example 1

Comparison of Sensitivity and Resolution for Different Collimator Types

New experimental and simulated data confirming the previous hypotheses (i.e., on-axis sensitivity of slit-slat is the geometric mean of pinhole and parallel-beam; transaxial and axial resolutions are well predicted by the pinhole and parallel-beam resolution formulas, respectively) have recently been published in the Journal of Nuclear Medicine. The mathematical derivation of these results follows.

Sensitivity and Resolution Results Recently Published by the Journal of Nuclear Medicine A simple picture of slit-slat collimation is as the combination of pinhole collimation within transaxial planes separated by septa providing collimation in 1D (the slats). The sensitivity formulas for a pinhole and a parallel-hole collimator are well established. For a pinhole, sensitivity is given by:

$$g_P = k \frac{w^2}{4\pi h^2} \sin^3 \theta \qquad (EQ. 15)$$

where w is the width of the pinhole (its diameter if the aperture is round), h is the distance of the plane of the pinhole from the point at which sensitivity is calculated, θ is the angle formed by a photon passing through the center of the aperture with the plane of the aperture, and k is a shape factor equal to 1 for a square pinhole and π/4 for a round pinhole. For a parallel hole collimator, sensitivity is:

$$g_c = k \frac{d^4}{4\pi(d+t)^2 a^2} \qquad (EQ. 16)$$

where d is the free space between two septa, t is their thickness and a their height (i.e. the depth of the channels, which are assumed square in a square array). It has been recently postulated and experimentally verified that the on-axis sensitivity (i.e. for θ=π/2) of a slit-slat collimator with parallel slats is given by the geometric mean of EQ. 15 and EQ. 16. A discussion of this result follows:

The dependence of sensitivity and resolution on the parameters of the collimator is important for determining the scenarios in which slit-slat may be better than other collimation choices. Although explicit forms for the theoretic system resolution ($R_o$) and sensitivity (g) are not given in the article by Walrand et al. (Evaluation of novel whole-body high-resolution rodent SPECT (Linoview) based on direct acquisition of linogram projections. J. Nucl. Med. 2005; 46:1872-1880), both are plotted in FIG. 7 therein. A careful visual inspection shows that these plots are consistent with Anger's on-axis formulas for pinhole collimation:

$$R_o(\text{pinhole}) = \left[R_g^2 + \left(\frac{h}{f}R_i\right)^2\right]^{\frac{1}{2}} = \left[w^2 \frac{(h+f)^2}{f^2} + \frac{h^2}{f^2}R_i^2\right]^{\frac{1}{2}} \qquad (EQ. 17)$$

$$g(\text{pinhole}) = \frac{kw^2}{4\pi h^2} \begin{cases} k = \pi/4 & \text{circular hole} \\ k = 1 & \text{square hole} \end{cases}$$

where $R_o$ is the overall system resolution, $R_g$ is the geometric (collimator) component, and $R_i$ is the intrinsic detector resolution. In addition, w is the diameter of the pinhole (edge length for a square hole), f is the focal length of the collimator, and h is the distance from the aperture plane. Moreover, these formulas do not depend on any parameters of the axial slats (e.g., height, spacing, thickness).

An alternative approach is to model a slit-slat collimator as a pinhole collimator in the transverse dimension combined with a parallel-beam (or, equivalently, fan-beam) collimator in the axial direction (parallel-beam and fan-beam are identical in the axial dimension). In that case, one would expect that $R_o$(pinhole) from EQ. 17 would be accurate in the dimension collimated by the slit (i.e., transaxial, which is x in FIG. 4). Further, one would also expect that the parallel-beam resolution formula of Jaszczak et al. would apply in the dimension normal to the slats (i.e., axial):

$$R_o(\text{parallel-beam}) = \quad \text{(EQ. 18)}$$

$$[R_g(\text{parallel-beam})^2 + R_i^2]^{\frac{1}{2}} = \left[d^2\frac{(h+f)^2}{a^2} + R_i^2\right]^{\frac{1}{2}}$$

where d is the gap between the septa and a is their height. (Note that the sum of the symbols a and c in Jaszczak et al. equals f in EQ. 18 and that b in Jaszczak et al. equals h.)

It is difficult to determine from the above argument the form of the sensitivity, but an educated guess may be the geometric mean of pinhole and parallel-beam:

$$g(\text{pinhole}|\text{parellel-beam}) = \quad \text{(EQ. 19)}$$

$$[g(\text{pinhole})g(\text{parellel-beam})]^{\frac{1}{2}} = \left[\frac{w^2}{4\pi h^2}\frac{d^4}{4\pi a^2(d+t)^2}\right]^{\frac{1}{2}} = \frac{wd^2}{4\pi ah(d+t)}$$

where square holes (i.e., k=1) have been used to match the experimental geometry, and the parallel-beam sensitivity for septa of thickness t is given by the following:

$$g(\text{parellel-beam}) = \frac{d^4}{4\pi a^2(d+t)^2} \quad \text{(EQ. 20)}$$

The differences between these expectations and those of Walrand et al. are pursued herein through experimental and Monte Carlo techniques to determine the on-axis sensitivity and resolution of slit-slat collimation.

Experimental

Setup: The configurations listed in Table 1 were assembled using tungsten slats (0.11 mm thick; 17 mm tall) separated by nylon spacers of thickness d (FIGS. 5a and 5b); for each configuration, t=0.11 mm. For the even-numbered configurations of Table 1, a second stack was placed on top of the first to form 34-mm-tall slats. These slats were placed on top of a large opening (39×61 mm) of a preexisting multiple-pinhole mount, which provided shielding from environmental photons. The slats were aligned with the transverse direction of the γ-camera (Picker Prism 3000XP; Philips Medical Systems).

TABLE 1

Collimator Configurations

| Configuration no. | w (slit width) | d (gap between slats) | a (slat height) |
|---|---|---|---|
| 1 | 2.03 | 1.27 | 17.0 |
| 2 | 2.03 | 1.27 | 34.0 |
| 3 | 2.03 | 2.54 | 17.0 |
| 4 | 2.03 | 2.54 | 34.0 |
| 5 | 4.06 | 1.27 | 17.0 |
| 6 | 4.06 | 1.27 | 34.0 |
| 7 | 4.06 | 2.54 | 17.0 |
| 8 | 4.06 | 2.54 | 34.0 |

Measurement are in millimeters. Slat thickness = 0.11 mm in all cases.

Figure 5A:
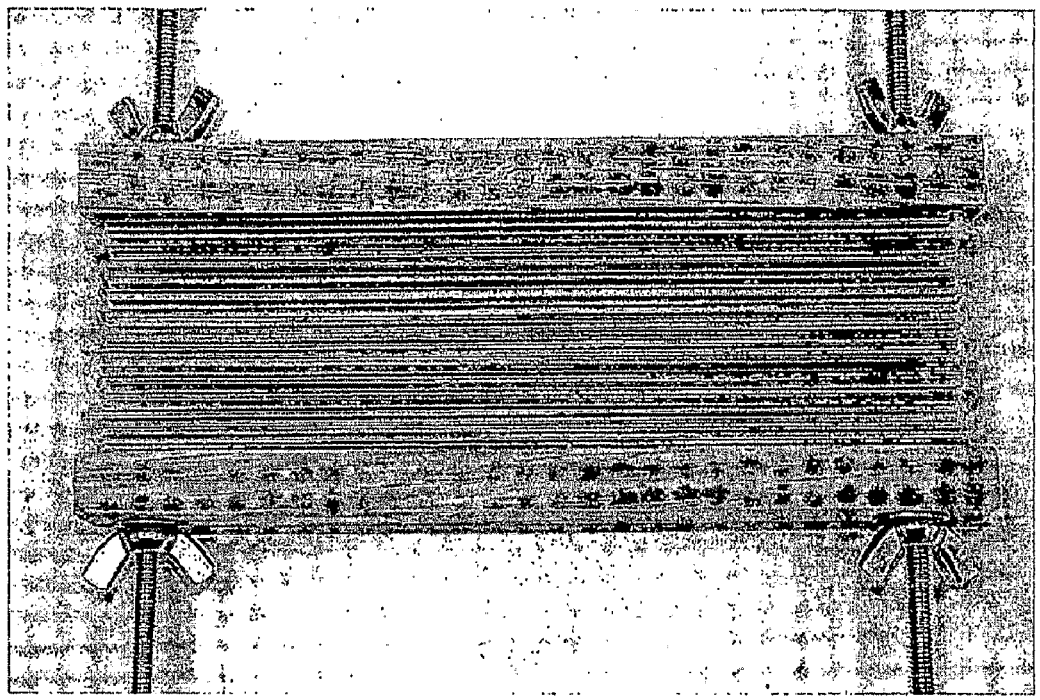
FIG. 5a shows a close-up of slats assembly (17 mm tall; 0.11 mm thick), which were separated by 1.27-mm-thick nylon.
Figure 5B:
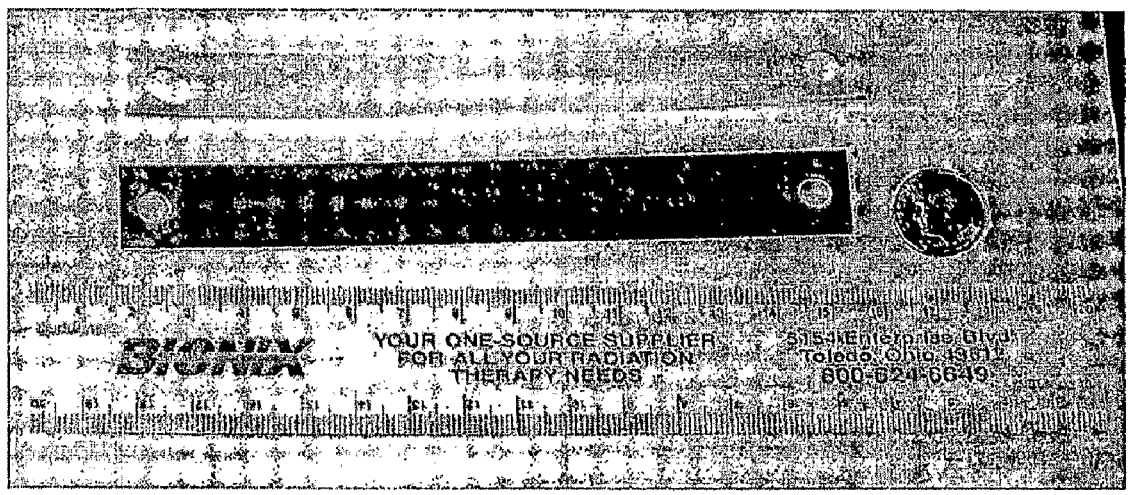
FIG. 5b shows a slat assembly. The slat assembly was constructed from tungsten slats separated by nylon.
Figure 5C:
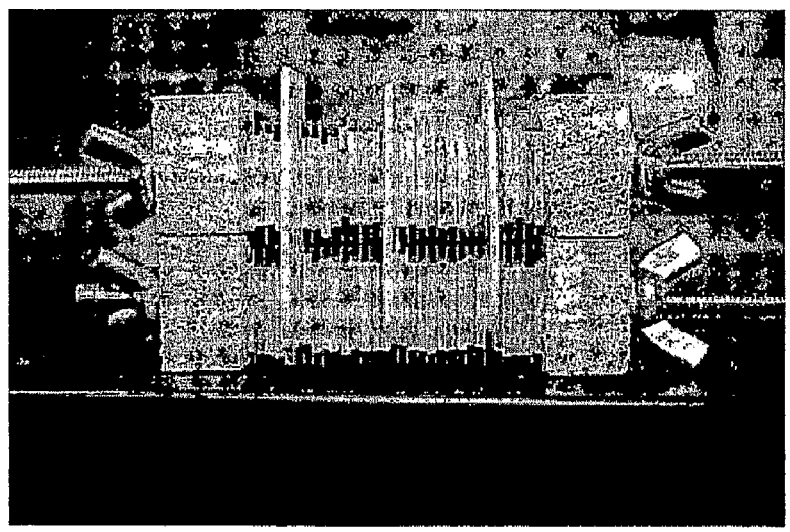
FIG. 5c shows a side view of tungsten slat assembly. The slats were 17 mm tall and 0.11 mm thick, and separated by either 1.27 or 2.54 mm of nylon. 1 or 2 stacks of slats were used to produce different slat heights (either 17 or 34 mm, respectively).
Figure 5D:
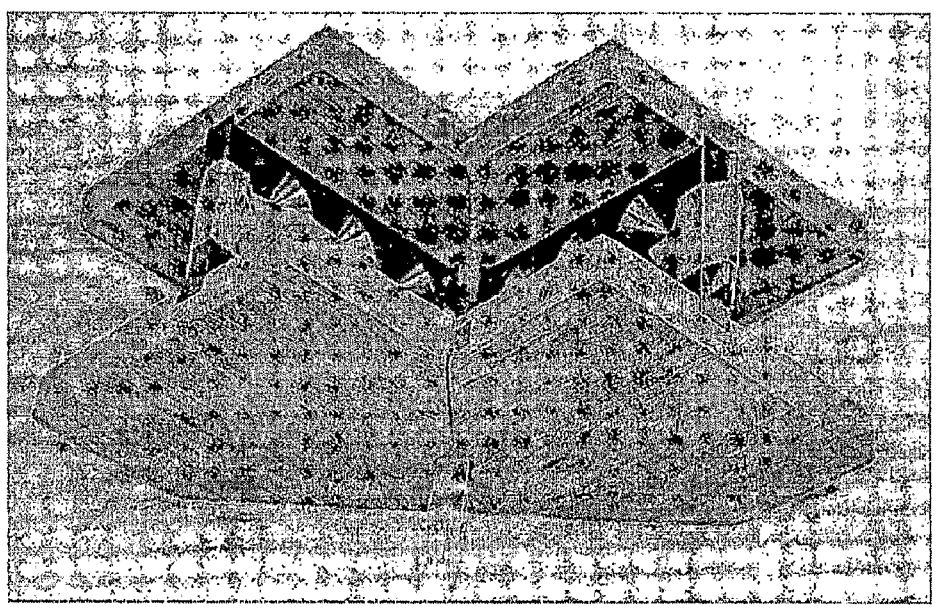
FIG. 5d shows a close-up of slit assembly, which was formed from two tungsten plates configured to form 90° acceptance angle and separated by either 2.03 mm (shown) or 4.06 mm.
Figure 5E:
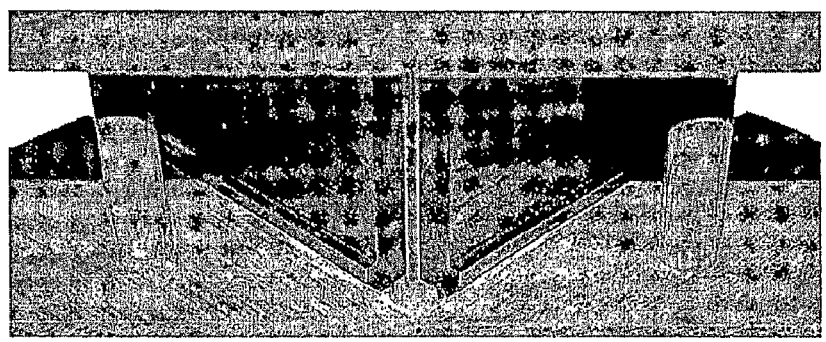
FIG. 5e shows a view of slit assembly of FIG. 5d from beneath slit.

To use preexisting material, the slit was formed from 2 tungsten plates separated by nylon spacers, obtaining a 90° acceptance angle as shown in FIGS. 5d and 5e. The gap between the plates (w in EQ. 17) is listed in Table 1. The slit ran parallel to the axial direction.

Figure 6A:
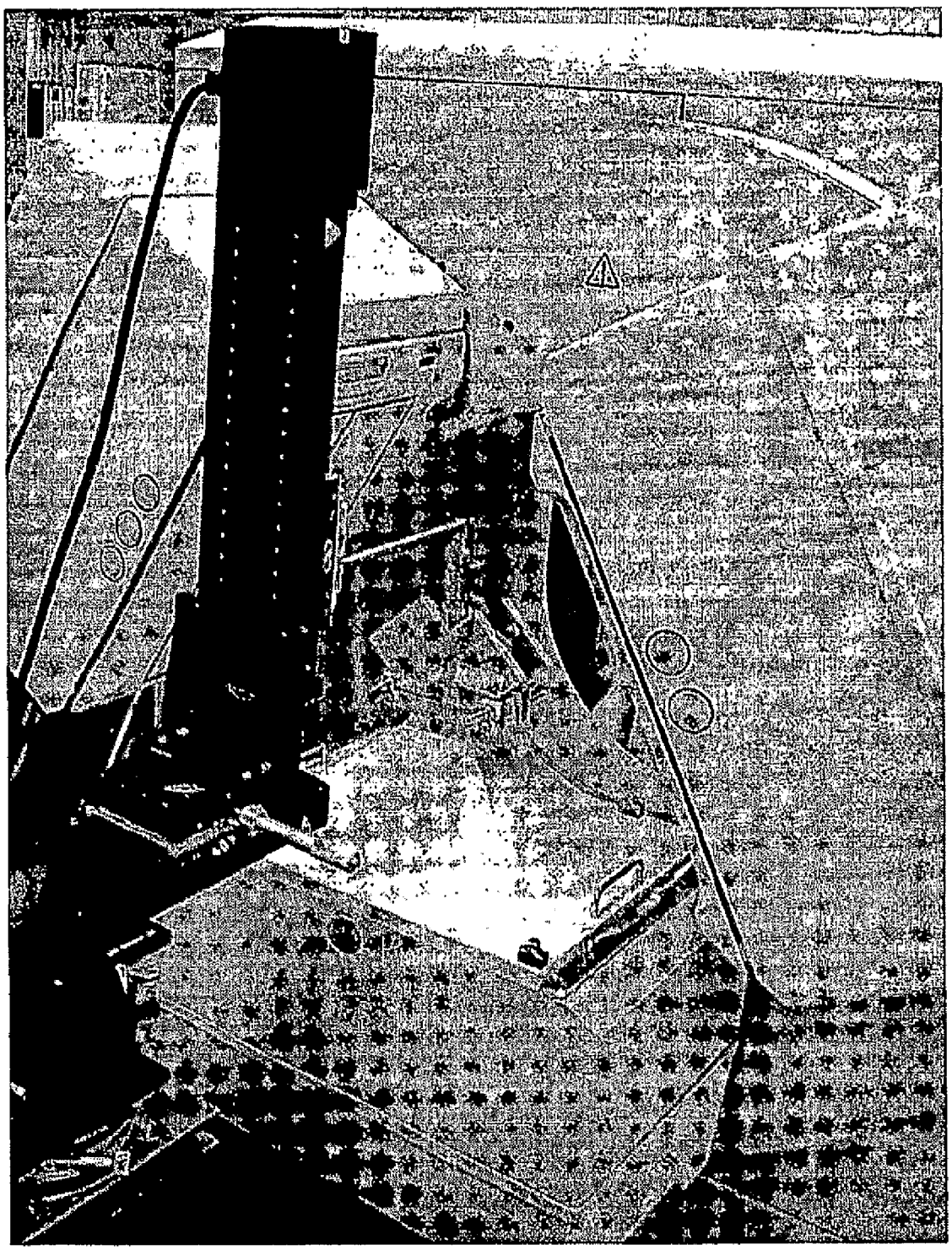
FIG. 6a shows Robotic stage was used to position point source above aperture slit (h=10-205 mm).
Figure 6B:
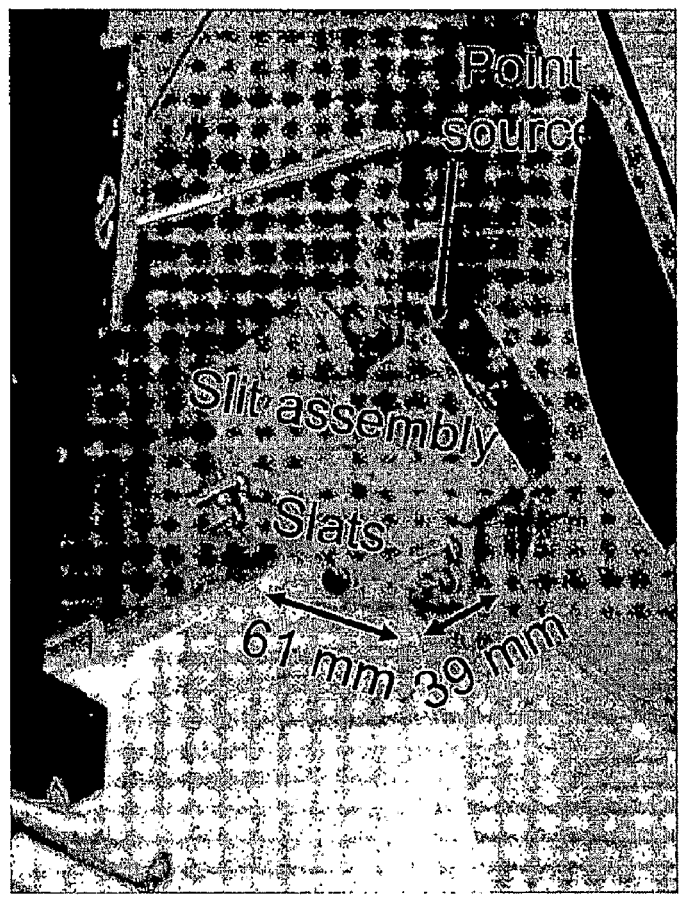
FIG. 6b shows a zoom of FIG. 6a with labeled slit assembly and slats; 39×61 mm opening in shielding is also indicated.

A point source ($^{57}$Co; 1.3 MBq [35 µCi]) in a "pen" marker was mounted on a vertical positioning stage (FIGS. 6a and 6b). The height above the slit was determined by lowering the pen until it came into contact with the support for the slats (FIG. 6c); the point source was 4 mm above the tip of the pen. The distance from the plane of the slit to the support was measured with calipers. The source was then axially centered over the hole in the shielding.

Data Acquisition: Projections of the $^{57}$Co point source were acquired for 60 s each at distances of ~10-205 mm above the aperture plane in increments of 5 mm for each of the configurations listed in Table 1. The energy window was set at 15%. The projections were 256×256 bins (1.11-mm edge length). These data were used for sensitivity and transaxial resolution measurements.

To smooth the axial profiles for a resolution measurement, a robotic stage moved the septa linearly in the axial direction over one period (d+t) during each view to average over one period of the slat-spacer pattern. This dedicated experimental run was used only for the measurement of axial resolution. Other acquisition parameters were identical to those described in the previous paragraph.

Figure 6C:
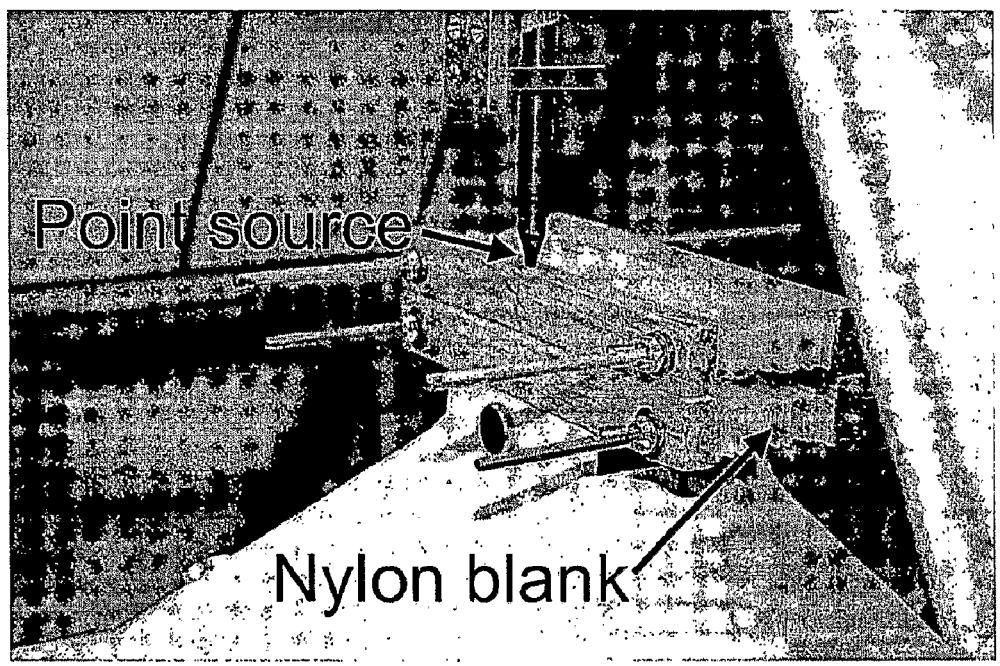
FIG. 6c shows FIG. 6a with a source brought into contact with support of "blank" slats as reference point in determining h.

An additional "blank" dataset was taken with a blank-septa assembly and without the aperture slit (FIG. 6c). The blanks were made of nylon and were similar to the tungsten-slat configuration except that the tungsten slats were removed. This dataset was used to determine normalization for sensitivity and focal length. Further, a dataset was acquired without the point source present to assess the background.

Sensitivity Normalization: The blank dataset was analyzed to determine the effective product of the source emission rate and the camera efficiency. The central 46 bins in each dimension (2,116 bins in total), covering an area of about 2,619 mm$^2$, were chosen as a region of interest. The counts in this region were fit as a function of h to the equation:

$$\text{Counts} = \frac{AC\varepsilon}{4\pi(h+f)^2} \quad \text{(EQ. 21)}$$

where A is the area of the region of interest (2,619 mm$^2$), C is the emission counting rate of the source per acquisition frame, ε is the overall system efficiency, and f is the distance from the aperture plane to the detector (i.e., the focal length). Thus, this equation is the flux of photons on area A times the efficiency of detection. This equation was fit for the product Cε and for f. Background was estimated by averaging the scan without a point source present and a region of interest at each h that was far from the projection through the slit. The number of counts in each experiment less background and corrected for attenuation in the nylon spacers (19% (4)) was then divided by this Cε to determine sensitivity. This sensitivity is equivalent to that for an idealized collimator that does not have attenuating spacers.

Resolution Measurement: For each experimental configuration at each value of h, the axial slices of a region of interest of the projection were summed to form a transverse profile, and the transaxial slices of that region were summed to form an axial profile. These profiles were corrected by subtracting a flat background, which was measured with the background scan. The maximum of each adjusted profile was determined. The full width at half maximum (FWHM) was then calculated by interpolating the location of the half maximums. The transverse resolutions were scaled to object space by dividing by the magnification f/h. Axial resolutions were not scaled, because axial magnification is unity.

Monte Carlo

Figure 4:
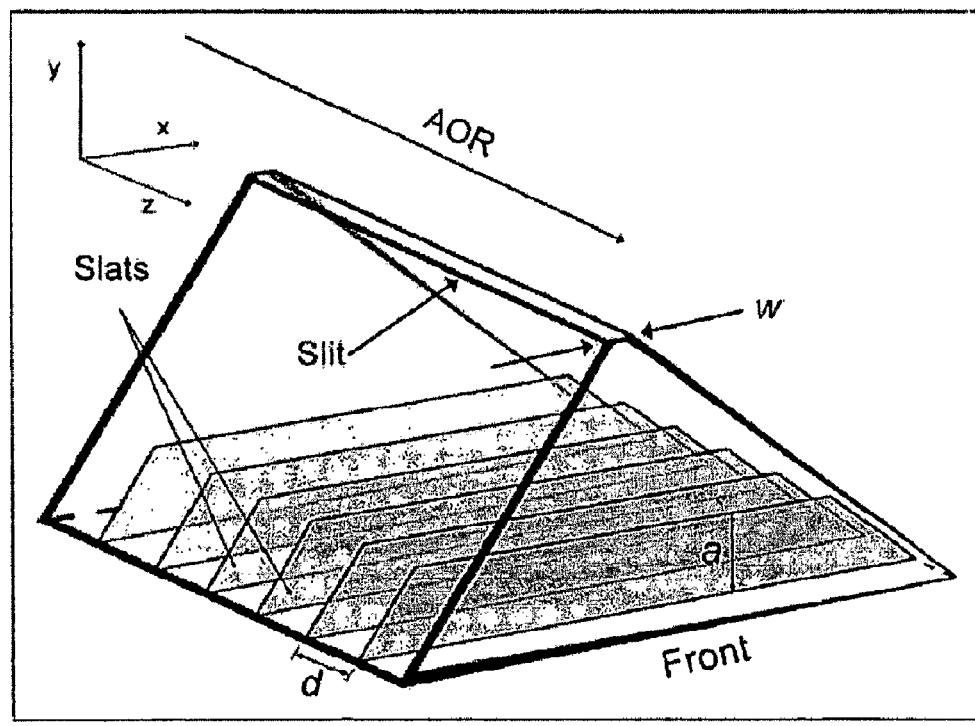
FIG. 4 shows a perspective conceptual drawing of slit-slat collimator. Slit, which is parallel to axis of rotation (AOR), provides transaxial collimation. Normals to slats are also parallel to AOR. Slat height, a; slat spacing, d; and slit width, w, are indicated. x-, y-, and z-axes represent transaxial, radial, and axial directions, respectively.

A Monte Carlo simulation was performed to model the slit-slat collimator. The model consisted of an infinite slit along the z direction and axial slats normal to this direction (FIG. 4). Each run modeled $5 \times 10^8$ photons emitted isotopically from a point source at each position h; the values of h ranged from 10 to 205 mm in steps of 5 mm. In one mode of the simulation, the collimator material was considered to be infinitely attenuating so that only photons that did not intersect any material in the slit or septa were counted; another mode allowed both slit penetration (linear attenuation coefficient of 4.95 mm$^{-1}$ (4)) and detector parallax (5) (linear capture coefficient of 0.374 mm$^{-1}$ (4)). Eight configurations were used (Table 1). For each configuration, t=0.11 mm. Further, each configuration was run with and without modeling the hole at the top of the lead box that was used for mounting the septa (FIG. 6b); this lead box limited the axial field of view. The purpose of the Monte Carlo that models the hole at the top of the lead box is for comparison with experimental data that are particular to the setup described herein. The purpose of the Monte Carlo without this modeling is for comparison with the more idealized theoretic form of EQ. 19.

Results

Figure 7:
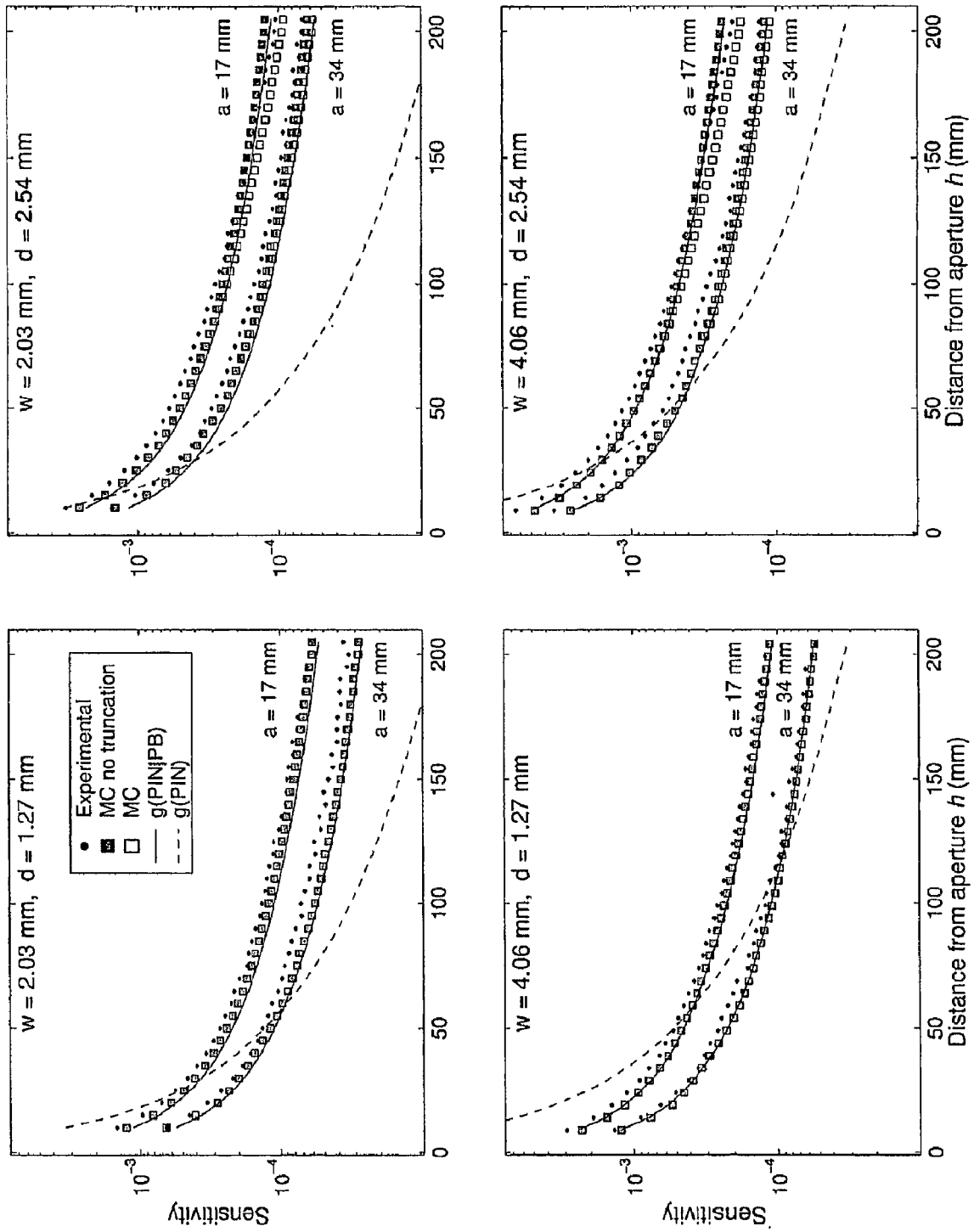
FIG. 7 shows sensitivity of slit-slat collimation. Experimental and Monte Carlo results (both with and without modeling of truncation from opening in shielding) are shown with g(pinhole|parallel-beam) and g(pinhole; k=1). The results are shown for w=2.03 mm (top) and w=4.06 mm (bottom) and also for d=1.27 mm (left) and d=2.54 mm (right). Within each plot, a 17 mm appears on top and a=34 mm appears on bottom. PB=parallel-beam; PIN=pinhole

The experimental and Monte Carlo results for sensitivity are shown in FIG. 7, with EQs. 3 and 5 for g(pinhole; k=1) and g(pinhole|parallel-beam), respectively. The experimental sensitivity was computed by dividing the net number of experimental counts in a 60-s frame by the product $C\epsilon$, which was measured to be $37.2 \times 10^6$ counts (0.620 MBq x·60 s) by fitting EQ. 21 to the blank-scan data. Two cases are shown for the Monte Carlo data. In one case, labeled in FIG. 7 as "MC," only photons passing through the opening at the top of the shielding were counted; this better matches the experimental conditions. In the other, labeled in FIG. 7 as "MC no truncation," the photons were not constrained to pass through the opening, matching the expectations of the slit-slat concept: a long slit complemented with axial septa. Both cases allow penetration of the tungsten aperture slit and slats. Although not shown in FIG. 7, Monte Carlo without penetration and not constrained to be within the shielding opening is consistent with EQ. 19.

Figure 8:
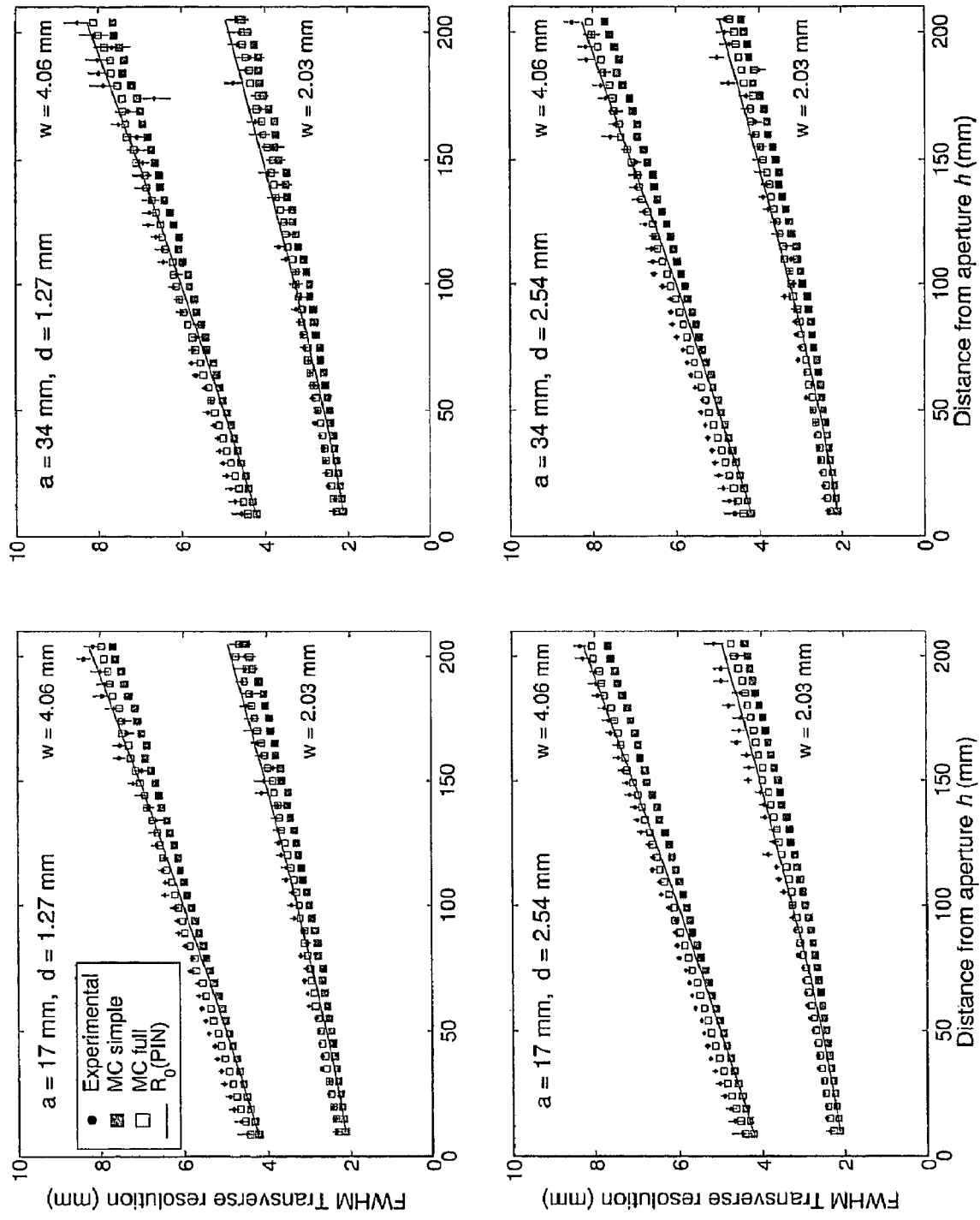
FIG. 8 shows transaxial resolution (FWHM) of slit-slat collimation. Experimental and Monte Carlo results (both with [full] and without [simple] modeling of penetration and parallax) are shown with $R_o$(pinhole). Results are shown for d=1.27 mm (top) and d=2.54 (bottom) and also for a=17 mm (left) and a=34 mm (right). Within each plot, w=2.03 mm appears on bottom and w=4.06 mm appears on top. PIN=pinhole.

The experimental and Monte Carlo results for transaxial resolution are shown in FIG. 8. These resolutions have been scaled to object space by multiplying the FWHM resolution on the detector by h/f. The statistical uncertainty was estimated through bootstrap re-sampling of the profiles. The Monte Carlo results show two cases. The case labeled "MC full" includes the effects of slit penetration and detector parallax on the resolution. The case labeled "MC simple" does not include these effects. The theoretic prediction of EQ. 17 for $R_o$(pinhole) is also shown.

Figure 9:
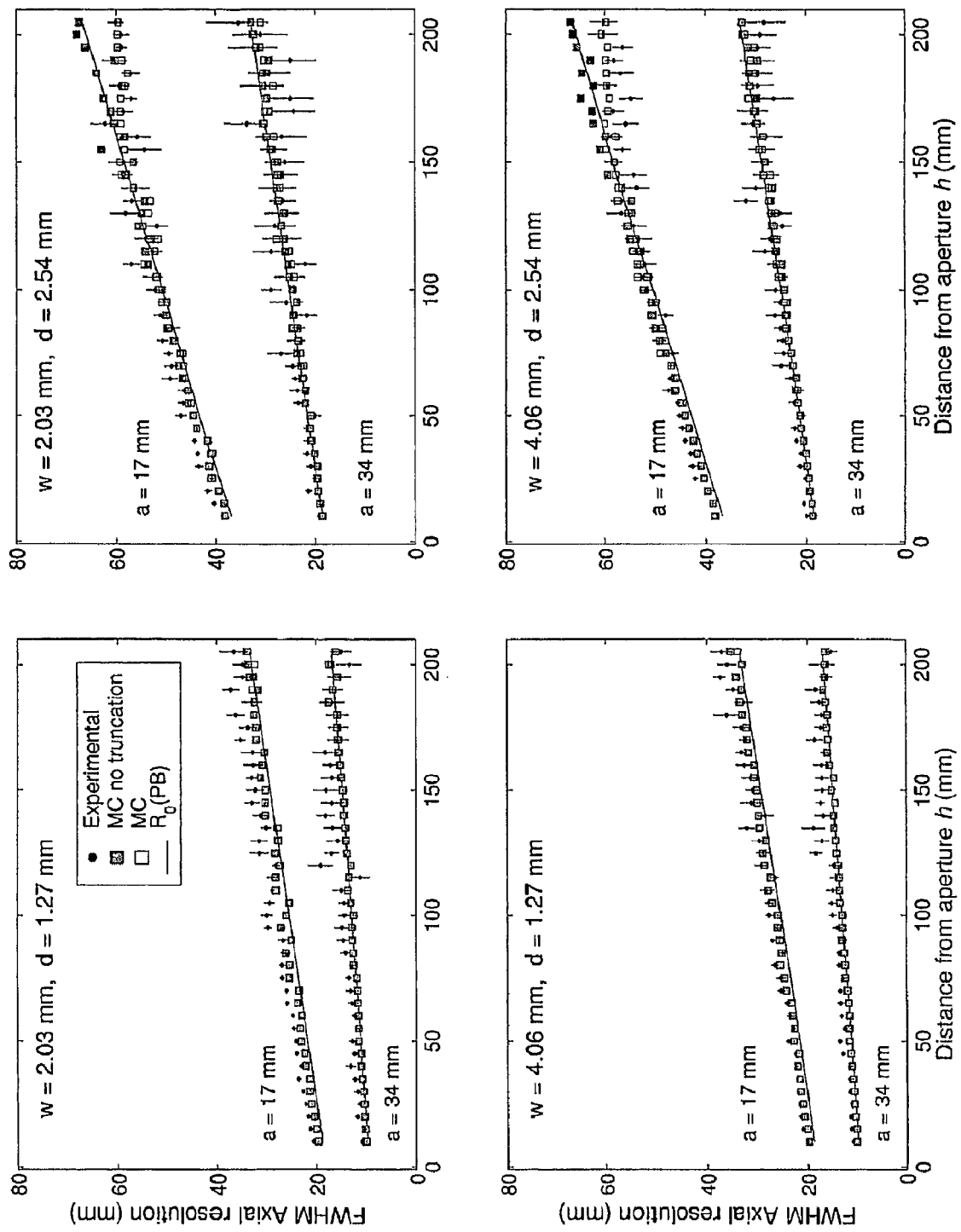
FIG. 9 shows axial resolution (FWHM) of slit-slat collimation. Experimental and Monte Carlo results (both with [full] and without [simple] modeling of axial truncation) are shown with $R_o$(parallel-beam). Results are shown for w=2.03 mm (top) and w=4.06 mm (bottom) and also for d=1.27 mm (left) and d=2.54 mm (right). Within each plot, a=17 mm appears on top and a=34 mm appears on bottom. PB=parallel-beam.

FIG. 9 shows the experimental results for axial resolution. These resolutions are the same on the detector and object planes. The statistical uncertainty was estimated through bootstrap re-sampling of the profiles. The Monte Carlo results show two cases. The Monte Carlo labeled "MC" is constrained to be within the shielding opening (i.e., it models truncation). "MC no truncation" does not include this effect. In addition, the theoretic prediction of EQ. 18 for $R_o$(parallel-beam) is also shown.

Discussion

Overall, the sensitivities for the 8 configurations shown in FIG. 7 agree with EQ. 19 over a large range of h and for values of w, d, and a varying by factors of 2. The Monte Carlo results also show consistency with the experimental data and EQ. 19. On the other hand, the experimental and Monte Carlo results are inconsistent with the form of g(pinhole) from EQ 3.

EQ. 19 by itself does not take into account the effect of slit penetration. The Monte Carlo results allow for this penetration, which increases sensitivity. When the Monte Carlo does not allow penetration, it agrees numerically very well with EQ. 19 (results are not shown for brevity). It may be possible that the effects of penetration can be well modeled by an effective diameter. By comparing Monte Carlo with and without penetration, one finds for $^{57}$Co and tungsten that $w_{eff}$=2.20 for w=2.03 mm and $w_{eff}$=4.20 for w=4.06 mm. Thus, penetration was found to be a relatively small component in this experiment. Monte Carlo data fall between the experimental and theoretic results, suggesting that penetration accounts for some of the difference between theory and experiment. Scatter, which is not included in the Monte Carlo or EQ. 19, is likely to account for at least some of the remaining difference.

For FIG. 7, top right and bottom right, where d=2.54 mm, the trend of the experimental data for a=17 mm does not track the trend of the Monte Carlo without truncation for values of h greater than about 100 mm. However, the trend matches that of the Monte Carlo with truncation, which counts only photons that pass within the hole at the top of the shielding. Thus, in these cases, the axial resolution is so large that some of the photons are truncated; indeed, axial resolution is expected to be larger for both larger d and smaller a (EQ. 18). Overall, EQ. 19 provides accurate predictions for the sensitivity within a small factor.

FIG. 8 shows that $R_o$(pinhole) of EQ. 17 yields a reasonable prediction for both the experimental and the Monte Carlo transverse-resolution data. For small values of h, EQ. 17 and the "simple" Monte Carlo tend to underestimate the experimental resolution because they do not include the effects of slit penetration and detector parallax, which have their greatest effects on resolution at small h; the "full" Monte Carlo includes these effects and agrees well with the data even at small h.

FIG. 9 shows that $R_o$(parallel-beam) of EQ. 18 yields a prediction that is consistent with both the experimental and the Monte Carlo data. However, the resolutions are inconsistent with the predictions of pinhole resolution, which are not shown. For comparison with the data in FIG. 9, $R_o$(pinhole) would need to be scaled by f/h because the results were calculated on the detector plane and $R_o$(pinhole) was calculated on the object plane. When scaled, the prediction would decrease with h because the projection size of a point decreases with h. In contrast, FIG. 9 shows that the resolution on the detector plane increases (degrades) with h. Further, whereas the data clearly increase with increasing d and decreasing a, the pinhole prediction does not.

For FIG. 9, top right and bottom right, when a=17 mm there is a deviation from the prediction of EQ. 18 when h is large. Monte Carlo data not modeling truncation continue to agree with EQ. 18, whereas Monte Carlo data modeling truncation follow the data. Thus, in the experimental configuration used, large values of h led to truncation that interfered with resolution measurements. Overall, the data suggest that EQ. 18 is a good model for axial resolution.

In the configuration used for the experiment, it was found that measuring axial resolution with a FWHM metric posed difficulties due to the appearance of shadows from the slats in the projection. These shadows resulted from relatively short septa (i.e., a was small) and from their being positioned near the slit rather than near the detector. The projections had several local minima, making the numeric determination of FWHM complicated. Consequently, a dedicated experiment was performed to measure axial resolution by "wobbling" the axial slats. That is, the slats were linearly moved in the axial direction by one period (d+t) during each projection view. This movement had the effect of averaging out the shadowing, resulting in the expected triangular shape of the profiles.

Limitations in the experimental apparatus caused truncation for large values of h when the axial resolution was large (d=2.54 mm; a=17 mm). Nylon may be removed or replaced by a less attenuating material. However, the use of nylon spacers was a convenient and readily available method for keeping the slats evenly spaced and straight.

Walrand et al. suggested theoretic values for resolution and sensitivity of this slit-slat collimator. The data herein show that those predictions were inaccurate for sensitivity. The predictions for transaxial resolution were accurate ($R_o$(pinhole) in FIG. 8) but can be improved by modeling slit penetration and detector parallax. It is unclear if Walrand et al. intend for the pinhole resolution formula (EQ. 17) to be applied in the axial direction as well as in the transverse direction. The data make clear that application in the axial direction would not be accurate.

The implications of the sensitivity and resolution formulas suggest that this collimator may be less useful for small-animal imaging than is a pinhole collimator because the sensitivity does not increase as rapidly for a small radius of rotation and the axial resolution does not improve as rapidly because there is no axial magnification. On the other hand, this collimator is likely to have a niche between pinhole collimation and parallel-beam/fan-beam collimation because the sensitivity improves with decreasing distance (unlike parallel-beam and fan-beam) but does not drop as rapidly as for pinhole collimation as distance increases. Further, transaxial magnification aids transaxial resolution by mitigating the effect of intrinsic detector resolution. Lastly, because the collimator provides complete data with a circular orbit, there is no artifactual axial blurring as in pinhole SPECT using a single circular orbit.

Thus, slit-slat collimation may be well described as a hybrid of pinhole and parallel/fan-beam collimation. Its on-axis sensitivity is well described as the geometric mean of these collimators (EQ. 19). Its resolution is described well by the pinhole resolution formula (EQ. 17) in the transaxial direction. Axial resolution is consistent with the parallel-beam formula (EQ. 18). Because this collimator has a distance dependence of $h^{-1}$ for its sensitivity, it falls between pinhole and parallel/fan-beam. It is likely to be useful in intermediate scenarios such as imaging of limbs, the breast, medium-sized animals, and, possibly, the brain.

The main objective of the present work is to model the geometric sensitivity of slit-slat collimators. In the following, an analytical expression for the sensitivity of a slit-slat collimator valid both on- and off-axis is derived and validated by comparison to the aforementioned Monte Carlo simulation and the experimental data. More specifically, the expression derived shows both the dependence on h and θ, both of which are needed in the comparison of the different orbits being considered for use with slit-slat collimation. An attempt to further refine the model by providing some means to incorporate at least approximately penetration is presented next: it involves the use of the effective channel length used to model penetration in parallel and converging collimators and the derivation of a sensitivity-effective slit width. For completeness, its natural companion, the resolution effective slit width is also derived. The resulting formulas are then validated against literature experimental data as well as by Monte Carlo simulation.

The availability of sensitivity formulas is expected to benefit collimator design, simulation, and image reconstruction algorithms. It is particularly important in the case of slit-slat collimation because this technique is advantageous compared to parallel- and convergent-beam collimation only when the radius of rotation is less than a critical value that depends on sensitivity.

Mathematical Derivation

Sensitivity is defined herein as the fraction of the photons emitted by a point source that reaches the detector. This is often referred to as the geometrical sensitivity of the collimator because it excludes effects such as detection efficiency. Scatter and penetration are initially not considered.

Figure 10:
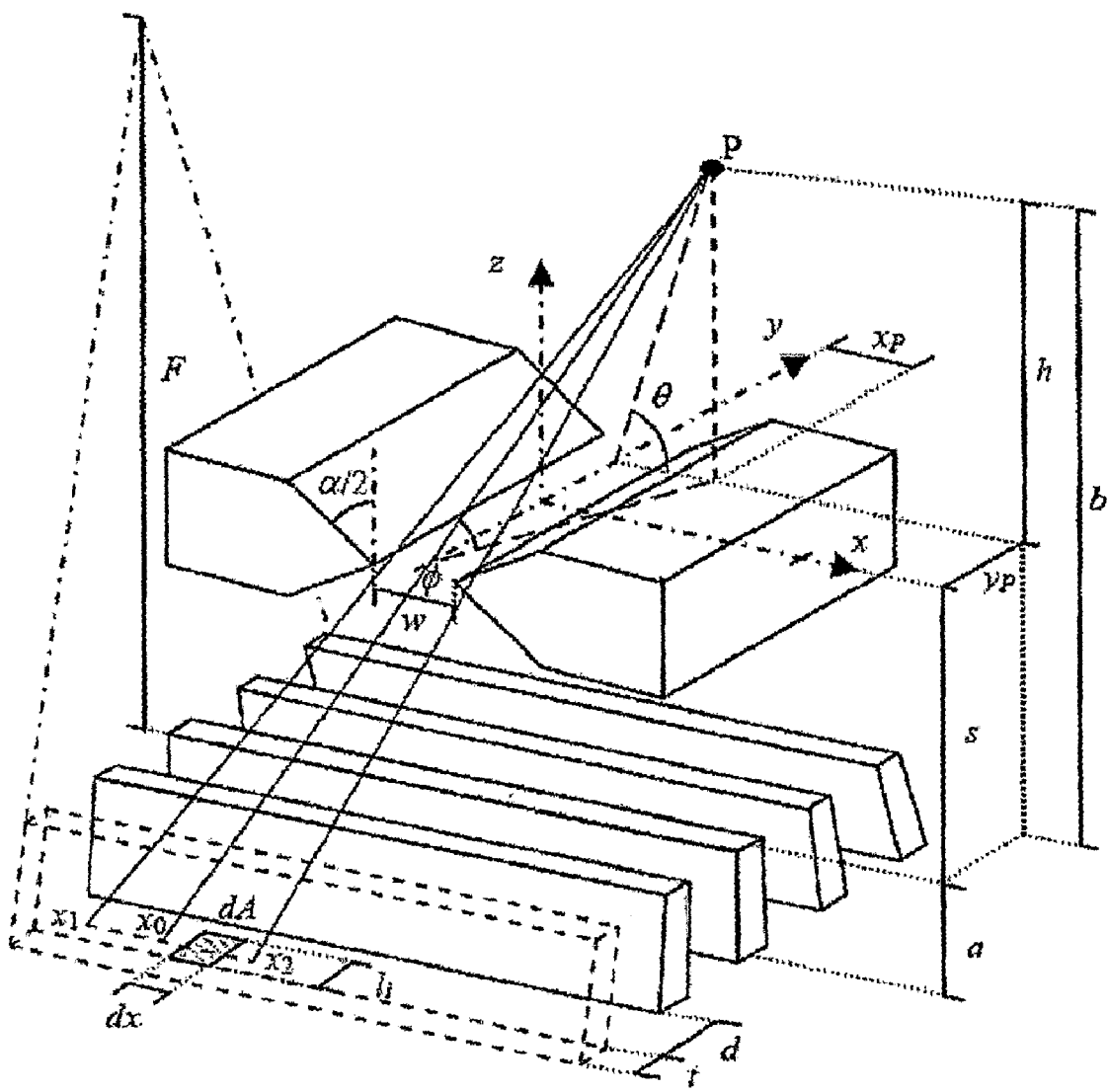
FIG. 10 shows slit-slat geometry.
Figure 11A:
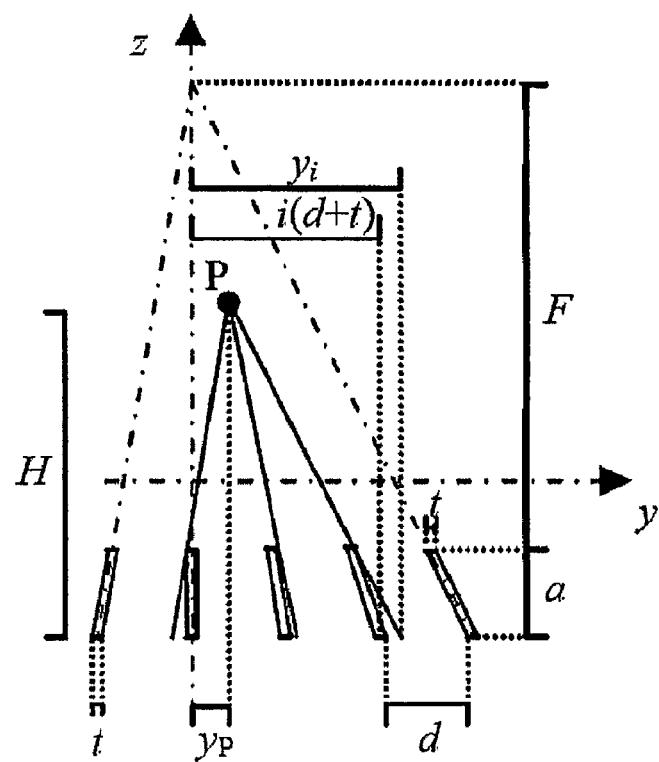
FIG. 11a shows a calculation of the illuminated portion of the $i^{th}$ slat. Photon paths are projected on a plane normal to the x axis. Photons illuminate the first channel to the right of the z axis without intercepting the top of the slat. For this channel $y_i$ cannot be calculated with EQ. 24 and, thus, is not included in EQ. 24; rather it is handled separately from all other channels. Note that for the case illustrated, the channel associated to i=0 is the first to the left of the z axis because in it is projected the top of the slat with y coordinate 0 on the plane z=−(s+a); the channel i=1 is the second to the right of the z axis because in it is projected the top of the slat with y coordinate 1 (d+t).

For consistency with previous literature and with reference to FIG. 10, it is possible to define the y axis to lie along the centerline of the slit, with the point source in the quadrant of space x, z≧0. The x axis is also in the plane of the slit, which has width w and is considered infinite in the y direction. The point source is located at $P(x_P=h \cot \theta, y_P, z_P=h)$. The center planes of the septa forming the channels of the slat assembly intersect at the line (y=0, z=F−s), where F is the focal length of the slat assembly (defined as the distance from the focal line of the slat assembly to the side of the slat assembly closest to the slit) and s is the distance between the edge of the slat assembly nearest the slit and the plane of the slit. The center planes of the septa are separated, on the side of the assembly facing the detector (the area of this side of the assembly is indicated by $L_x \times L_y$, not shown in FIG. 10) by a distance d+t, where these symbols, as well as a, are immediately analogous to those used for the parallel-hole collimator and are illustrated in FIG. 10 and FIG. 11a.

General Expression

The infinitesimal solid angle subtended by the area element dA on the plane of the detector side of the slat (see FIG. 10) is:

$$d\Omega = \frac{dA}{H^2} \sin^3 \phi \quad \text{(EQ. 22)}$$

where H≡h+s+a=b+a, φ is the angle between the xy plane and the photon path connecting the point source P with dA, and b≡h+s is the distance of the point source from the top of the slat assembly (as is consistent with fan-beam collimator literature). With reference to FIG. 11a, the photon path connecting the point source to the top left (right) corner of the $i^{th}$ septum intersects the plane z=−(s+a) at:

$$y_i = \frac{H}{H-a}\left[i(d+t)\frac{F}{F+a} \mp \frac{t}{2} - y_P\right] + y_P \quad \text{(EQ. 23)}$$

where i(d+t) is the y coordinate on the plane z=−(s+a) of the center of the $i^{th}$ septum (i∈Z) and t is constant with z for all slats, which implies tapered channels. Except for one that is completely illuminated, channels are illuminated either on their left or right side, depending on the location of the point source. The width $l_i$ of the illuminated area of the $i^{th}$ channel is given, respectively, by $\pm y_i+(1\mp i)(d+t)-t/2$, in which the expression for $y_i$ is inserted to obtain:

$$l_i = d - \frac{at}{2(f+h)} \pm \frac{a}{H-a}\left[\frac{i(d+t)}{M} - y_P\right] \quad \text{(EQ. 24)}$$

where $M \equiv (F+a)/|F-b|$ is the magnification provided by the slat assembly on the plane $z=-(s+a)$. For the completely illuminated channel, which is not included in EQ. 24, $l_c=d$.

Area elements are chosen so that $dA=l_i\,dx$. It is also convenient to define symbols for the slit magnification m, given by $m=(s+a)/h$, and the abscissa $x_0$ of the projection of the center of the slit on the plane $z=-(s+a)$, given by $x_0=-x_P\,m$. With these definitions, the projection of the edges of the slit on the plane $z=-(s+a)$ are given by $x_{2,1}=x_0\pm w(1+m)/2$. Of course, $x_{2,1}$ are limited, respectively, to $\pm L_x/2$. From EQ. 22 the sensitivity of the $i_{th}$ channel is given by:

$$g_i = \frac{1}{4\pi H^2}\int_{x_1}^{x_2} l_i \sin^3\phi\, dx \quad \text{(EQ. 25)}$$

where $l_i$ is given by EQ. 24 in which the term proportional to at is neglected for simplicity (usually $a \ll b$ and $t \ll d$). Also, from FIG. 10, $$\sin\phi \cong \left[\frac{(x-x_P)^2}{H^2} + \frac{(y_i - y_P)^2}{H^2} + 1\right]^{-\frac{1}{2}} \quad \text{(EQ. 26)}$$

which is exact on the side of dA determined by the projection of the top edge of a slat.

Total sensitivity is obtained by summing EQ. 25 over all illuminated channels:

$$g = \frac{1}{4\pi H^2}\sum_i\left\{\int_{x_1}^{x_2} l_i \left[\frac{(x-x_P)^2}{H^2} + \frac{(y_i - y_P)}{H^2} + 1\right]^{-\frac{3}{2}} dx\right\} \quad \text{(EQ. 27)}$$

The summation limits are found by setting $dA \geq 0$, which implies $d \geq li \geq 0$. In the two cases above (i.e. illumination on the left or right side of the channel), this inequality is:

$$l_1 \equiv \frac{M}{d+t}\left(y_P - \frac{H-a}{a}d\right) \leq i \leq \frac{M}{d+t}y_P \equiv I_0 \quad \text{(EQ. 28)}$$

$$I_0 < i \leq \frac{M}{d+t}\left(y_P + \frac{H-a}{a}d\right) \equiv I_2$$

Thus, in EQ. 27, $i \in \{(I_1, I_1+1, \ldots, I_2-1, I_2; I_c\}$, where $I_c$ indicates that the completely illuminated channel must also be included in the summation. In EQ. 27 the two expressions for $l_i$ (EQ. 24) must be used; they are valid, respectively, for $I_1 \leq i \leq I0$ and $I0 \leq i \leq I2$. Next, it is convenient to express x, which is constrained between $x_1$ and $x_2$, as the sum of $x_0$ with a deviation $\Delta x$ ranging from $\Delta x_1 \equiv \max[-wH/(2h), -L_x/2+x_0]$ to $\Delta x2 \equiv \min[wH/(2h), L_x/2-x_0]$. Substitution of $I_0$ in EQ. 23 gives $y_0 \equiv \pm M y_P$; analogously, substitution of $I_2$ and $I_1$ in EQ. 23 gives $y_{2,1} \equiv y_0 + \Delta y_{2,1}$, where $\Delta y_{2,1} \equiv MHFd/[a(F+a)]$. As $\Delta x$ was defined to replace x, so $\Delta y \equiv y_i - y_0$ is used to replace $y_i$; $\Delta y$ ranges from $\Delta y_1$ to $\Delta y_2$. Substitution of $x=x_0+\Delta x$ and $y_i=y_0+\Delta y$ into EQ. 27 gives:

$$g = \frac{1}{4\pi H^2}\sum_i\left\{\int_{\Delta x_1}^{\Delta x_2} l_i \left[1 + \frac{(x_0-x_P)^2}{H^2} + \frac{(y_0-y_P)^2}{H^2} + \frac{2(x_0-x_P)\Delta x + \Delta x^2}{H^2} + \frac{2(y_0-y_P)\Delta y + \Delta y^2}{H^2}\right]^{-\frac{3}{2}} d\Delta x\right\}. \quad \text{(EQ. 29)}$$

It is now convenient to define:

$$\sin\phi_0 \equiv \left[\frac{(x_0-x_P)^2}{H^2} + \frac{(y_0-y_P)^2}{H^2} + 1\right]^{-\frac{1}{2}} \quad \text{(EQ. 30)}$$

to reach the more compact form $$g = \frac{1}{4\pi H^2}\sum_i\left\{\int_{\Delta x_1}^{\Delta x_2} l_i \left[\frac{1}{\sin^2\phi_0} + \frac{2(x_0-x_P)\Delta x + \Delta x^2}{H^2} + \frac{2(y_0-y_P)\Delta y + \Delta y^2}{H^2}\right]^{-\frac{3}{2}} d\Delta x\right\} \quad \text{(EQ. 31)}$$

This expression is still valid for all magnifications. Integration leads to a complicated result that then needs summation. Numerical evaluation is possible, but it is more useful to analyze cases in which realistic approximations do not compromise accuracy. This leads to forms more favorable to manipulation and the understanding of underlying physics. In most, but not all, common cases, either or both $\Delta x/H$ and $\Delta y/H$ are relatively small.

Sensitivity Off the Focal Line of the Slat Assembly

The width of the illuminated portion of the detector along the y axis is given by $y_2-y_1=2$ MHFd/[a(F+a)]. The region in which M is sufficiently small that $(y_2-y_1)/H=2Fd/[a|F-b|] \ll 1$ is herein named the off-focus region. By definition, in this region $|\Delta y|/H \ll 1$; therefore EQ. 31 reduces to:

$$g_{off} = \frac{\sin^3\phi_0}{4\pi H^2}\sum_i l_i\int_{\Delta x_1}^{\Delta x_2}\left[1 + \left(-2\cot\theta\frac{\Delta x}{H} + \frac{\Delta x^2}{H^2}\right)\sin^2\phi_0\right]^{-\frac{3}{2}} d\Delta x \quad \text{(EQ. 32)}$$

where $$\cot\theta \equiv \frac{x_P - x_0}{H} \quad \text{(EQ. 33)}$$

has been used. The integral in EQ. 32 is independent of i, so it is a common factor in the summation. Using EQ. 24, the much simpler product:

$$g_{off} = \frac{\sin^3\phi_0}{4\pi H^2} \sum_i I_i \int_{\Delta x_1}^{\Delta x_2} \left[1 + \left(-2\cot\theta\frac{\Delta x}{H} + \frac{\Delta x^2}{H^2}\right)\sin^2\phi_0\right]^{-\frac{3}{2}} \quad \text{(EQ. 34)}$$

$$d\frac{\Delta x}{H}\left\{\sum_{i=I_1}^{I_2+1} d + \frac{a}{H-a}\left[\sum_{i=I_1}^{I_0}\left(i\frac{(d+t)}{M} - y_P\right) - \sum_{i=I_0}^{I_2}\left(i\frac{(d+t)}{M} - y_P\right)\right]\right\}$$

is reached. The term $i=I_2+1$ in the first summation in the curly brackets accounts for the completely illuminated channel $I_c$. Inclusion of $I_0$ in both the second and third summation is possible because the associated term is zero. Integration over $\Delta x/H$ is possible via the identity:

$$\int \frac{A+Bx}{(1+2Cx+Dx^2)^{\frac{3}{2}}}dx = \frac{B-AC+(CB-AD)x}{(C^2-D)\sqrt{1+2Cx+Dx^2}} \quad \text{(EQ. 35)}$$

which is valid for $D \neq 0$, resulting in:

$$g_{off} = \frac{1}{4\pi H}\frac{\sin^3\phi_0(C_2-C_1)}{1-\cot^2\theta\sin^2\phi_0}\left\{\frac{a}{H-a}\left[\frac{d+t}{M}\left(\sum_{i=I_1}^{I_0}i - \sum_{i=I_0}^{I_2}i\right) + y_P(I_2-2I_0+I_1)\right]\right\} \quad \text{(EQ. 36)}$$

where $$C_{2,1} \equiv \frac{\eta_{2,1} - \cot\theta}{\sqrt{1 - 2\eta_{2,1}\cot\theta\sin^2\phi_0 + \eta_{2,1}^2\sin^2\phi_0}} \quad \text{(EQ. 37)}$$

with $\eta_{2,1} \equiv \Delta x_{2,1}/H$. With the definitions of $\Delta x_{2,1}$ this is:

$$\eta_1 = \max[-w/(2h), -L_x/(2H) + x_0/H] \quad \text{(EQ. 38)}$$

and $$\eta_2 = \min[w/(2h), L_x/(2H) - x_0/H] \quad \text{(EQ. 39)}$$

Thus, unless truncation is present, $\eta$ is the ratio of half a slit width to the distance from the plane of the slit. Next, the formula for the sum of consecutive integers:

$$\sum_{i=p}^{q} i = \frac{(q+p)}{2}(|q-p|+1) \quad \text{(EQ. 40)}$$

is applied with the equality $2I_0 = I_1 + I_2$ (which follows directly from the definitions of $I_0$, $I_1$ and $I_2$) to reach:

$$g_{off} = \frac{1}{4\pi H}\frac{\sin^3\phi_0(C_2-C_1)}{1-\cot^2\theta\sin^2\phi_0}\left[\begin{array}{c}d(I_2-I_1+2) + \\ \frac{a}{H-a}\frac{d+t}{M}\left(\begin{array}{c}2I_0^2 - I_1^2 - \\ I_2^2 + I_1 - I_2\end{array}\right)\end{array}\right] \quad \text{(EQ. 41)}$$

which, again with the definitions of $I_1$, $I_0$ and $I_2$, is $$g_{off} = \frac{Md^2}{4\pi(d+t)a}\frac{\sin^3\phi_0(C_2-C_1)}{1-\cot^2\theta\sin^2\phi_0}\left(\frac{H-a}{a} + \frac{a}{H}\frac{d+t}{Md}\right) \quad \text{(EQ. 42)}$$

When the approximation $d/(d+t) \approx 1$ is made in the last term, the definition of M and some algebra lead to:

$$g_{off} = \frac{d^2}{4\pi(d+t)a}\frac{\sin^3\phi_0(C_2-C_1)}{1-\cot^2\theta\sin^2\phi_0}\frac{F}{|F-b|} \quad \text{(EQ. 43)}$$

This expression is valid far from the focal line of the slat assembly. The last term is recognized to be the same introduced to adapt parallel beam formulas to converging (R. A. Moyer, "A low-energy multihole converging collimator compared with a pinhole collimator," *J. Nucl. Med.*, vol. 15, pp. 59-64, 1974) and diverging (G. Muehllehner "A diverging collimator for gamma-ray imaging cameras," J. Nucl. Med., vol. 10, pp. 197-201, 1969) beam geometry. Noticeable complexity is hidden in the constants $C_1$ and $C_2$. A simpler form is reached if the source is not too close to the slit.

Simplified Expression: Standard Use

The standard-use region is defined as that part of the off focus region which is also far enough from the slit that $h \gg w$. This condition implies $\eta_2 = -\eta_1 = w/(2h) \equiv \eta \to 0$. In the standard-use region, thus, the radical in EQ. 37 can be expanded in Taylor series. To third order:

$$C_2 - C_1 \approx 2\eta(1-\cot^2\theta\sin^2\phi_0)\left[1 + \sin^2\phi_0(5\cot^2\theta\sin^2\phi_0 - 1)\frac{\eta^2}{2}\right] \quad \text{(EQ. 44)}$$

If only the first order term in $\eta$ is considered, the following first order approximation to EQ. 43 is obtained:

$$g_{su} = \frac{wd^2}{4\pi(d+t)ah}\sin^3\phi_0\frac{F}{|F-b|} \quad \text{(EQ. 45)}$$

This expression can be obtained directly from EQ. 27 by setting $\sin\phi = \sin\phi_0$, i.e. a constant. This means that it is possible to use EQ. 45 whenever modeling the variation of the $\sin^3\phi$ term over the illuminated area is not necessary.

Close to the slit, the condition $h \gg w$ is not satisfied. In this case, indicated as near-field, EQ. 45 does not provide accurate predictions. An evident symptom is that $g_{su} \to +\infty$ for $h \to 0$. A test to evaluate if other formulas should be used instead is provided below, which also derives the applicable sensitivity expressions.

Parallel Slats

The important case of parallel slats is obtained in the limit $F \to +\infty$. In this case $M \to 1$ and $y_0 \to y_P$. EQ. 31 and all ensuing equations become independent of $y_P$, as intuition suggests. At the same time, from EQ. 30 and EQ. 33 or direct inspection of FIG. 10, $\phi_0 \to \theta$. With these considerations, for a parallel slat collimator in the standard-use region EQ. 45 reduces to:

$$g_{sup} = \frac{wd^2}{4\pi(d+t)ah}\sin^3\theta \quad \text{(EQ. 46)}$$

In the case of a parallel slat assembly M is always 1. If the focal length F is instead finite, as the point source approaches the focal line M diverges and a different formula is eventually needed. This case, which is that of the focal region, is treated below.

Diverging Slat Assembly

The focal length enters all equations only from the ratio $F/(F+a)$ in (4). This ratio is the expression of the ratio of the pitches on the patient and the detector side of the slat assembly, i.e. $\Delta y_P/\Delta y_D$. From FIG. 11b, for a diverging slat assembly, $\Delta y_P/\Delta y_D = FD/(FD-a)$, where FD is a positive quantity representing the focal length measured, consistently with F, from the plane $z=-s$. Setting $F=-FD$ shows that $\Delta y_P/\Delta y_D = -F/(-F-a) = F/(F+a)$, i.e. the same expression for $\Delta y_P/\Delta y_D$ is found for a diverging slat assembly. Therefore all formulas derived are also valid for diverging slat assemblies, with the convention that F assumes a negative value.

Diverging collimators may be of interest for use with high-resolution small-area collimators to achieve a field of view larger than the detector's area.

Effective Slit Widths

EQ. 45 and EQ. 46 only account for geometric sensitivity, but in experimental reality penetration contributes to sensitivity. Penetration is difficult to handle thoroughly with analytical models. A solution that has gained wide acceptance for parallel and converging collimators is to replace the channel length a with an equivalent length $a_c = a - 2/\mu$, where $\mu$ is the linear attenuation coefficient of the material. For pinhole collimators it has been shown that the effects of penetration on sensitivity and resolution can be included through the concept of sensitivity- and resolution-effective diameters. In the following, a sensitivity- and a resolution-effective slit width are calculated for a slit-slat collimator. These expressions are expected to help model the effects of slit penetration on sensitivity and resolution. Of course, slit penetration needs to successively be combined with a model of slat penetration to model total penetration.

Sensitivity-Effective Slit Width

The sensitivity-effective width $w_{se}$ is defined as the width that a (hypothetical) slit not affected by penetration must have to pass the same number of photons as a real slit. An exact calculation in a general case is rather complex, but fortunately in typical imaging situations only a relatively narrow part of the photon beam contributes counts; this implies that the photon flux $\Phi$ can be treated as constant over the area of the slit that passes photons. Furthermore, it is possible to assume that all photons have the same incidence angle $\phi_0$. With these assumptions it is possible to calculate with a ray-tracing technique that the length of the intersection of the path of photons with the material forming the slit is:

$$\Delta L = \frac{2}{\sin\phi_0} \frac{\cot\frac{\alpha}{2}}{1 - \cot^2\frac{\alpha}{2}\cot^2\theta}\left(|x| - \frac{w}{2}\right) \quad \text{(EQ. 47)}$$

for $|x| \geq w/2$ and 0 otherwise. Here $\alpha$ is the full acceptance angle of the slit (FIG. 10).

The total sensitivity $g_{tot}$ of a slit affected by penetration is given by the sum of the geometric sensitivity $g_g$, due to photons passing through the open part of the slit, and the penetrative sensitivity $g_{pen}$, due to photons passing through the material forming the aperture:

$$g_{tot} = g_g + g_{pen} = \iint \Phi \exp(-\mu\Delta L)dxdy/\iint \Phi dxdy \quad \text{(EQ. 48)}$$

where the integrals extend over the area where impinging photons eventually contribute to sensitivity. Since the slat assembly passes only photons reaching the plane at the bottom of the slat assembly with $y_1 < y < y_2$ (again obtained by setting $dA=0$), the integral in dy, which is calculated on the plane of the slit, has limits $y_{2,1}\,h/H$:

$$g_{tot} = \frac{\int_{y_1\frac{h}{H}}^{y_2\frac{h}{H}}\int_{|x|<\frac{w}{2}}dxdy + \int_{y_1\frac{h}{H}}^{y_2\frac{h}{H}}\int_{|x|<\frac{w}{2}}\exp(-\mu\Delta L)dxdy}{\iint dxdy} \quad \text{(EQ. 49)}$$

From the definition of sensitivity-effective width, this sensitivity is set equal to that of a slit of width $w_{se}$ not affected by penetration (ideal case), which has the sensitivity $g_{id}$:

$$g_{id} = \frac{\int_{y_1\frac{h}{H}}^{y_2\frac{h}{H}}\int_{|x|<\frac{w_{se}}{2}}dxdy}{\iint dxdy} = 2\frac{(y_2-y_1)hw_{se}}{H\iint dxdy} \quad \text{(EQ. 50)}$$

where the integration area at the denominator (and numerator, before simplification) is the same as in the previous case.

Substitution of EQ. 47 into EQ. 49 and integration gives:

$$g_{tot} = 2\frac{(y_2-y_1)h}{H\iint dxdy}\left[w + \frac{1}{\mu}\left(1 - \cot^2\frac{\alpha}{2}\cot^2\theta\right)\sin\phi_0\tan\frac{\alpha}{2}\right] \quad \text{(EQ. 51)}$$

Comparison to EQ. 50 gives the sensitivity-effective slit width $$w_{se} = \left[w + \frac{1}{\mu}\left(1 - \cot^2\frac{\alpha}{2}\cot^2\theta\right)\sin\phi_0\tan\frac{\alpha}{2}\right] \quad \text{(EQ. 52)}$$

Finally, slit penetration is modeled by substituting $w_{se}$ for w in the sensitivity formula of interest.

Unlike for the slit, penetration of the slat occurs mostly along the y axis. On the basis of the obvious geometric similarity with parallel-hole collimators, it is hypothesized that penetration of the slat can be modeled by the same means, i.e.

by replacing a with $a_e = a - 2/\mu$. The use of both $w_{se}$ and $a_e$ in the applicable sensitivity formula is expected to model all penetration.

Resolution-effective Slit Width

For completeness and to take advantage of the formula developed for ΔL the natural companion of the sensitivity effective slit width is derived next. The resolution-effective slit width $w_{re}$ is defined as the width that a (hypothetic) slit not affected by penetration must have to result in the same Full Width at k Maximum (FWkM) of the point spread function as a real slit. This width is measured in the direction perpendicular to the slit, i.e. the x axis in FIG. 10. The profile of the point spread function in this direction is given by $\exp[-\mu\Delta L(x)]$, with $\Delta L(x)$ given by EQ. 47. The width at k maximum is obtained by solving for $x_{a,b}$ the equation $\exp[-\mu\Delta L(x)] = k$. The resolution-effective diameter $w_{re}$ is obtained from the difference $x_b - x_a$ and is:

$$w_{re} = w - \frac{\ln k}{\mu} \sin\phi_0 \cot\frac{\alpha}{2}\left(\tan^2\frac{\alpha}{2} - \cot^2\theta\right) \quad \text{(EQ. 53)}$$

where k=0.5 if a half-maximum measurement is sought. In the case $y_0 = y_P$, for which $\phi_0 = \theta$, the geometry becomes planar and identical to that of the resolution-effective diameter of a double-knife edge pinhole in the parallel direction. Correctly, under these conditions, EQ. 53 is identical in the two cases. For the same reason, it is expected that the expression of $w_{re}$ for slits with asymmetric profiles is the same as the literature expression of $w_{re}$ in the parallel direction for asymmetric profiles of the pinhole (R. Accorsi and S. D. Metzler, "Resolution-effective diameters for asymmetric-knife-edge pinhole collimators," IEEE Trans. Med. Imag., vol. 24, pp. 1637-1646, December 2005).

To account for the resolution loss due to penetration, EQ. 53 (or the expression applicable to the profile of the slit) is then substituted for w in the expression for the resolution in the transverse direction of a slit-slat collimator, which has been shown above to be the same as for a pinhole:

$$R = \sqrt{w^2\left(1 + \frac{h}{f}\right)^2 + R_i^2\left(\frac{h}{f}\right)^2} \quad \text{(EQ. 54)}$$

where $R_i$ is the FWHM of the intrinsic point spread function of the detector and f the distance from the slit to the detector.

Validation

Above, a parallel slat assembly with adjustable width (d) and height (a) was used with an adjustable-width (w) slit to acquire experimental data by scanning a point source along the z axis, i.e. for $\phi_0 = \theta = \pi/2$. Results were found in good agreement with the heuristic expectation that sensitivity follow the geometric mean of EQ. 15 and EQ. 16 under such conditions. Since for $\theta = \pi/2$ EQ. 46 is the geometric mean of EQ. 15 and EQ. 16, the results above validate the dependence of EQ. 46 on h, w, d and a for an on-axis point source.

To verify dependencies on other parameters and in different conditions, the predictions of the formulas derived above were compared to results from Monte Carlo simulations. Since the formulas were derived to predict geometric sensitivity, a simple code was developed to simulate only total absorption in the slit and slat assembly. No scatter and no penetration were considered initially.

Geometric Sensitivity: On-axis Dependence on h

Figure 12:
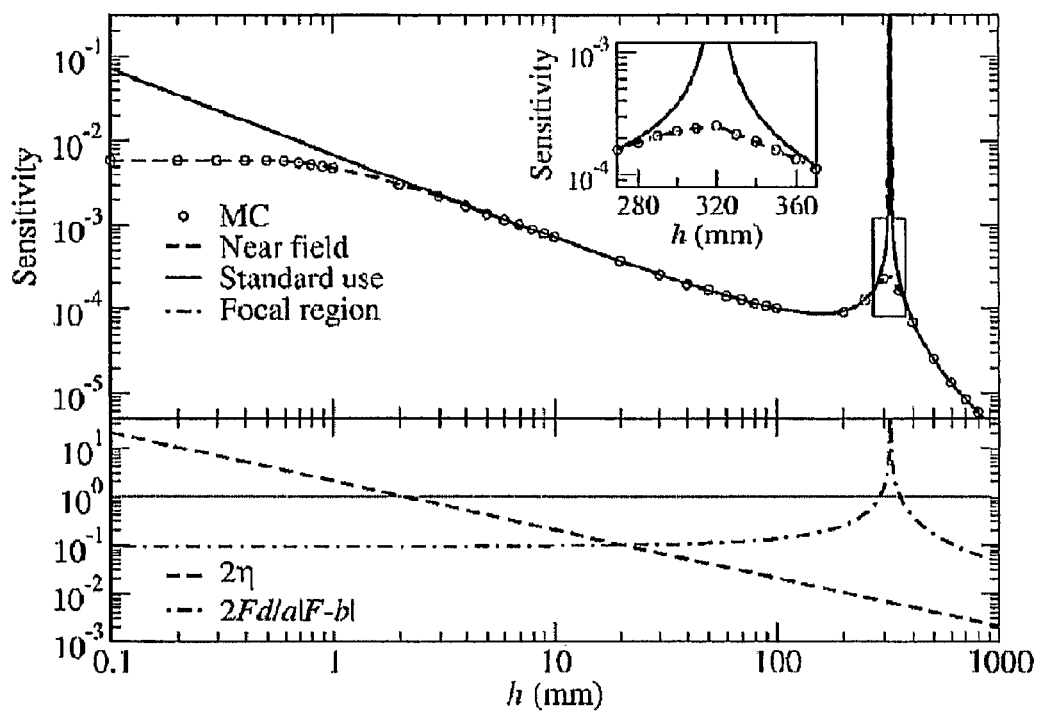
FIG. 12 shows dependence of sensitivity on the distance from the source to the plane of the slit. The near-field, standard-use and focal region formulas are, respectively, EQ. 58, EQ. 45, and EQ. 63. The near-field (focal region) formula must be applied when $2\eta \gg 1$ (2Fd/[a|F−b|]≫1). The focal region formula differs significantly from the standard-use formula, and is therefore visible, only in the range detailed in the inset.

The dependence on h of EQ. 45, was verified (FIG. 12) in the case of a collimator with w=2.03 mm, d=1.27 mm, t=0.11 mm, a=34 mm, s=80 mm and F=400 mm for an on-axis source ($x_P = y_P = 0$, i.e. $\theta = \pi/2$). These parameters were chosen for consistency with the aforementioned studies. The same figure shows for completeness the near-field and focal region expressions derived below, i.e. EQ. 58 and EQ. 63, respectively. Simulations considered the case of a clinical Anger camera [$L_x$=398.72 mm, $L_y$=242.08 mm. Prism 3000 XP (Philips Medical Systems, Andover, Mass.) used with a 128×128 matrix of 3.56 mm×3.56 mm pixels, active only in its 112×68 central region].

Geometric Sensitivity: Dependence on θ

Figure 13:
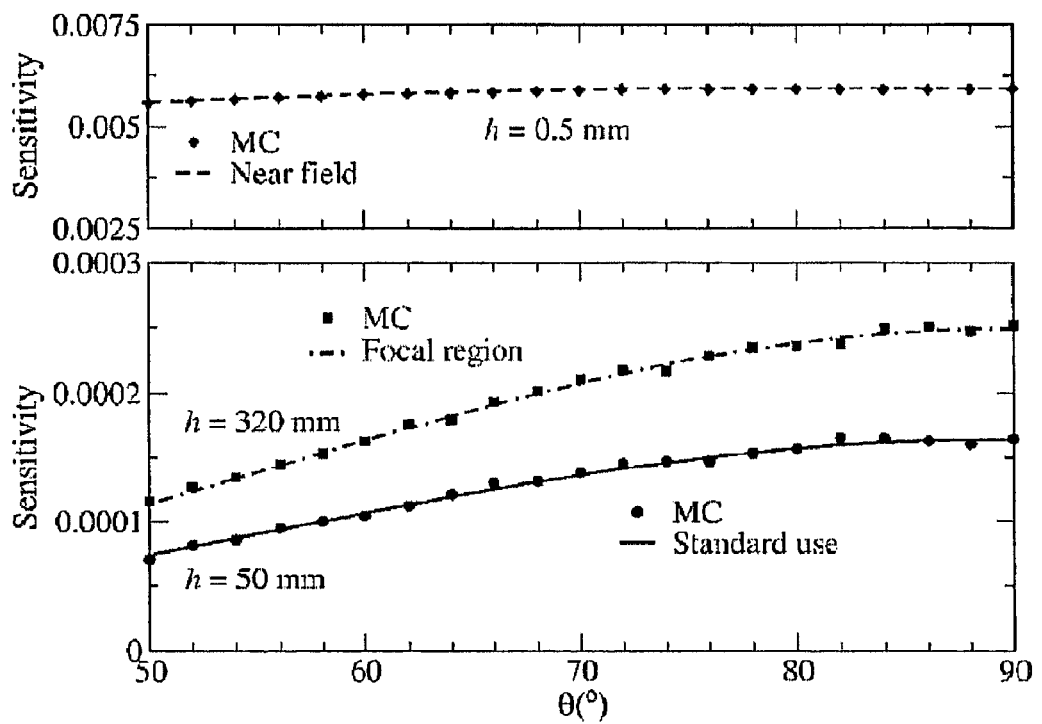
FIG. 13 shows dependence of sensitivity on the incidence angle θ. The near-field (EQ. 43), standard-use (EQ. 45) and focal region (EQ. 63) formulas are evaluated, respectively, at h=0.5, 50 and 320 mm. In all cases $y_P$=0.

For the same collimator parameters indicated above, the dependence on θ of EQ. 43 [EQ. 58 could not be used because it assumes $\theta = \pi/2$], EQ. 45 and EQ. 63 was verified, respectively, for h=0.5, 50 and 320 mm (see FIG. 13). For all h, $y_P = 0$, which implies $y_0 = 0$, so that $\phi_0 = \theta = \arctan(h/x_P)$.

Figure 14:
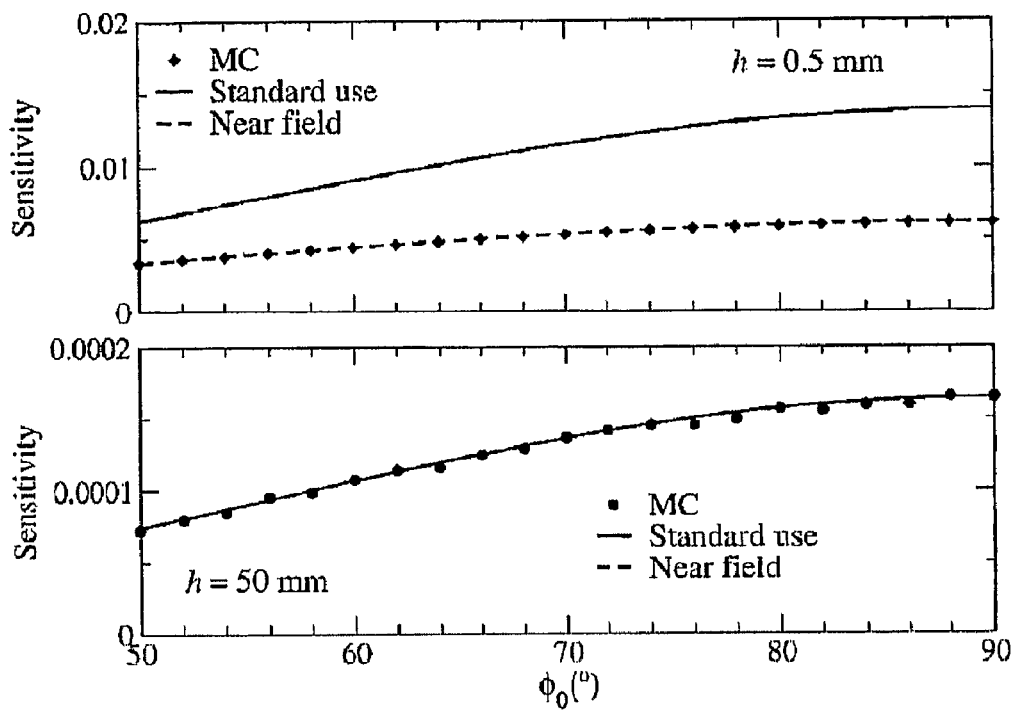
FIG. 14 shows dependence of sensitivity on the incidence angle $\phi_0$. The near-field (EQ. 58), and standard-use (EQ. 45) formulas are compared to Monte Carlo data at h=0.5 and 50 mm. In both cases $x_P$=0. At h=50 mm the two curves are not distinguishable. An infinite detector was considered.

Geometric Sensitivity: Dependence on $\phi_0$:

To avoid the interference of axial truncation, the dependence on $\phi_0$ of EQ. 45 and EQ. 58 was verified for h=0.5 and 50 mm for an infinite detector (FIG. 14) with $x_P = 0$. The values discussed above were maintained for all other parameters. Since EQ. 63 assumes $y_P = 0$, for $x_P = 0$ EQ. 63 can be used only at $\phi_0 = \theta = \pi/2$, where for h=50 mm it gives 1.644×$10^{-4}$ vs. 1.645×$10^{-4}$ from EQ. 45.

Sensitivity-effective Slit Width and Septal Length

Figure 15:
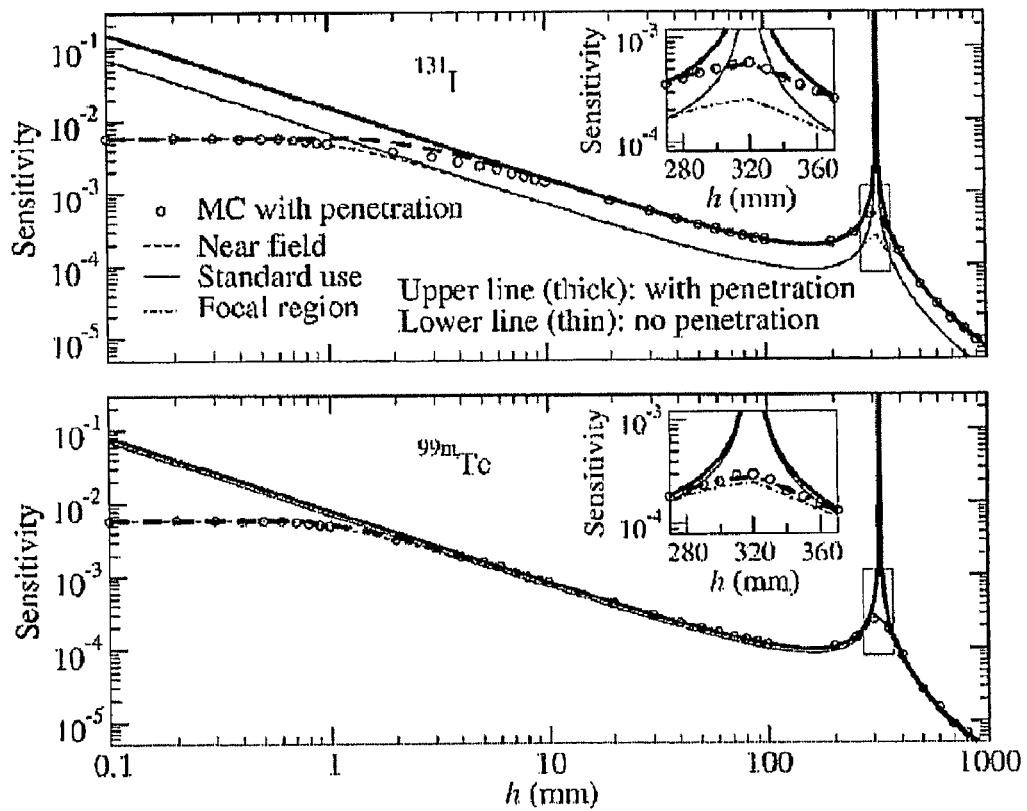
FIG. 15 shows validation of the expression of the sensitivity-effective slit width for two different isotopes, $^{99m}$Tc (140 keV, bottom) and $^{131}$I (365 keV, top). The Anger camera geometry was assumed. In the $^{99m}$Tc case thin (penetration not simulated) and thick (penetration simulated) lines are so close that they are not distinguishable. Since penetration always increases sensitivity, the line indicating penetration is always the upper line.

The simple Monte Carlo code was modified to calculate for each event the photon path ΔL in the slit material by solving analytically for the two intersections of the planes forming the slit with the straight line of the photon path ($x_{a,b}$). Each event was then weighed by $\exp(-\mu\Delta L)$. Initially no slat penetration was modeled. On-axis sensitivity calculated from EQ. 58, EQ. 45, and EQ. 63 with the geometric value of the slit width w and with its sensitivity-effective width $w_{se}$ EQ. 52 was compared to Monte Carlo data in the Anger camera geometry for two different isotopes, $^{99m}$Tc (140.5 keV, $\mu$=3.40 mm$^{-1}$, exclusive of coherent scattering) and $^{131}$I (364.5 keV, 0.401 mm$^{-1}$), in tungsten ($\rho$=19.3 g/cm$^3$) (FIG. 15). The values discussed above were maintained for all other parameters.

The role of slat penetration was later evaluated with a GEANT4 code (The standard electromagnetic physics package was used with default settings) modeling absorption and penetration in the slit or the slat assembly or both. Table 2 compares the GEANT4 sensitivity estimates to the theoretical values obtained from EQ. 45 with w and a substituted, respectively, by $w_{se}$ and $a_e$ as appropriate. GEANT4 data with no penetration or with only slit penetration allowed were used for cross validation of the simple Monte Carlo code previously used.

TABLE 2

COMPARISON OF THEORETICAL TO MONTE CARLO ESTIMATES OF SENSITIVITY WITH RELATIVE PENETRATION CONTRIBUTIONS FOR

DIFFERENT ISOTOPES AND SLAT CONFIGURATIONS

|  |  | Penetration | | | |
|---|---|---|---|---|---|
|  | Slit | N | Y | N | Y |
|  | Slat | N | N | Y | Y |
|  |  | Units | | | |
|  |  | ($10^{-5}$) | (%) | (%) | (%) |
| $^{57}$Co[a] | Theory | 5.55 | +10.1 | +1.2 | +11.4 |
|  | MC | 5.56 ± 0.02 | +9.8 ± 0.5 | +0.7 ± 0.4 | +10.6 ± 0.5 |
| $^{99m}$Tc[a] | Theory | 5.55 | +14.5 | +1.8 | +16.5 |
|  | MC | 5.55 ± 0.02 | +14.8 ± 0.5 | +1.9 ± 0.4 | +17.0 ± 0.5 |
| $^{131}$I[a] | Theory | 5.55 | +122.8 | +17.2 | +161.2 |
|  | MC | 5.57 ± 0.02 | +121.2 ± 0.8 | +201.8 ± 1.0 | +567.7 ± 2.1 |
| $^{131}$I[b] | Theory | 7.06 | +122.8 | +9.1 | +143.0 |
|  | MC | 7.07 ± 0.02 | +122.5 ± 0.7 | +10.4 ± 0.4 | +145.9 ± 0.8 |

Penetrative sensitivity increases are expressed as percent increments over the sensitivity specified in the third column of the respective row.
Theory: estimate from (26) (third column), (26) with $w_{se}$ replacing w (fourth column), (26) with $a_e$ replacing a (fifth column), and (26) with both $w_{se}$ replacing w and $a_e$ replacing a (last column). MC: Monte Carlo. GEANT4 default values for the attenuation coefficients were used: $\mu = 4.90$ mm$^{-1}$ for $^{57}$Co (122 keV) [19]. For each case, $2 \times 10^9$ stories were simulated. Uncertainties on percent values were calculated from the Monte Carlo counts and the formula for the propagation of variance applicable in the case of the ratio of two Poisson distributed variables, i.e. if $u = y/x - 1$, $\sigma_u = [yx^{-2}(1 + y/x)]^{1/2}$ [21].
[a]Paramerers typical of low energy slats: t = 0.11 mm, d = 1.27 mm, a = 34 mm, w = 2.03 mm, h = 100 mm, s = 800 mm.
[b]Parameters typical of high energy slats: t = 1.727 mm, d = 3.81 mm, a = 60 mm, w = 2.03 mm, h = 100 mm, s = 800 mm.

Resolution-effective Slit Width

Figure 16:
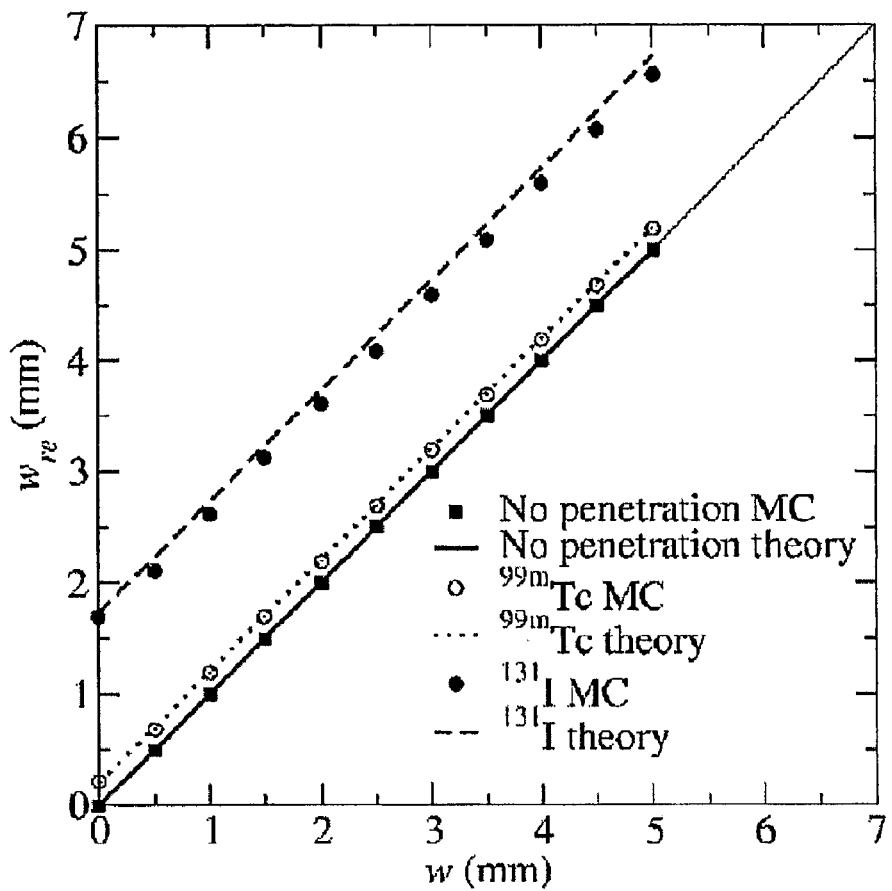
FIG. 16 shows validation of the expression of the resolution-effective slit width (EQ. 53) as a function of the geometric slit width w for $^{99m}$Tc (140 keV, dotted line (theory) and empty circles (Monte Carlo)), $^{131}$I (365 keV, dashed line (theory) and full circles (Monte Carlo)), and the ideal case of infinitely attenuating material (solid line (theory) and full squares (Monte Carlo).
Figure 17:
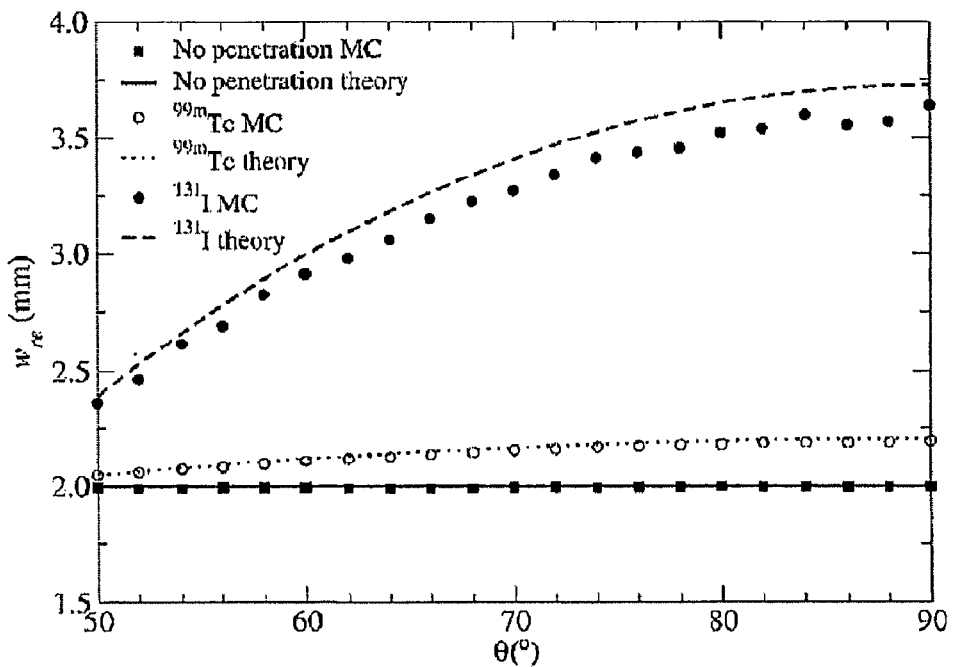
FIG. 17 shows validation of the expression of the resolution-effective slit width as a function of the incidence angle θ for $^{99m}$Tc (140 keV, dotted line (theory) and empty circles (Monte Carlo)), $^{131}$I (365 keV, dashed line (theory) and full circles (Monte Carlo)), and the ideal case of infinitely attenuating material (solid line (theory) and full squares (Monte Carlo).

The simple Monte Carlo code described in the previous section was also used to generate the projections of a point source on the detector. For this simulation were considered, first, different values of w, from 0 to 5 mm in 0.5 mm increments, with d=1.27 mm, t=0.11 mm, a=34 mm, f=114 mm, α=90° and parallel slats. Then, for w=2 mm, values of θ increasing from 50° to 90° in 2° increments were considered. The cases of $^{99m}$Tc and $^{131}$I were both considered along with the ideal case of infinitely attenuating material. Different rows of the projections were summed to obtain profiles running in the transaxial direction (parallel to the x axis). The FWHM of the profiles was measured and rescaled to the plane of the slit by multiplying by the factor h/(f+h). The result is compared to EQ. 53 in FIG. 16 and FIG. 17.

Geometric Sensitivity: Diverging Slat Assembly

Figure 18:
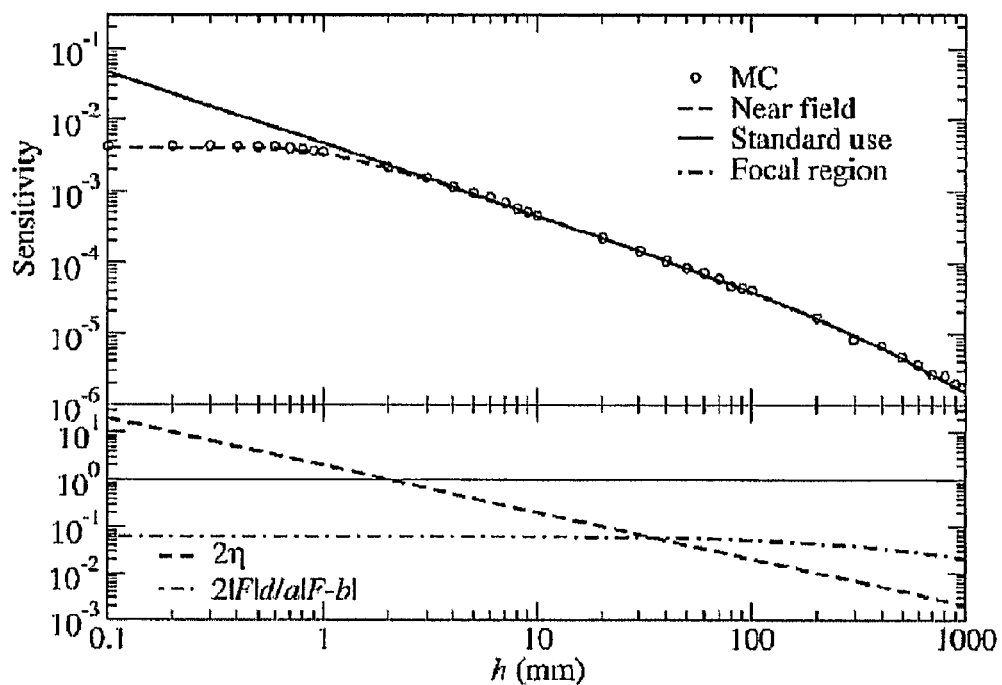
FIG. 18 shows dependence of sensitivity on the distance from the source to the plane of the slit. The near-field, standard-use and focal region formulas are, respectively (EQ. 58), (EQ. 45) and (EQ. 63). The near-field (focal region) formula must be applied when 2≫1 (2|F|d/[a|F−b|]≫1). The case of a clinical Anger camera with a diverging slat assembly is considered: F=−400 mm. Numerically, the focal region formula does not differ significantly from the standard-use formula and is not visible. It was tested for consistent behavior anyway because it is analytically different from the standard-use expression. Penetration was not simulated.

The considerations above were verified by simulating the case of a slat assembly with negative focal length. FIG. 18 shows the case F=−400 mm where all other parameters are the same as in FIG. 12. No penetration was simulated. The parameter 2Fd/[a|F−b|] (see below) indicates correctly that there is no need to use a focal region formula.

Discussion

Good agreement with analytical formulas was achieved in all cases. In all plots error bars are at most comparable to the size of the markers and were not shown. Deviations from EQ. 45 occurred when expected from the derivation and indicated by the parameters 2η and 2Fd/[a|F−b|] (see below).

The proportionality factor 1/(4π) in EQ. 45 (and other sensitivity expressions) is consistent with the proportionality factor appearing in the expression for the sensitivity of a square pinhole (see EQ. 15), as expected from the rectangular footprint of the slit-slat's point spread function. The standard use formula seems to agree with that indicated in H. Wieczorek et al. ("Analytical model for pixelated SPECT detector concepts," in Proc. Nuclear Science Symposium Conf. Record, Rome, 2004, pp. 2584-2588), whose derivation is largely left to the reader, and which, however, is limited to parallel slats and seems to be affected by at least some ambiguity in the symbols used. It is interesting to note that the argument above based on the geometric mean of EQ. 15 and EQ. 16 cannot be extended to the dependence of sensitivity on angle.

In the case study above it was found that both the model for slit and slat penetration provide reasonable estimates. Furthermore, slit penetration was found to account for most penetration. This can be understood with an argument based on the expression of the effective width and length. In fact, $g_g \propto w/a$ and $g_{tot} \propto w_{se}/a_e$ where $g_g$ indicates the geometric part of sensitivity and $g_{tot}$ indicates sensitivity inclusive of penetration contributions. Using a Maclaurin approximation, $1/a_e \approx [1+2/(\mu a)]/a$. For $\alpha=\pi/2$, from EQ. 45 with the effective quantities, $g_{tot} \propto [w+(1-\cot^2\theta)\sin\theta/\mu][1+2/(\mu a)]/a$. The fractional contribution of penetration to sensitivity is given by $(g_{tot}-g_g)/g_g=2/(\mu a)+(1-\cot^2\theta)\sin\theta/(\mu w)+2(1-\cot^2\theta)\sin\theta/(\mu^2 a w)$. Since μa and μw are usually large numbers, the last term can be neglected. The remaining two terms represent, respectively, the contribution of slat and slit penetration to total sensitivity. The ratio of slat to slit penetration is given by $2w/[a(1-\cot^2\theta)\sin\theta]$. Since w/a is a small number, for angles of practical interest slit penetration is the largest contribution to penetration independently of energy.

Simulation with a GEANT4 code indicated that, at low energy and for typical values of the parameters, slit penetration alone is responsible for an increase of more than 10% whereas slat penetration adds a few percent to sensitivity. For comparison, at 122 keV a tungsten alloy collimator with 32.8 mm channels (i.e. the same geometrical parameters of a low-energy high-resolution, Philips Medical Systems, Andover Mass.) allows $(g_{tot}-g_g)/g_g=1.25\%$ penetration according to H. O. Anger ("Radioisotope cameras," in Instrumentation in Nuclear Medicine, G. J. Hine, Ed. New York: Academic, 1967, vol. 1, pp. 485-552). Therefore modeling slit penetration seems to be a more immediate concern than modeling slat penetration. The Monte Carlo data presented above indicate that the use of a sensitivity-effective diameter can model slit penetration quite accurately. Use of the effective slat length is also acceptable, but is less accurate and robust. In fact, it fails to predict penetration of low energy septa by high energy photons. However, the effective slat length models accurately the more significant case of high energy photons and high energy septa. In the case study considered, only the design of the slat was optimized for high energy: slit parameters were the same as for low energy. A slit designed for high energy would likely be larger (to match axial resolution) and have a profile different from the knife-edge considered here. Therefore, the high slit penetration seen in Table 2 should not be considered representative of a real situation.

Comparison of the theoretical prediction of the resolution effective slit width with Monte Carlo data showed a maximum deviation of less than 1% for $^{99m}$Tc and 5% for $^{131}$I in the case considered.

The near-field and standard-use expressions do not account for truncation in the y direction; its effects can be incorporated by generalizing the expressions of $I_1$ and $I_2$. This can be done by considering that $-L_y/2 \leq y_i \leq L_y/2$. The generalized expressions of $I_1$ and $I_2$, which should have a form similar to $\eta_{1,2}$, need then to be substituted in EQ. 36. This was not done for brevity. Truncation in the y direction, however, can and does affect sensitivity for finite detectors in near-field and standard use conditions, particularly for $\phi_0 < \pi/2$. For this reason, the dependence on $\phi_0$ was verified in the case of an infinite detector. To complete validation, it was verified that indeed the conditions $y_2 < -L_y/2$ and $y_1 > L_y/2$ predict the values of $\phi_0$ at which sensitivity drops to zero (data not shown).

The model assumes septa of constant thickness. A calculation indicated that tapered septa can be modeled with a slight modification of EQ. 23 and EQ. 24. The consequences of the different shape of the septa were not pursued further. It is likely that the impact on sensitivity under standard conditions is minimal but may become sensible under particular circumstances, e.g. when the source is on the focal line of the slat assembly.

Figure 11B:
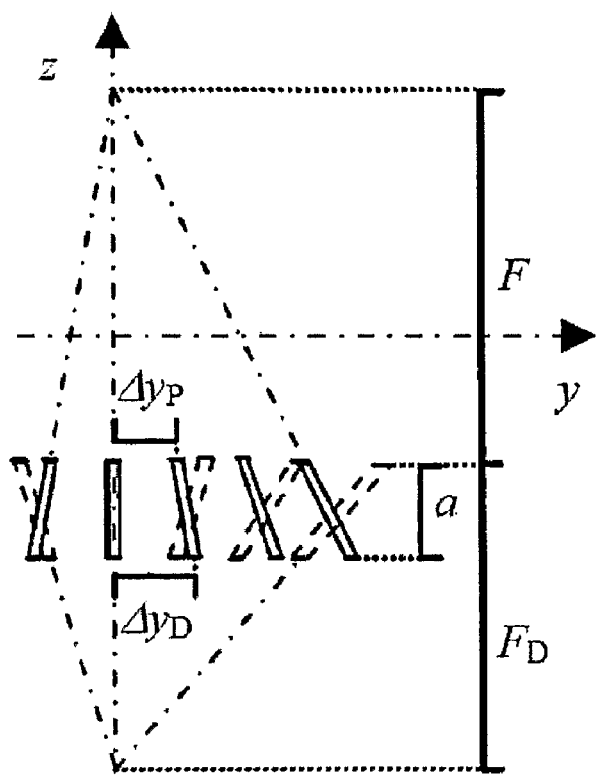
FIG. 11b shows the definition of focal length for a diverging slat assembly.

In FIGS. 11a and 11b and in the whole derivation it was assumed that the slat assembly is positioned so that a septum is located on the z axis. Repeating the derivation with the z axis passing through the center of one of the channels shows that results do not depend strongly on this assumption, especially as h increases.

Formulas were verified for the case F=400 mm, i.e. a rather short focal length, albeit not extremely. This value was chosen both because it seemed a more demanding test for the formulas and because slit-slat collimators may prove to have favorable fabrication characteristics as compared to cone-beam collimators, which may be of particular interest when short focal lengths are needed.

The sensitivity formula is expected to benefit accurate sensitivity modeling in reconstruction algorithms. A closed form expression is useful because it can be incorporated in reconstruction algorithms in an efficient manner. The availability of sensitivity and resolution formulas is expected to help the comparison among different collimators and thus guide design choices. For example, since pinhole sensitivity follows a $1/h^2$ law, slit-slat sensitivity, which follows a 1/h law, does not decrease with distance as fast as pinhole sensitivity. For this reason, slit-slat collimation seems a better option from some lower limit until fan-beam collimation with its 1/(F−h) dependence provides better sensitivity at large distances. Of course these comparisons should be made for comparable resolutions (at least in some average sense) and field of view. Under these conditions, slit-slat collimation is expected to be of particular interest for objects having an intermediate size, i.e. from whole-body studies of small animals and imaging of medium size animals to single-organ (e.g. breast, brain, and heart) or pediatric imaging in humans.

The formulas presented also cover the case in which the slats focus on a line. The similarity (which is by no means a complete analogy) between parallel slit-slat and fan-beam collimators has been noted above. A focusing slit-slat collimator naturally relates to a cone-beam collimator. Whereas best resolution is achieved in both designs near the collimator, a cone-beam collimator has maximum sensitivity at its focal point, which is typically far from the collimator, especially when it is considered that fabrication difficulties usually force the focal length to be relatively large. Therefore, in a cone-beam collimator, maximum sensitivity is achieved in a region where resolution is relatively poor. The sensitivity profile of a converging slit-slat collimator, however, presents maxima both at the focal line of the slat assembly and next to the slit, where at least transverse resolution is comparable to that of pinhole imaging. This different mix of resolution, sensitivity and fabrication characteristics may be advantageous in applications similar to those for which cone-beam collimation has historically been applied.

Figure 19:
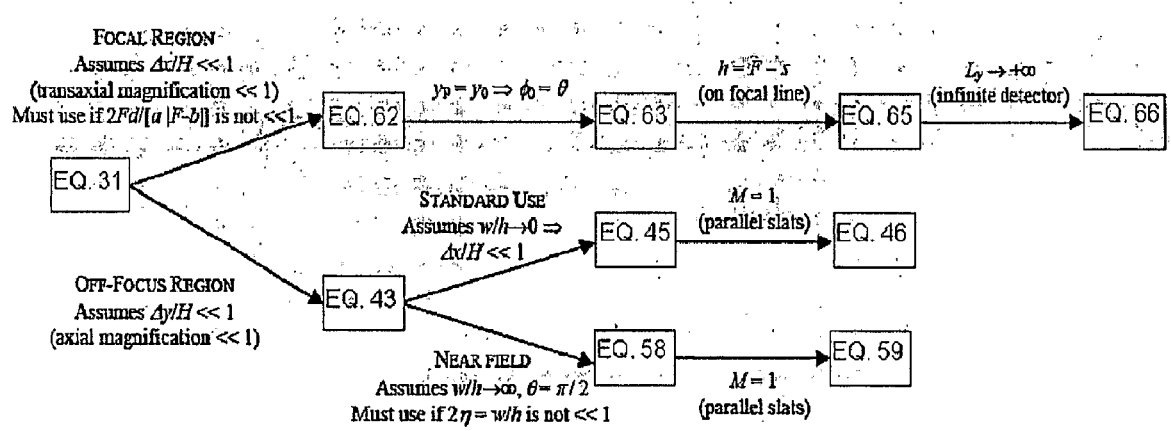
FIG. 19 shows a synopsis of equations and conditions of applicability.

Good agreement with Monte Carlo data suggests that the standard-use expression EQ. 45 models accurately the sensitivity of a slit-slat collimator over the range of interest of the point to-slit-plane distance in most applications. However, EQ. 45 is not valid (i) closer to the slit than a few slit widths, in which case the near-field expression EQ. 58 [EQ. 43 if off-axis] should be used; and (ii) for converging slats, near the focal line of the slat assembly, in which case the focal region expression EQ. 63 should be used [EQ. 62 if off the transaxial central plane, i.e. $y_P \neq y_0$]. Expressions simpler than EQ. 63, i.e. EQ. 65, were derived for sensitivity at the focal line of the slat assembly. Further, the conditions $2\eta \gg 1$ and $2Fd/[a|F-b|] \gg 1$ were provided to evaluate if, respectively, near-field or focal region formulas should be used in place of the simpler standard-use formula. Finally, it was shown that it is a good approximation to incorporate the effects of penetration in the model with the use of the sensitivity-effective slit width EQ. 52 and septal length. A summary of relevant formulas with the relative conditions of applicability is provided in FIG. 19.

Near Field Formulation

The sensitivity formula in the standard-use region predicts infinite sensitivity for h→0. This is because in the standard use region w/h<<1 was assumed. In this section, first a boundary for the applicability of EQ. 45 is derived. The result shows that under usual conditions EQ. 45 should provide excellent approximations. However, in specialized applications such as small-animal imaging, in which the closest possible distances of approach are sought aggressively, it is possible that EQ. 45 deviates from the correct sensitivity value. For these cases a near-field formula is derived. Studying the divergence of EQ. 45 for h→0 also helps its validation.

The third order term in EQ. 44 is, for w<<h, the largest contributor to error. It can be used to assess when this approximation begins to break down. The fractional error associated to using EQ. 45 in place of EQ. 43 is given by:

$$\delta \equiv \frac{g_{\text{off}} - g_{\text{su}}}{g_{\text{off}}} \approx \frac{g_{\text{off}} - g_{\text{su}}}{g_{\text{su}}} \approx \sin^2\phi_0(5\cot^2\theta\sin^2\phi_0 - 1)\frac{w^2}{8h^2} \quad \text{(EQ. 55)}$$

This equation can be used to estimate the distance $h_0$ beyond which EQ. 45 is approximate to within $\pm\delta_0$. This is:

$$h_0 \approx \frac{w}{2\sqrt{2\delta_0}}\sin^2\phi_0\sqrt{|5\cot^2\theta\sin^2\phi_0 - 1|} \quad \text{(EQ. 56)}$$

For example, for a 2 mm slit, 10% agreement or better is expected on-axis for h>2.23 mm. At points closer than $h_0$, $\eta$ is too large for Taylor expansion to be useful. The standard use region is abandoned as the slit is approached and $\eta \to +\infty$. In this case EQ. 43 should be used in place of EQ. 45; alternatively, a simpler formula can be derived restarting from EQ. 37.

First, the condition defining the near field, $h \ll w$, i.e. $2\eta \gg 1$, allows the linear term under the radical in EQ. 37 to be neglected. Thus:

$$C_{2,1} = \frac{\eta_{2,1} - \cot\theta}{\sqrt{1 + \eta_{2,1}^2 \sin^2 \phi_0}} \quad \text{(EQ. 57)}$$

Next, this expression and the definition of $\eta_{2,1}$ can be substituted into EQ. 43. For $x_0=0$ (which implies $x_P=0$ and $\theta=\pi/2$), the following expression is reached:

$$g_{nf} = \frac{d^2}{2\pi(d+t)a} \sin^2\phi_0 \frac{F}{|F-b|} \operatorname{sinarctan}\left[\frac{\sin\phi_0}{2} \min\left(\frac{w}{h}, \frac{L_x}{H}\right)\right] \quad \text{(EQ. 58)}$$

Unlike EQ. 45, this expression does not diverge for $h \to 0$ even in the ideal case of infinite detector. Substitution of $\theta=\pi/2$ in EQ. 43 and EQ. 58 verifies that these two expressions are equivalent for on-axis sources, i.e. such that $x_P=x_0=0$.

The case of parallel slats can be derived by setting $F \to +\infty$ in EQ. 58. The obvious result is provided here for completeness:

$$g_{nf} = \frac{d^2}{2\pi(d+t)a} \operatorname{sinarctan}\left[\frac{1}{2} \min\left(\frac{w}{h}, \frac{L_x}{H}\right)\right] \quad \text{(EQ. 59)}$$

Focal Line Formulation

It has been suggested that for some applications fields of view be scanned with focusing collimators with the focal locus inside the object of interest. In such cases, the standard-use formula EQ 45 would diverge inside the field of view, at the focal line of the slat assembly. In this section formulas are derived for the sensitivity near the focal line of the slat assembly.

As the source approaches the focal line of the slat assembly, EQ. 43 diverges. More specifically, if $|\Delta y|/H = 2Fd/[a|F-d|] \ll 1$ is not satisfied (this is the definition of focal region adopted herein), standard-use and near-field formulas cannot be used. The derivation must restart from EQ. 33. It is reasonable to assume that in most applications $F > s$ by more than a few slit widths $w$. In these conditions, M is large only when $h \gg w$, that is when $(\Delta x_2 - \Delta x_1)/H = w/h \ll 1$. In the focal region, thus, $|\Delta x|/H \ll 1$ as in the standard-use region, and $M \to +\infty$; therefore EQ. 33 reduces to:

$$g_{foc} = \frac{\sin^3\phi_0}{4\pi H^2} \sum_i l_i \int_{\Delta x_1}^{\Delta x_2} \left[1 + \frac{\Delta y + \Delta y^2}{H^2} \sin^2\phi_0\right]^{-\frac{3}{2}} \begin{bmatrix} 2(y_0 - y_P) \end{bmatrix} d\Delta x \quad \text{(EQ. 60)}$$

Since the integrand is constant, it can be factored out so that the remaining integral is trivial: it yields the width of the slit scaled to the plane $z=-(s+a)$, i.e. $wH/h$. Next, the summation is handled by conversion to an integral in the continuous variable $\Delta y$. To this end, $l_i$ is written as a function of $\Delta y$. This is done by solving EQ. 23 (still neglecting the term t/2) for $i(d+t)$, whose expression is then substituted in EQ. 24; finally $y_i$ is replaced with $y_0+\Delta y$. Still in the approximation $at/(bd) \ll 1$ made above:

$$l_i = \begin{cases} d + \frac{a}{H} \frac{F+a}{F}\left(\frac{y_0+\Delta y}{M} - y_P\right) & \text{for } \lambda_1 \leq \Delta y < 0 \\ d - \frac{a}{H} \frac{F+a}{F}\left(\frac{y_0+\Delta y}{M} - y_P\right) & \text{for } 0 \leq \Delta y \leq \lambda_2 \end{cases} \quad \text{(EQ. 61)}$$

where $\lambda_1 \equiv \max[\Delta y_1, -L_y/2-y_0]$ and $\lambda_2 \equiv \min[\Delta y_2, L_y/2-y_0]$. EQ. 60 becomes:

$$g_{foc} = \frac{\sin^3\phi_0}{4\pi h} \frac{w}{d+t} \int_{\lambda_1}^{\lambda_2} l_i \left(1 + \frac{\Delta y + \Delta y^2}{H^2} \sin^2\phi_0\right)^{-\frac{3}{2}} \begin{bmatrix} 2(y_0 - y_P) \end{bmatrix} d\frac{\Delta y}{H} \quad \text{(EQ. 62)}$$

This expression also is analytically integrable via EQ. 35. However, the result is complex and not particularly rich with insights. For this reason, the derivation is now restricted to the simpler case for which $y_P=y_0=0$, which implies $\lambda_2=-\lambda_1$. EQ. 62 then falls under the case C=0. These hypotheses lead with some algebra to:

$$g_{foc} = \frac{\sin\theta}{2\pi h} \frac{wH}{d+t} \frac{1}{\sqrt{1 + \frac{\lambda^2}{H^2}\sin^2\theta}} \quad \text{(EQ. 63)}$$

$$\left[\frac{a(F+a)}{MFH}\left(1 - \sqrt{1 + \frac{\lambda^2}{H^2}\sin^2\theta}\right) + \frac{2d}{H^2}\sin^2\theta\right]$$

where $\lambda_2=-\lambda_1 \equiv \lambda$ was used. In the common case in which the projection of the point source on a finite detector is not truncated, $\lambda=FHd/[a|F-b|]$ so that EQ. 63 simplifies to:

$$g_{foc} = \frac{\sin\theta}{2\pi h} \frac{wd}{d+t} \frac{H}{\lambda}\left(\sqrt{1 + \frac{\lambda^2}{H^2}\sin^2\theta} - 1\right) \quad \text{(EQ. 64)}$$

However, as the source approaches the focal line, a finite detector is eventually entirely covered and truncation becomes inevitable. Correctly, EQ. 63 does not diverge for $b \to F$ (which implies $M \to +\infty$) because $\lambda \to \lambda_y/2$ and M appears otherwise only at a denominator. In fact:

$$\lim_{M \to +\infty} g_{foc} = \frac{w}{2\pi h} \frac{d}{d+t} \frac{\frac{L_y}{2H}\sin^3\theta}{\sqrt{1 + \frac{L_y^2}{4H^2}\sin^2\theta}} \quad \text{(EQ. 65)}$$

which does not diverge even for an infinite detector; for $L_y \to +\infty$ sensitivity is given by:

$$\lim_{L_y \to +\infty} g_{foc} = \frac{w}{2\pi h} \frac{d}{d+t} \sin^2\theta. \quad \text{(EQ. 66)}$$

This result is the same obtained from H. Gotoh and H. Yagi ("Solid angle subtended by a rectangular slit," Nucl. Instrum. Methods, vol. 96, pp. 485-486, 1971), which gives an exact formula for the solid angle subtended by a rectangular opening. In fact, it is possible to derive an expression for the solid angle subtended by an infinite slit by using the formula provided in Gotoh and Yagi, which provides an exact analytical form for the solid angle subtended by a rectangular opening. The following values of the variables of Gotoh and Yagi are used: $x_{2,1}=h \cot\theta \pm w/2$, $y_{2,1} \to \pm\infty$, and $z=h$. This gives:

$$\Omega = 2\arctan\left(\cot\theta + \frac{w}{2h}\right) - 2\arctan\left(\cot\theta - \frac{w}{2h}\right) \quad \text{(EQ. 67)}$$

In the focal region, $w \ll h$. It is then possible to expand the arctan functions in Taylor series to first order:

$$\arctan\left(\cot\theta \pm \frac{w}{2h}\right) \approx \frac{\pi}{2} - \theta \pm \frac{w}{2h}\sin^2\theta \quad \text{(EQ. 68)}$$

Substitution of this result in EQ. 67 gives $$\Omega \approx 2\frac{w}{h}\sin^2\theta \quad \text{(EQ. 69)}$$

Division by $4\pi$ and multiplication by $d/(d+t)$ to account for the unobstructed detector area yields EQ. 66.

Therefore, the singularity in EQ. 45 is avoided because of consistent modeling of the solid angle, not only because of the inclusion of the finite size of the detector in the model. As expected, this limit is the same as that of EQ. 64 for $\lambda \to +\infty$; a second check for EQ. 64 is obtained in the opposite extreme case, in which $\lambda \ll H$ and the Taylor expansion: $\sqrt{(1+x)} \cong 1+x/2$ can be used in EQ. 64 to show that $$g_{foc} \to \frac{w}{2\pi h} \frac{d}{d+t} \frac{\lambda}{H} \sin^3\theta \quad \text{(EQ. 70)}$$

Substitution of $\lambda$ with its definition shows EQ. 70 to be equivalent to the standard-use expression EQ. 45.

The availability of non-diverging formulas is of interest for example in the implementation or validation of the projectors needed for image reconstruction in such cases.

Sensitivity and Resolution Results

Figure 20A:
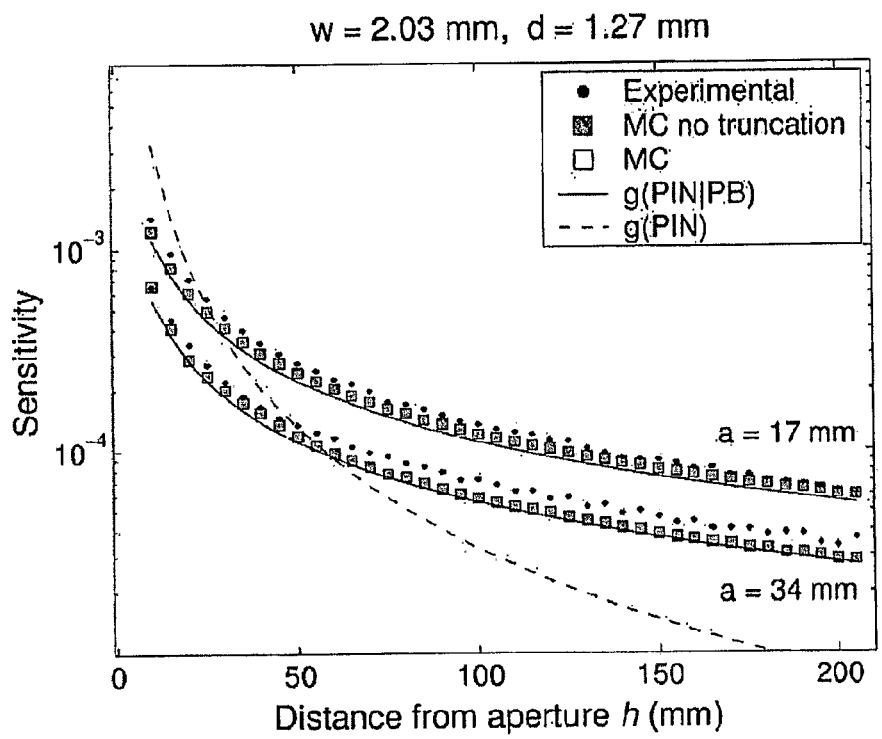
FIG. 20a shows slit-slat sensitivity to a $^{57}$Co point source versus distance. The slit width is w. The slat height and spacing between slats are a and d, respectively.
Figure 20B:
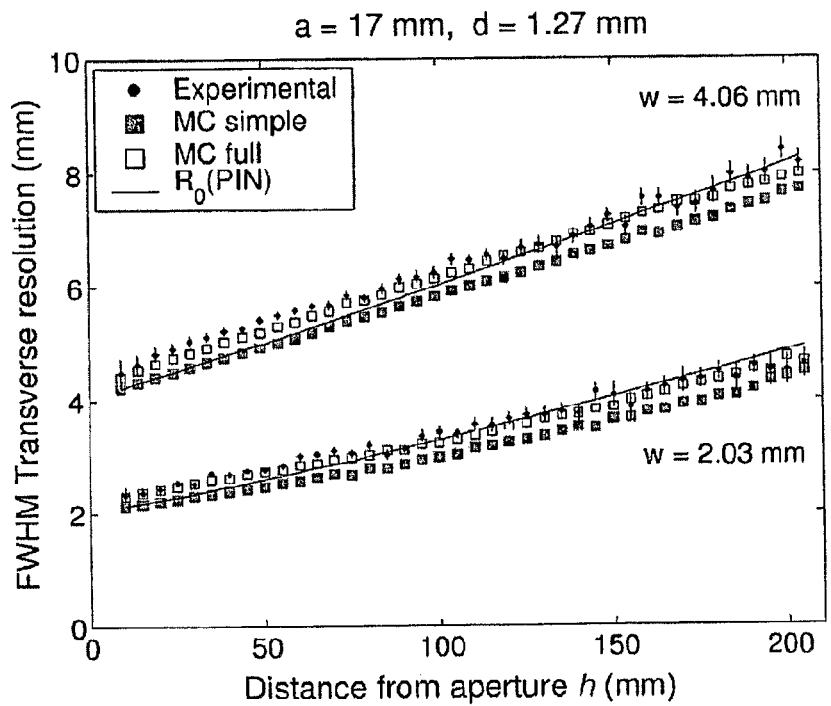
FIG. 20b shows slit-slat transaxial resolution to a $^{57}$Co point source versus distance. The slit width is w. The slat height and spacing between slats are a and d, respectively.
Figure 20C:
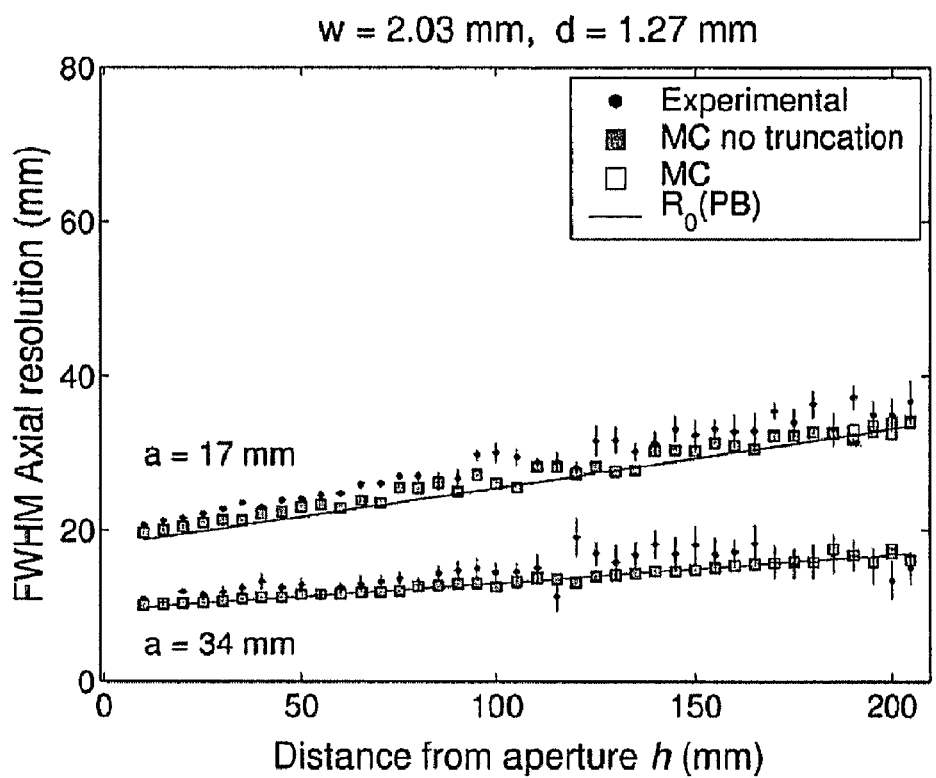
FIG. 20c shows slit-slat axial resolution to a $^{57}$Co point source versus distance. The slit width is w. The slat height and spacing between slats are a and d, respectively.

FIGS. 20a, 20b, and 20c compare experimental data from a $^{57}$Co point source with Monte Carlo results that model the ideal slit-slat (MC no truncation; MC simple) and Monte Carlo results that more realistically model the experimental setup using the materials available (MC, MC full). The experimental data track the more realistic Monte Carlo. The theoretical curves track the more ideal Monte Carlo. The theoretical sensitivities g(PIN) and g(PIN|PB) are, respectively, the sensitivity of the pinhole collimator and the geometric mean of the sensitivities of parallel-beam and pinhole. The results show good agreement overall between the theoretical curves, the Monte Carlo results, and the experimental results. Thus, on-axis slit-slat sensitivity is well modeled as the geometric mean of pinhole and parallel-beam; the resolutions are well modeled as pinhole in the transaxial direction and parallel-beam in the axial direction.

Comparison of Different Collimator Types for Equal Resolution

Figure 21A:
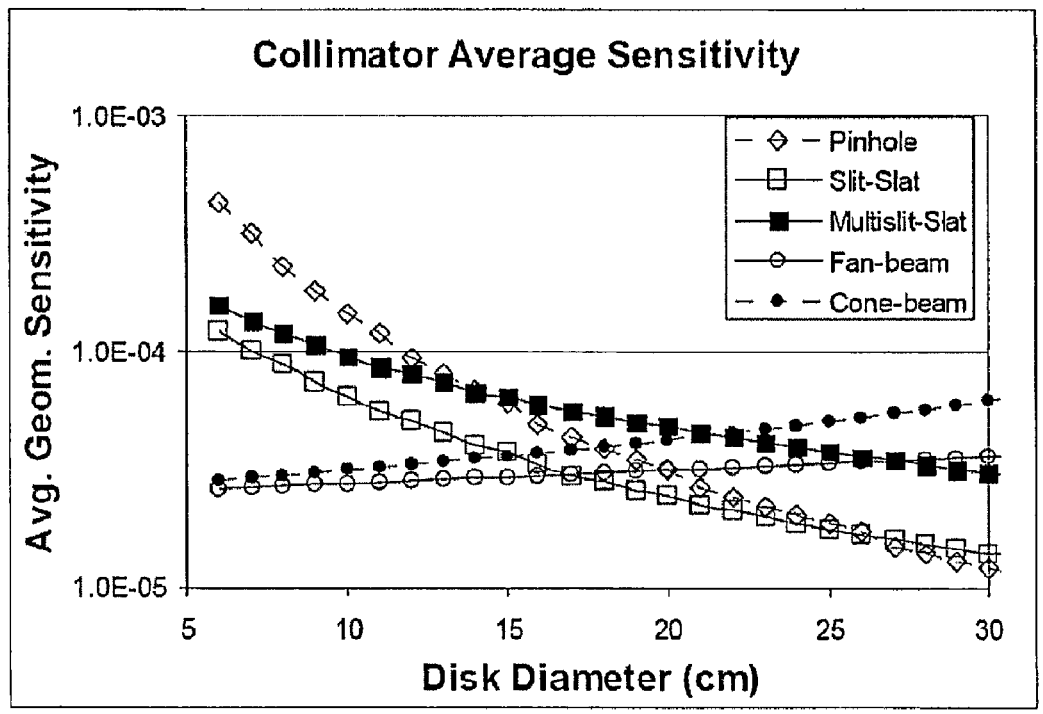
FIG. 21a shows sensitivity averaged over disks as a function of disk diameter. The pinhole and slit-slat were reoptimized for each disk diameter.
Figure 21B:
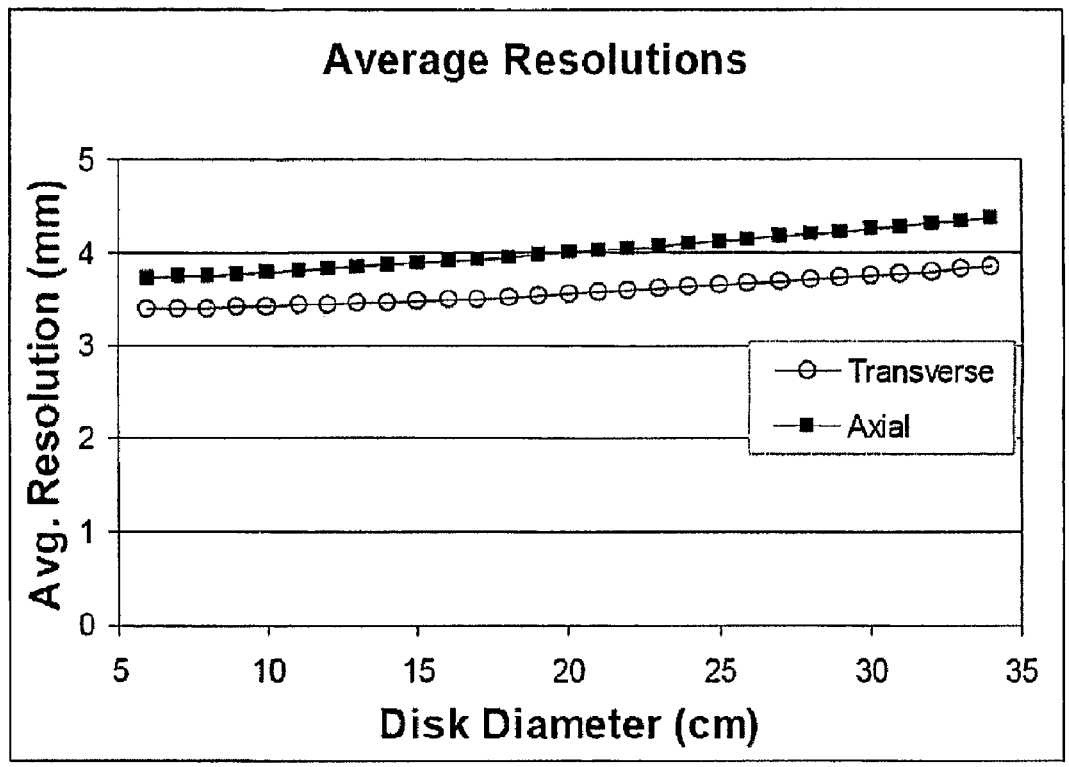
FIG. 21b shows average resolutions as a function of disk diameter for configurations used in the plot in FIG. 21a. The average resolutions for all collimators are the same in the transaxial direction. The axial results shown apply to fan-beam and slit-slat; cone-beam and pinhole have matching axial and transverse resolutions.

Published formulas for the geometric resolution of pinhole, fan-beam, and cone-beam collimation were used to calculate the average sensitivity (FIG. 21a) of a uniform disk as a function of disk diameter, D, for equal average transverse and axial resolutions (FIG. 21b). FIG. 21b shows the average resolution as a function of disk diameter. The transverse resolutions of the cone-beam and pinhole matched the fan-beam, but their axial resolutions were better since they are equal to the transaxial resolution. It is more appropriate to compare slit-slat to fan-beam than cone-beam since they both have the same complete-sampling properties and axial field of view; pinhole has similar complete-sampling properties to cone-beam. Slit-slat and fan-beam offer complete sampling with a circular orbit since axial slices are independent, giving a constant axial field of view (FIG. 22b) with distance from the collimator. The geometric mean of parallel-beam and pinhole were used for the on-axis sensitivity of slit-slat; off-axis is calculated using a $\sin^3\theta$ term. Two cases are considered for slit-slat: single slit (i.e., slit parallel to the axis of rotation) and multislit. Multislit adds two additional slits parallel to the axis of rotation; the projections of the three slits do not overlap. As the diameter of the object changed the fan-beam and cone-beam collimators were moved so that their surfaces were always at the edge of the phantom, D/2, as one would do experimentally. Also, the pinhole and slit-slat locations were chosen to just avoid transaxial truncation based on the focal length and a maximum acceptance angle of 120 degrees. The weighting for averaging the resolutions was the square root of the sensitivity, which is proportional to expected photons in the absence of attenuation.

Point-source sensitivity, g, is the fraction of photons emitted from a point in space that reach the detector. As shown in FIGS. 20a, 20b, and 20c, it is a function of the position of the source. This concept may be applied to determining a collimator's sensitivity to extended objects through integration. Herein, the average sensitivity is given by $\int g dA / \int dA$. The integral is over the region of interest (e.g., a disk of diameter 20 cm).

The average resolution was calculated in object space (i.e., reconstruction resolution). Thus, any magnification by the collimator mitigates the impact of detector blurring. The weighting for resolution was the square-root of sensitivity. The rationale for this choice is that reconstruction resolution depends not only on the spatial resolution of each detected photon, but also on the number of detected photons. The general rule that uncertainties improve with the square-root of the number of samples is applied. Thus, the specific calculation of resolution was: Avg. Res.=$\int R_{sys} \sqrt{g} dA / \int \sqrt{g} dA$, where $R_{sys}$ is the system resolution, which is the full-width at half maximum (FWHM) of the geometric-resolution distribution convolved with a Gaussian distribution with FWHM of $R_i/M$. The detector intrinsic resolution is $R_i$ (3.5 mm FWHM), and M is the magnification.

Figure 21C:
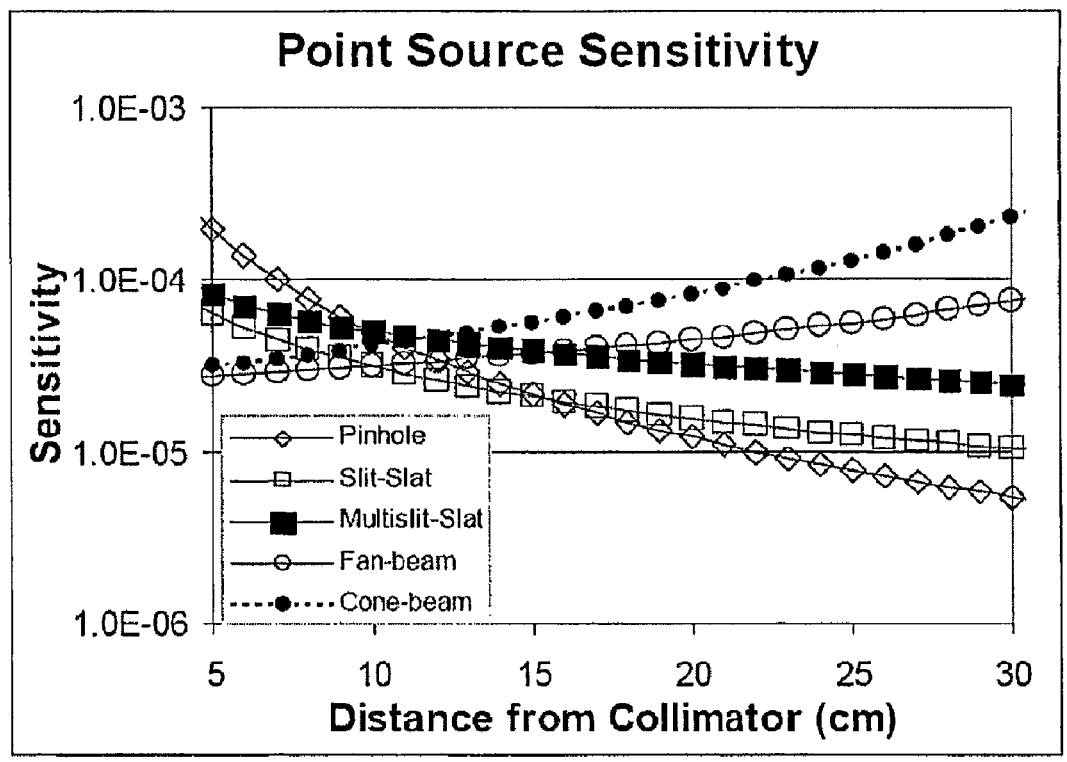
FIG. 21c shows point source sensitivity as a function of distance from the collimator for the configuration that was optimal at a disk diameter of 20 cm.

The pinhole and slit-slat parameters were optimized at each object diameter to give the maximum sensitivity for the same resolutions. The fan-beam and cone-beam collimators use a 1 mm diameter, 40 mm long hole with a 0.2 mm septal wall. The focal length is 45 cm. These parameters were not re-optimized at each object diameter, but were considered to be typical values for clinical collimators. FIG. 21c shows the point-source sensitivity for the parameters that were optimal for a disk diameter of 20 cm: the single-pinhole diameter and focal length were 2.8 mm and 300 mm, respectively; the slit width (w) was 2.2 mm; the slat gap (d) and height (a) were 1.3 and 72 mm, respectively; the slit-slat focal length was 75 mm. See FIG. 23 for symbol definitions.

Figure 22A:
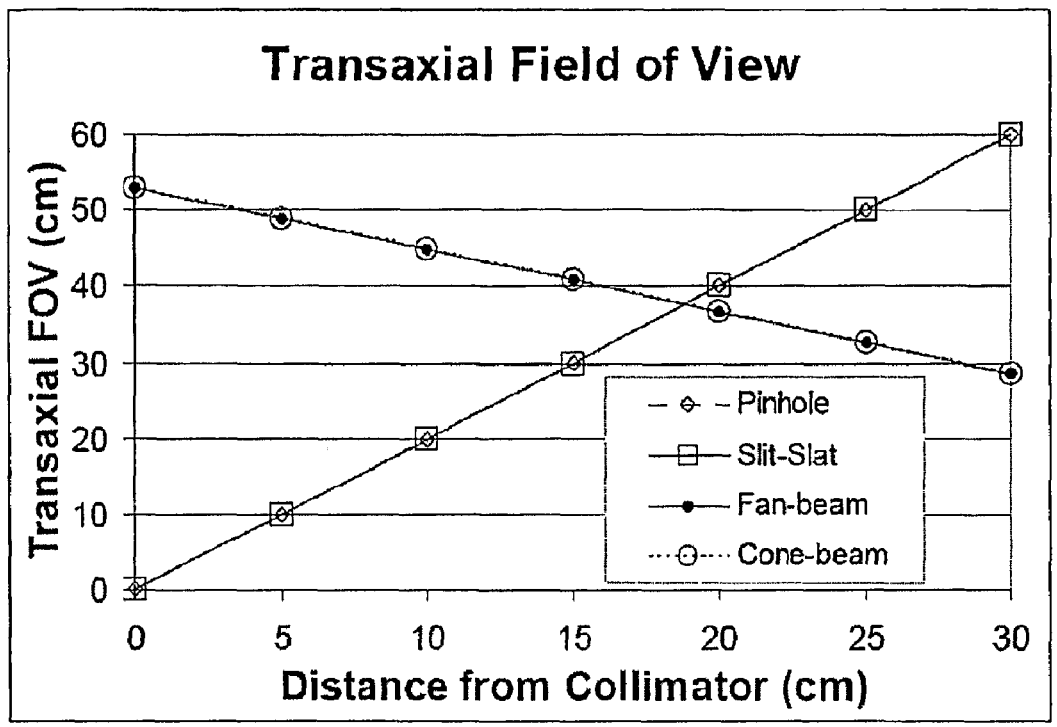
FIG. 22a shows the transaxial field of view. In the transaxial directions, pinhole and slit-slat have the same FOV and fan-beam and cone-beam have the same FOV. The focal point for fan-beam and cone-beam is 65 cm from the detector, with a 53 cm FOV camera.
Figure 22B:
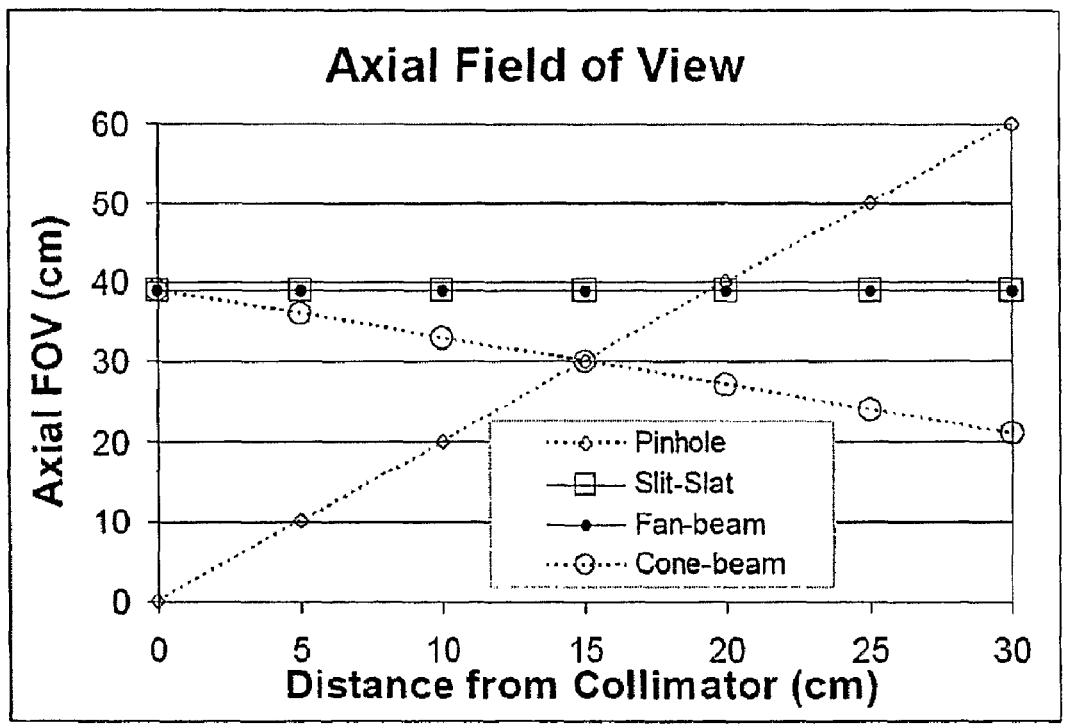
FIG. 22b shows the axial field of view. In the axial direction, slit-slat and fan-beam have the same FOV. The focal point for fan-beam and cone-beam is 65 cm from the detector, with a 53 cm FOV camera.

FIGS. 22a and 22b shows the transaxial and axial fields of view (FOV) as a function of distance from the collimator.

The particular comparison in this section has some bias in favor of cone-beam and single-pinhole over fan-beam and slit-slat, respectively, since the disk was only in the central transverse plane where cone-beam and single-pinhole sensitivities are highest and axial truncation is not an issue. For both fan-beam and slit-slat, the average sensitivity would be constant for a cylinder of that diameter as the length increased, until the projection is truncated. On the other hand, the average sensitivity would drop for cone-beam and single-pinhole as the cylinder's length increased. For example, if one considered a cylinder with length and diameter of 20 cm, cone-beam's average sensitivity would be reduced by 18% and pinhole's by 25% compared with a 20 cm-diameter disk in the central plane; this would reduce the cross-over point for pinhole and slit-slat from 14 cm to about 11 cm. A further bias against multislit in this comparison is that the side slits were oriented as the central slit instead of focusing towards a region of interest. This is done to maintain the same average resolution for the side slits as the central slit. When the slit is tilted (focused) such that its plane is not parallel to the detector plane, the resolution changes as a function of angle, as has been shown in pinhole data. The point-spread function is determined considering focusing slits and considering this effect in optimizations for focusing the multislit collimator.

In this comparison, there is some bias in favor of slit-slat over fan-beam in that slit-slat is re-optimized for each object diameter in order to keep matching resolution values with fan-beam, although fan-beam was not re-optimized. The rationale for this was to compare the new collimator against clinically available collimators. This comparison does not fully use the fan-beam's field of view, which puts it at a disadvantage. Consequently, it has been considered to change the focal length of the fan-beam so as to just avoid truncation. For a 20-cm diameter object, the focal length would be 23.3 cm. This would increase the fan-beam sensitivity at that point by 26%. Further, the cross-over point would change from 27 cm in diameter to 25 cm in diameter. However, it would be extremely difficult to fabricate such a short focal-length collimator.

The average sensitivities and resolutions take into account that the ROR for pinhole and slit-slat is larger than that for fan-beam and cone-beam. One should note that cone-beam does not give complete data with a circular orbit; reconstructions of circular-orbit data have axial blurring artifacts, just as single-pinhole.

The above suggests that slit-slat offers favorable geometric sensitivity over fan-beam for objects smaller than about 27 cm in diameter (2.2 times better than fan-beam for 15-cm diameter; 1.5 times for 20-cm diameter) and over pinhole for objects larger than ~14 cm (11 cm if considering cylinders instead of disks).

More Realistic Assessment

The calculation above has been repeated using the parameters for the Siemens ultra-high-resolution parallel-beam (UHRPB) collimator. In addition, those hole parameters have been taken and used in a "cardio fan-beam". That is, the focal length of the collimator was set to 65 cm. There is not much change in the cross-over points found above (see Table 3). In addition, when allowing for truncated projections, it is found that the cross-over points shift more in favor of multislit-slat than stated above.

TABLE 3

| ROI % | 100% | 95% | 90% | 80% |
|---|---|---|---|---|
| FB | 24 cm | 27 cm | 28 cm | 26 cm |
| PB | 31 cm | 35 cm | 40 cm | 38 cm |

The advantage of multislit-slat over the fan-beam collimator is described above; namely, that multislit-slat is more sensitive than fan-beam for objects up to 27 cm in diameter (FIG. 21a). To more realistically calculate the advantage, the design parameters of the Siemens ultra-high-resolution parallel-beam collimator and a second fan-beam were considered. Since Siemens offers only a general-purpose fan-beam (not an ultra-high-resolution), the additional fan-beam had the same hole parameters as the ultra-high resolution parallel-beam, but with a focal length of 65 cm, which is typical for cardiac fan-beams. The rationale for choosing this focal length is that cardiac imaging is considered for slit-slat. This new fan-beam would have a cross-over point of 24 cm in diameter (i.e., slit-slat is more sensitive for objects through 24 cm in diameter); the parallel-beam would cross at 31 cm in diameter. These cross-over points require no truncation of the object, as in FIGS. 21a, 21b, and 21c, causing multislit-slat to have a larger radius of rotation than parallel-beam and fan-beam to avoid truncation. When truncation is allowed (except for the ROI), multislit-slat gains since it can move closer to the ROI, which improves both resolution and sensitivity. In contrast, parallel-beam and fan-beam cannot move closer since they are limited by the body contour. Thus, when truncated projections are considered, FIGS. 21a, 21b, 21c, and 24 provide a lower bound on the performance of multislit-slat compared with fan-beam. Table 3 shows the cross-over points for parallel-beam and fan-beam when an ROI of a given fractional diameter of the object is considered. There is a dramatic improvement going from 100% ROI to 95% or 90% since the radius of rotation (ROR) is decreasing. Afterwards, the ROR cannot decrease further because the multislit-slat also reaches the body contour.

This more realistic assessment has also been applied to cardiac imaging. Multislit-slat is more sensitive than the Siemens UHRPB by 85% and the UHRFB by 34%, for equal average resolutions.

Cardiac Imaging

Figure 25:
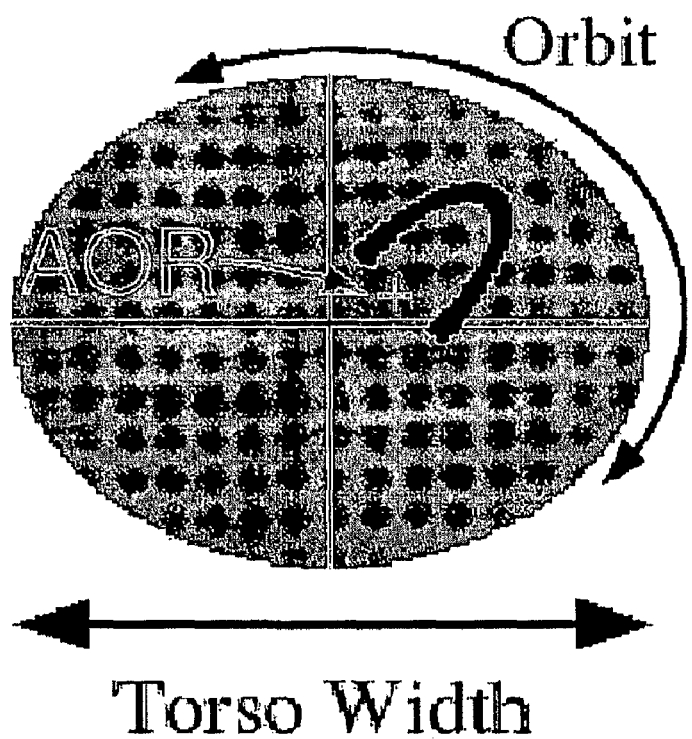
FIG. 25 shows the digital phantom used to assess cardiac-imaging potential of multislit-slat collimation. The body contour is shown as gray and the cardiac region as black. The axes shown are centered on the elliptical torso. The small '+' indicates the axis of rotation (AOR); a perpendicular from the center of the detector always contains the AOR. The phantom was scaled to assess the potential for different body sizes. The approximate camera orbit is shown.

An assessment of multislit-slat for cardiac imaging was performed using a digital phantom and truncated projections. In other words, the average resolutions and sensitivities of the collimators were assessed only over the cardiac region of the body. It is required that the collimators do not truncate the heart during a 180-degree rotation (left posterior oblique through right anterior oblique) and that the average resolutions be the same. The axis of rotation, shown in FIG. 25, is slightly off the body axis towards the heart, similar to how clinical scans are performed at The University of Pennsylvania. The collimators follow the body (elliptical with eccentricity 0.64) contour with a 1 cm clearance. The digital phantom is shown in FIG. 25; it is scaled to different sizes to assess sensitivity as a function of body size.

Figure 26:
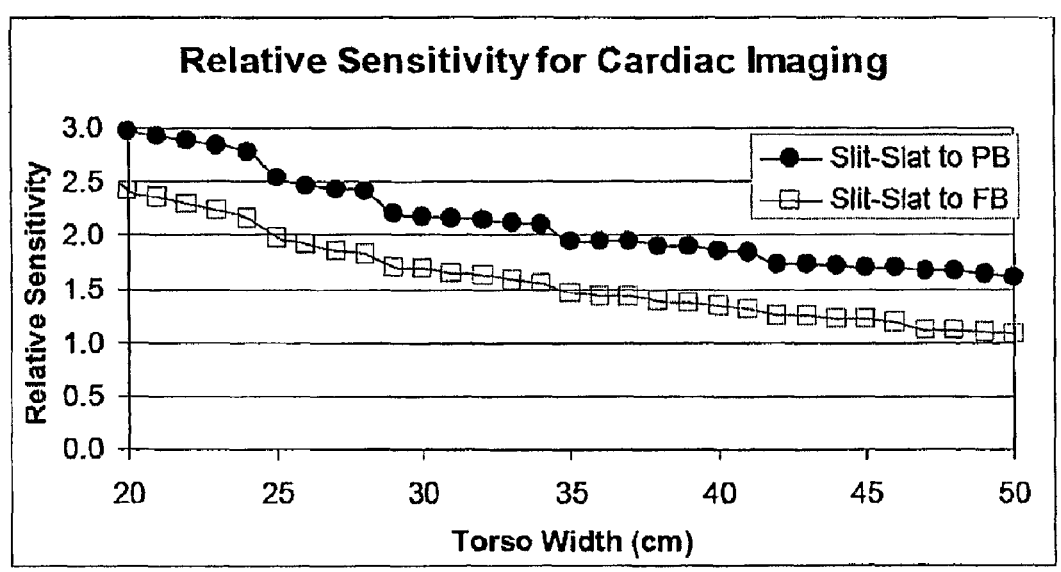
FIG. 26 shows relative sensitivity of multislit-slat to a Siemens ultra-high resolution parallel-beam (circles) and fan-beam (squares) collimators These ratios are for matched average resolutions over the heart.

FIG. 26 shows the relative sensitivities of the collimators over the cardiac region as a function of torso width (See FIG. 25). For a torso width (major axis) of 40 cm, at the same value of average resolution, slit-slat is 85% more sensitive than the Siemens UHRPB and 34% more sensitive than a fan-beam collimator of the same hole parameters as the UHRPB, but with a focal length of 65 cm. The UHRFB and multislit-slat have equal sensitivity for torso widths of 55 cm, but an untruncated complete orbit for the fan-beam can be obtained only for torsos smaller than 53 cm. Siemens does not offer an ultra-high-resolution fan-beam, so hole parameters from the parallel-beam were used with the stated focal length. Siemens does offer a general-purpose fan-beam with a focal length of 45 cm. This collimator's average resolution was worse by about 25% in each dimension, although its average sensitivity was about 100% higher than the UHRFB. Most of this improvement is due to the shorter focal length, which reduces the field of view. This shorter focal length would truncate the cardiac region of the digital phantom for patients with torso width greater than 41 cm when using a body-contour orbit with a 1 cm clearance margin. Orbits with a larger margin would truncate at an even smaller torso width. Thus, the 65 cm focal length was used, a common commercially available focal length.

Chang, W., H. Liang and J. Liu (Assessing geometric efficiency of cardiac SPECT systems. J NUCL MED MEETING ABSTRACTS, 2006. 47(suppl_1): p. 120P-a-) have independently found a factor of 2.7 improvement for slit-slat over parallel-beam on the MarC-SPECT dedicated cardiac scanner.

Example 2

Single-pinhole Sensitivity

The effect of aperture penetration by high-energy photons on pinhole sensitivity has previously been investigated. Not all photons are stopped by the aperture. An analytic expression has been derived for the angle and depth dependence of the sensitivity of pinhole collimators, including the significant, often dominant, edge-penetration term. It has been found that the new analytic expression agrees well with experimental measurements of sensitivity over a range of aperture diameters, collimator materials and photon energies. Independent experimental confirmation was made by Williams et al. (Investigation of efficiency and spatial resolution using pinholes with small pinhole angle. IEEE Transactions on Nuclear Science, 2003. 50(5): p. 1562-1568). The general equation derived for pinhole sensitivity is:

$$S_{total} \approx \frac{d^2 \sin^3\theta}{16h^2} + \frac{\sin^5 \tan^2 \frac{\alpha}{2}}{8h^2\mu^2}\left(1 - \frac{\cot^2\theta}{\tan^2\frac{\alpha}{2}}\right)^{1/2}\left[1 - \frac{\cot^2\theta}{\tan^2\frac{\alpha}{2}} + \mu d \csc\theta \cot\frac{\alpha}{2}\right]$$

(EQ. 71)

wherein μ is the attenuation coefficient of the collimator material, d is the aperture diameter, α is the opening angle of the pinhole aperture knife-edge, h is the distance from the plane of the aperture to the point source, and θ is the angle between the plane of the aperture and the line that passes through the pinhole center and the point source.

EQ. 71 can be used to derive the (sensitivity-) effective diameter:

$$d_e^2 = d(d + 2\mu^{-1}\tan\alpha/2 + 2\mu^{-2}d^{-1}\tan^2\alpha/2)$$

(EQ. 72)

EQ. 72 has been reported as an exact solution for Anger's effective diameter.

Figure 27:
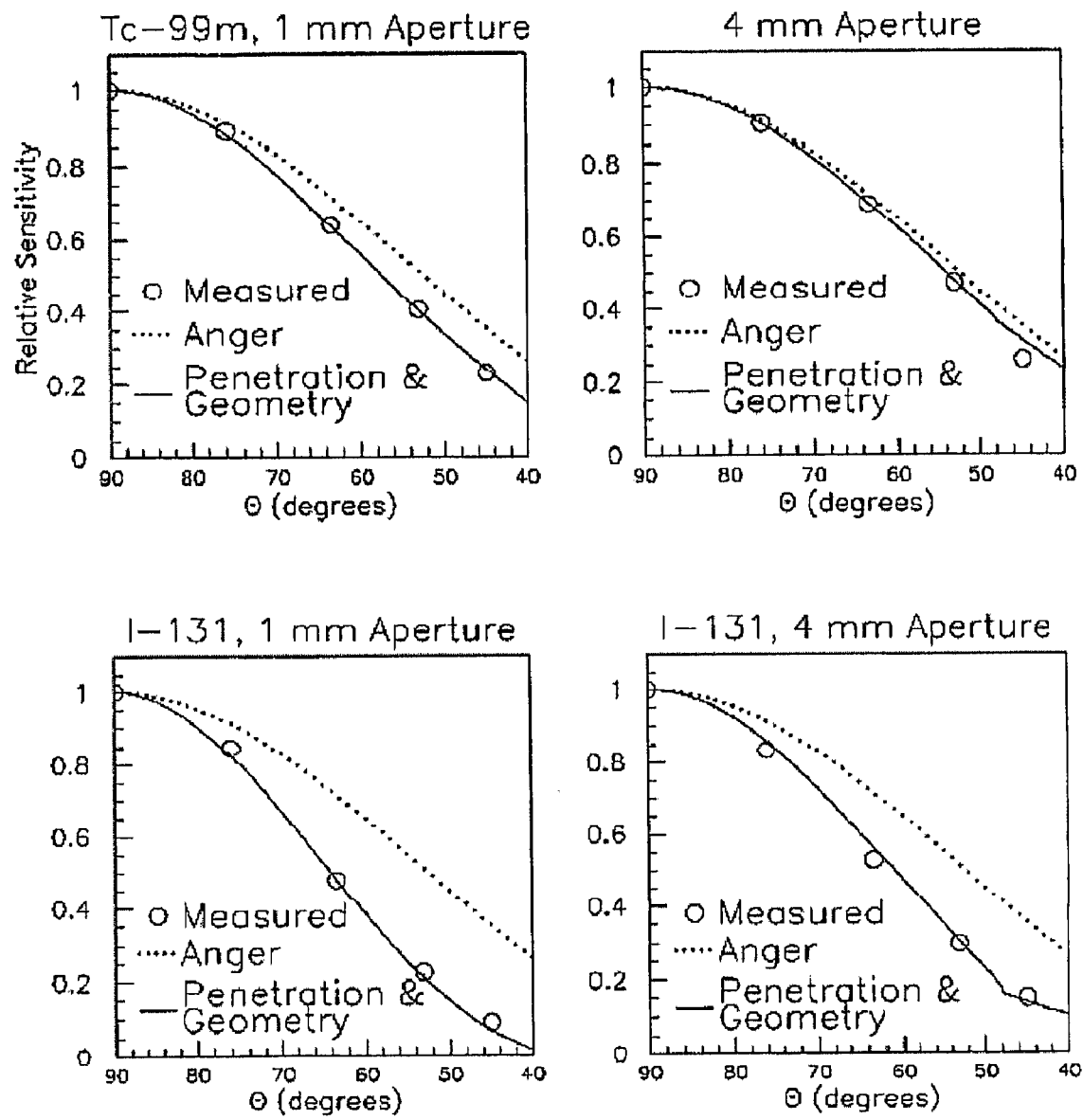
FIG. 27 shows experimental data obtained using Tc-99m (top) and I-131 (bottom) sources and a tungsten pinhole collimator compared with theoretical curves for geometric-only (Anger) and summed penetrative and geometric sensitivities. There are no free parameters for these curves except for an overall normalization to 1 at θ=90 deg.

FIG. 27 shows the full (i.e., geometric plus penetrative) relative sensitivity predictions of EQ. 71 (solid line), prediction of the effective diameter (dotted line) and experimental measurements (open circles).

A common approach to approximating penetrative contributions has been to utilize an effective diameter and to parameterize the angular dependence as $\sin^x\theta$, where x is determined by fitting to detailed simulations or empirical measurements. EQ. 71 itself provides a purely analytical accurate prediction of the angular dependence (solid line, FIG. 27) or it can be used to derive a general expression for the optimal x, which may be found in Metzler et al. (Analytic determination of pinhole collimator sensitivity with penetration. IEEE Transactions on Medical Imaging, 2001. 20(8): p. 730-741). The resulting simple yet purely analytically obtained $\sin^x\theta$ curve agrees well with experimental measurements (Table III in Metzler et al. "Pinhole collimator sensitivity").

Example 3

Single-Pinhole Point-Spread Function

An analytic form for the point-response function (PRF) of a pinhole aperture has been derived. The function is:

$$PRF = \begin{cases} \dfrac{\sin^3\theta}{4\pi(h+b)^2}, & r \leq \dfrac{d(h+b)}{2h} \\ \dfrac{\sin^3\theta}{4\pi(h+b)^2} e^{-\mu\Delta L}, & r > \dfrac{d(h+b)}{2h} \end{cases}$$

(EQ. 73)

The multi-line equation for ΔL may be found in reference Metzler et al. equation 5 (Analytic determination of the pinhole collimator's point-spread function and RMS resolution with penetration. IEEE Transactions on Medical Imaging, 2002. 21(8): p. 878-887).

Figure 28:
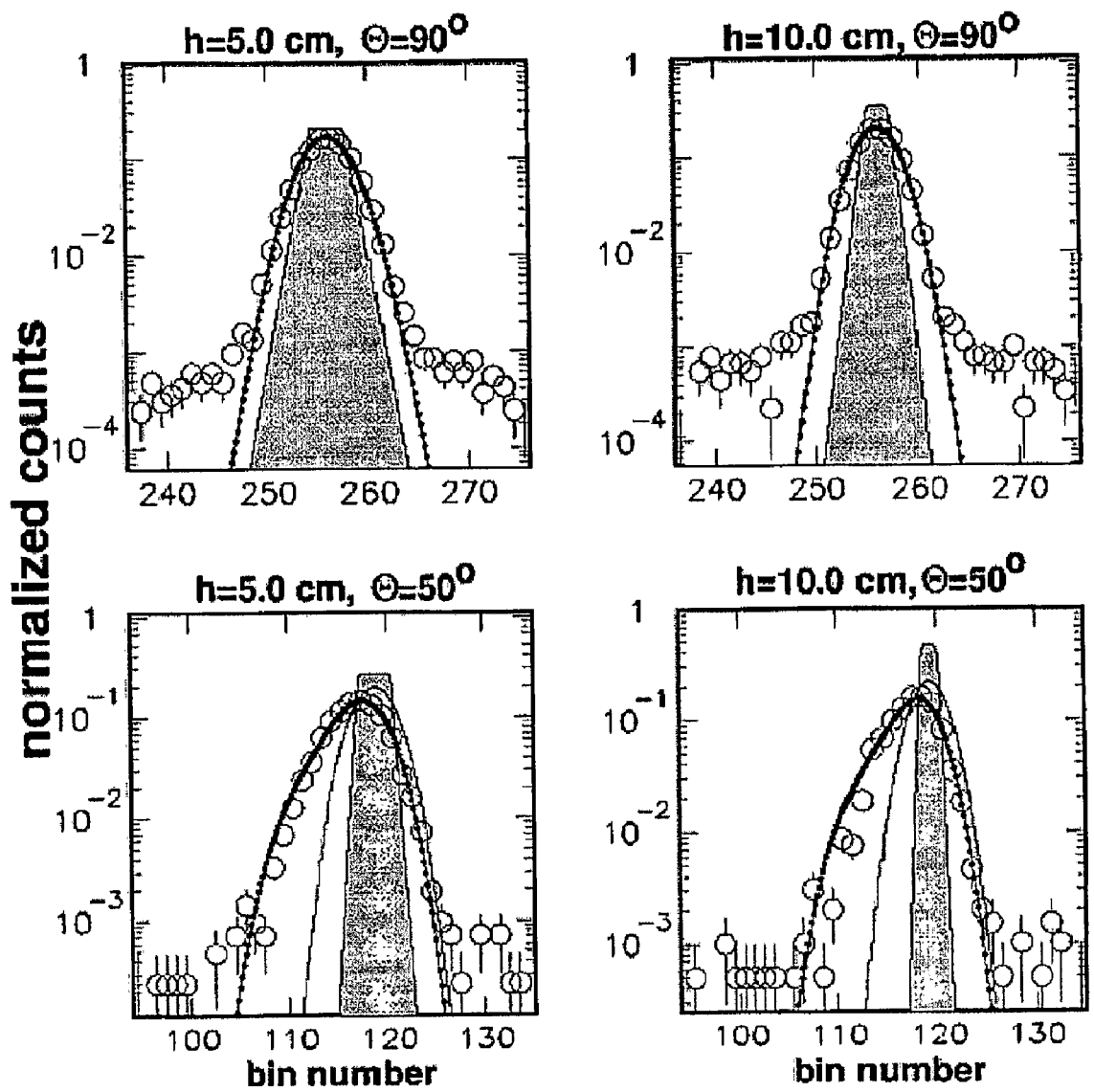
FIG. 28 shows normalized longitudinal profiles for a Tc-99m source with a 0.77 mm diameter. Experimental data (open circles) are shown with the theoretical PRF (shaded histogram). The theoretical curve is then convolved with Gaussian detector resolution of 3.5 mm FWHM (solid line) and convolved with exponential parallax and Gaussian resolution (small black circles). The heights above the aperture plane are 5.0 cm (left) and 10.0 cm (right). The acquisition angles are Θ=90° (top) and Θ=50° (bottom).

FIG. 28 shows normalized longitudinal profiles of the experimental data for a 0.77 mm-diameter, 101° opening angle tungsten aperture. A similar figure for a 4.0 mm-diameter, 84° opening angle tungsten aperture is in Metzler et al. "Pinhole collimator's point-spread function" FIG. 7. A Tc-99m line source was used for the acquisition.

Example 4

Effective Diameters

The distinction of sensitivity-effective and resolution-effective diameters has recently been introduced (Accorsi, R. and S. D. Metzler: Analytic determination of the resolution-equivalent effective diameter of a pinhole collimator. IEEE Transactions on Medical Imaging, 2004. 23(6): p. 750-763). It has been found in the literature that resolution had been estimated by using the effective diameter of Paix (Pinhole Imaging of Gamma Rays. Physics in Medicine & Biology, 1967. 12(4): p. 489-500), which had been calculated based on equivalent sensitivity. In introducing resolution-effective diameters, it has been found that the direction of measurement is important. Two orthogonal directions were calculated: parallel to the direction of tilt (θ measures this tilt) and perpendicular. The formulas are:

$$d_{re\parallel} \approx d + \Delta L_k \left(\tan^2\frac{\alpha}{2} - \cot^2\theta\right)\cot\frac{\alpha}{2}\sin\theta \qquad \text{(EQ. 74)}$$

$$d_{re\perp} \approx \sqrt{\left(d + \Delta L_k \tan\frac{\alpha}{2}\sin\theta\right)^2 - \Delta L_k^2 \cos^2\theta}$$

This has been followed up with experimental evaluation and has good agreement with the predictions of EQ. 74. FIG. 11 of Metzler, S. D. and R. Accorsi (Resolution- versus sensitivity-effective diameter in pinhole collimation: experimental verification. Physics in Medicine and Biology, 2005. 50(21): p. 5005-5017) shows the measured resolution-effective diameters.

Example 5

Simulation Studies of Axial Blurring from Incomplete Sampling

Simulations of helical orbits using a digital (computer-simulated) disk (Defrise) phantom have been performed. The digital phantom hag five disks of uniform activity. The disks are 2.848 cm in diameter and have a thickness of 0.178 cm. The disks are separated by 0.178 cm. The simulated tungsten aperture was 0.77 mm in diameter with a 101° opening angle. The focal length of the pinhole collimator was 16.3 cm. The simulation modeled the geometric and penetrative sensitivity of the collimator and also includes both obliquity and detector resolution effects.

Figure 29:
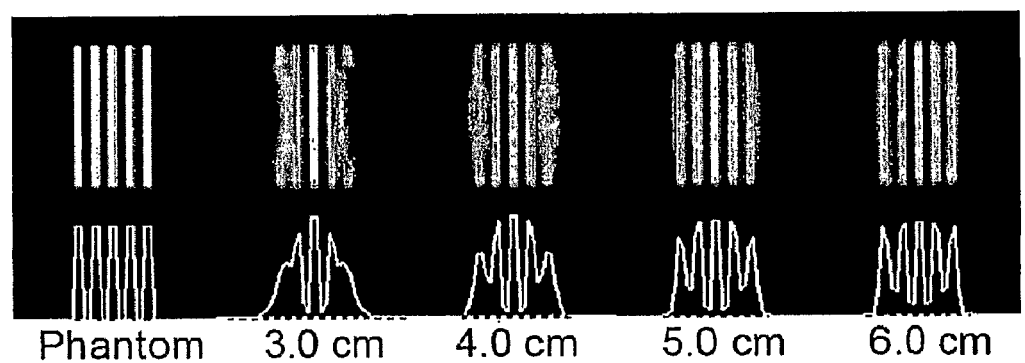
FIG. 29 shows central coronal slices of simulated reconstructions from circular orbits. A digital (computer-simulated) phantom, based on an experimental phantom with five disks was aligned with the axis of rotation of the pinhole collimator. Projections were simulated for RORs of 3.0 cm, 4.0 cm, 5.0 cm, and 6.0 cm. The projections were reconstructed using an iterative algorithm. The central coronal slices of the reconstructions (top) and their profiles (bottom) are shown. Axial blur is worse for smaller ROR.

FIG. 29 compares the central coronal slices for reconstructions from circular-orbit projections (128 views over a 360° rotation). The ROR was varied (3.0 cm, 4.0 cm, 5.0 cm, 6.0 cm). Profiles of the reconstructed slices are also shown. The reconstructions show that axial blurring worsens as the ROR decreases.

Figure 30A:
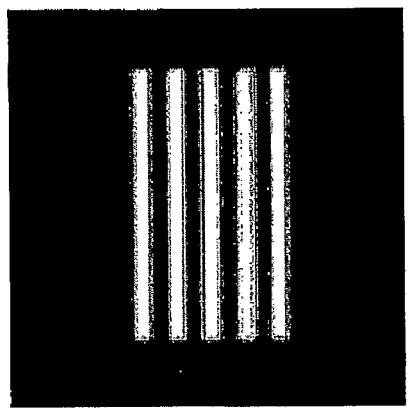
FIG. 30a shows a coronal view of digital disk phantom and reconstructions of simulated noise-less projections. Disks of a digital disk phantom (2.848 cm in diameter; 0.178 cm thick).
Figure 30B:
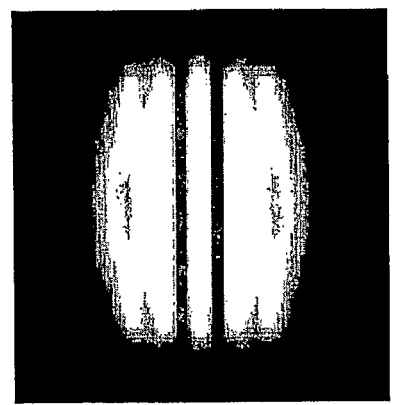
FIG. 30b shows a coronal view of digital disk phantom and reconstructions of simulated noise-less projections. Reconstruction of simulated projections for circular orbit with an ROR of 4.0 cm The circular-orbit reconstruction has significant axial blurring
Figure 30C:
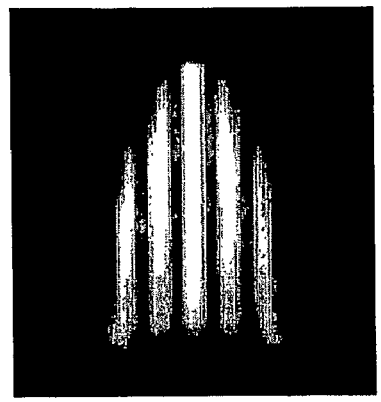
FIG. 30c shows a coronal view of digital disk phantom and reconstructions of simulated noise-less projections. Reconstruction of simulated projections for helical orbit with an ROR of 3.0 cm and axial travel of 2.56 cm. The ROR is too small to give complete sampling with only one pinhole.
Figure 30D:
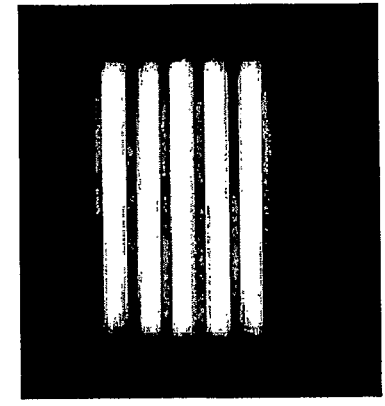
FIG. 30d shows a coronal view of digital disk phantom and reconstructions of simulated noise-less projections. Reconstruction of simulated projections for helical orbit with an ROR of 3.5 cm and axial travel of 2.56 cm. The helical-orbit reconstruction does not have significant axial blurring.

FIGS. 30a, 30b, 30c, and 30d compare reconstructions from circular-orbit and helical-orbit projection data. The circular-orbit projection used 128 views over a 360° rotation. FIG. 30b shows the reconstruction for circular-orbit projections with a 4.0 cm ROR. All of the phantom's disks are significantly blurred except for the central disk. The four non-central disks are not completely sampled. The two helical-orbit projections used 128 views over a 360° rotation. The simulation translated the collimator axially 0.02 cm per view for a total axial movement (travel) of 2.54 cm ((128-1) axial movements*0.02 cm/movement). FIG. 30c shows the reconstruction for helical-orbit projections with a 3.0 cm ROR. The aperture was too close to the phantom to completely sample the entire volume since only one collimator/detector was used. FIG. 30d shows the reconstruction for helical-orbit projections with a 3.5 cm ROR. The reconstruction is markedly better.

Example 6

Experimental Helical Pinhole SPECT

Equipment

Figure 31A:
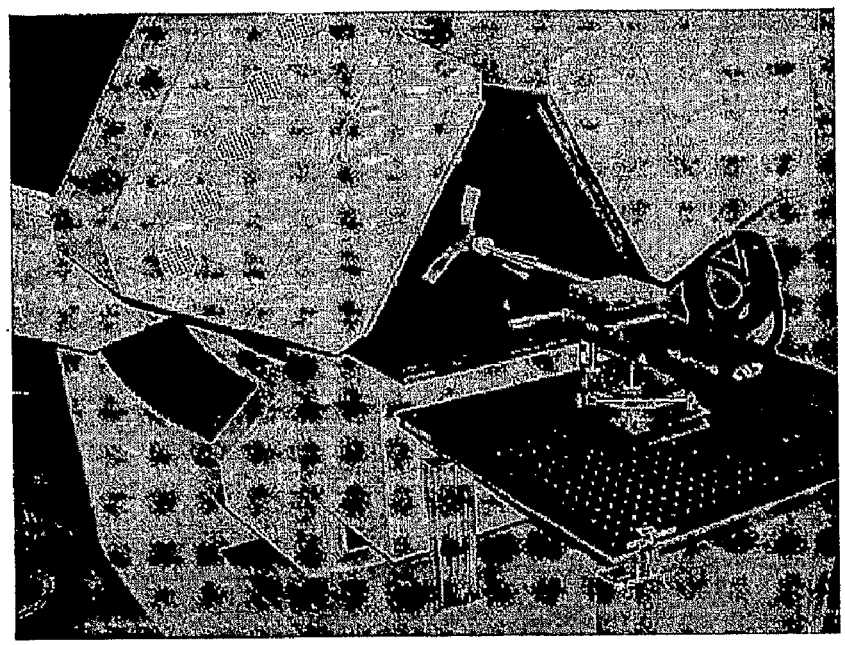
FIG. 31a shows a robotic stage aligned with the AOR.
Figure 31B:
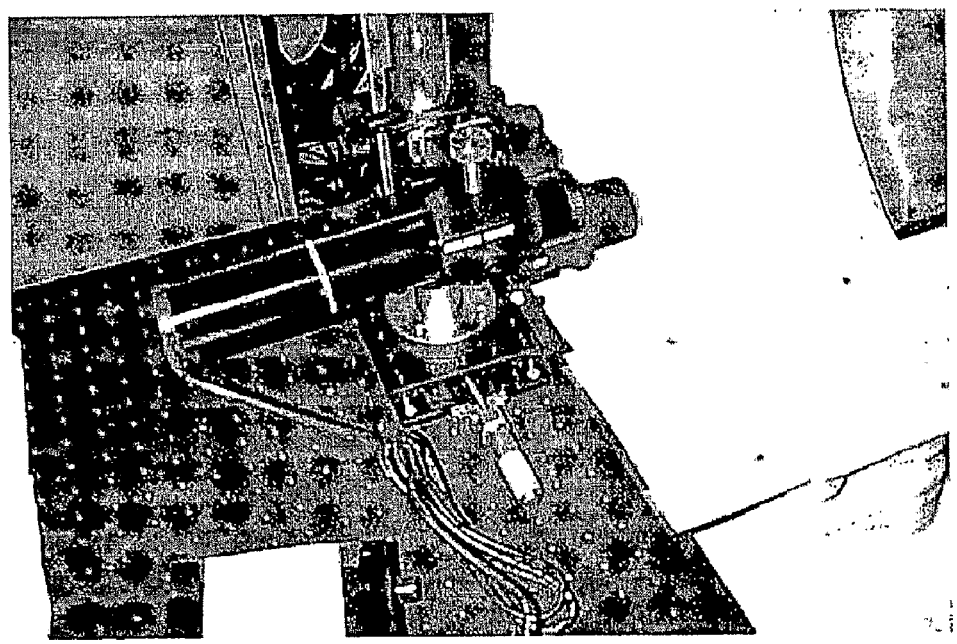
FIG. 31b shows a laser aligned with the AOR. The linear stage is then aligned with the laser.

A robotic linear stage (FIG. 31a) was aligned so that its direction of motion was parallel with a laser beam (FIG. 31b), which was aligned with the AOR. Therefore, the stage was aligned with the AOR. The scanner acquired data using a circular orbit while the stage pushed the phantom along the AOR, yielding an effective helical orbit.

Phantom

Experimental phantom data for helical pinhole SPECT were acquired using a 42 mm-diameter micro cold-disk phantom (Data Spectrum Corp., Hillsborough, N.C.) filled with Tc-99m. The five active (hot) disks were 3.9 mm thick and separated by 4.3 mm. The phantom has two caps at one end for filling.

Figure 32:
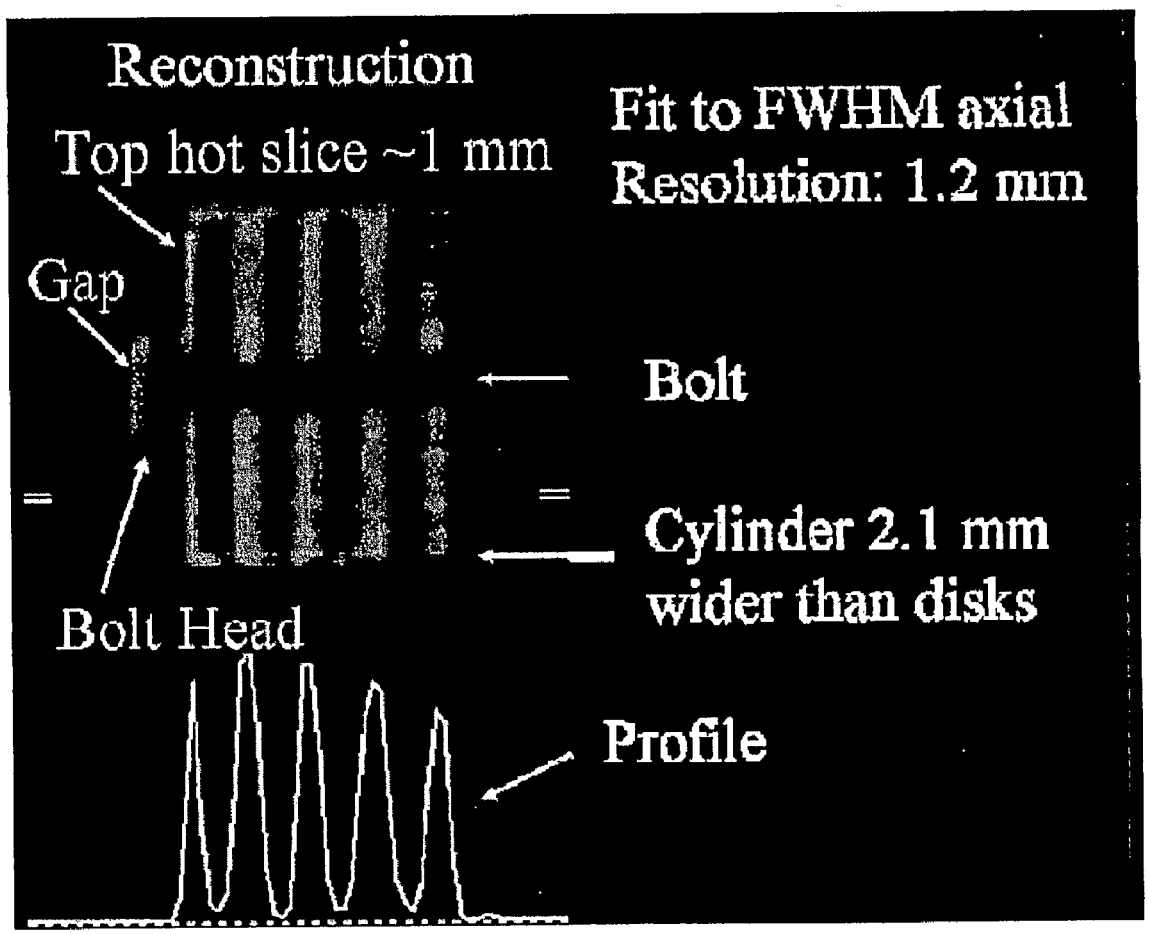
FIG. 32 shows a coronal slice of Micro-Defrise phantom (Data Spectrum Corp.). The disk diameters are 44 mm and the thicknesses are 3.9 mm for the hot region and 4.3 mm for the cold. A profile through the slice is shown. This profile was fit to estimate axial resolution at 1.2 mm FWHM. There is sufficient resolution to clearly resolve: (1) all the hot and cold disks; (2) the center bolt and its head; and (3) the 1.1 mm gap on each side of the cold disks.

FIG. 32 shows the central coronal slice of the reconstruction and its profile. The reconstruction shows substantial structure, including the bolt used to hold the disks and the thinner hot slice where the phantom is filled (approximately 1 mm instead of 3.9 mm).

2004 SNM Co-Image of the Year

Figure 33:
FIG. 33 shows parallel-beam reprojection of a mouse MDP bone scan. Reprojections for circular (left) and helical (right) orbits are shown. The ROR was 27 mm. The helical scan, unlike the circular, shows the whole body and does not show axial blurring artifacts.

The same helical system was used to acquire a mouse MDP (bone) scan. The mouse was imaged using a circular and a helical orbit (FIG. 33). The helical orbit shows a large field of view and good image quality. Dr. Henry Wagner selected this image as the 2004 Co-Image of the Year at the annual meeting of the Society of Nuclear Medicine.

Example 7

Mechanical and Electronic Calibration

Mechanical and electronic shifts are defined below. These are sometimes referred to in the context of "center-of-rotation" correction. After defining the terms relevant for single-pinhole calibration, data is shown on the effect of uncompensated shifts. A method developed for determining the shifts for single-pinhole is described. Below is described how these shifts affect slit-slat imaging and a method for measuring them.

Definition of Shifts

Figure 34:
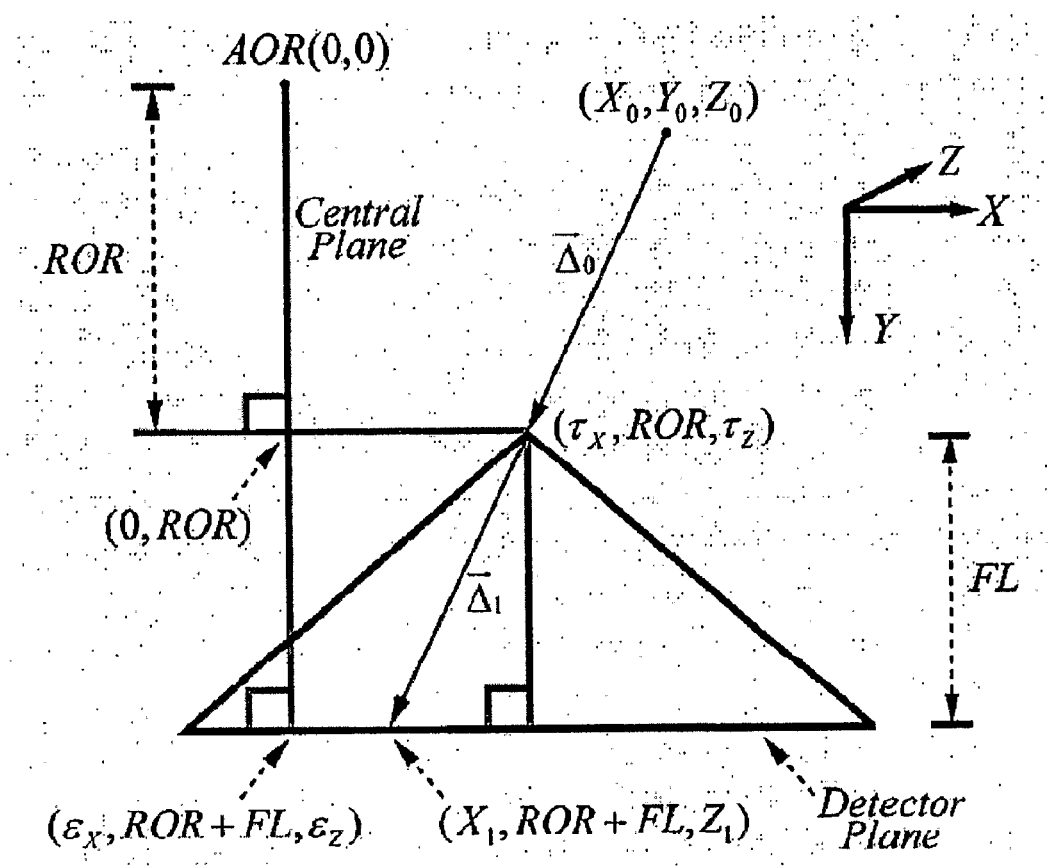
FIG. 34 shows schematic representation of mechanical and electronic shifts. The mechanical and electronic shifts are defined with respect to the axis of rotation (AOR). The figure shows a transverse view. A point source at (X0,Y0,Z0) and its projection are also shown. The mechanical shift is exaggerated for clarity.

FIG. 34 shows a diagram of a single-pinhole collimator that has mechanical and electronic shifts.

Mechanical

Mechanical shifts determine the position of the center of the aperture relative to the AOR. These shifts are a property of the aperture. The central axial plane is perpendicular to the detector plane and contains the AOR. In a well aligned system, that plane would also contain the center of the aperture The transaxial mechanical offset ($\tau_x$) is the distance from this plane. The transaxial shift can be defined because there is a reference point, the AOR. For slit-slat, the axial mechanical shift is not expected to be relevant unless the sensitivity and PSF depend on the axial displacement from the septa.

Electronic

Electronic shifts determine the readout position of a photon. Electronic shifts are a property of the detector. The electronic shift is the difference between the actual electronic readout of a particular physical position on the detector and its expected readout. If a source is collimated in the central plane and perpendicular to the detector, the expected transverse readout is zero. The actual transverse readout is the transverse electronic shift ($\epsilon_x$). Electronic shifts may be corrected by shifting the projection data Mechanical shifts may not be corrected this way. It is expected that the axial electronic shift ($\epsilon_z$) is relevant only when jointly reconstructing projections from multiple collimators.

Importance of Accurate Mechanical and Electronic Calibration

Figure 35A:
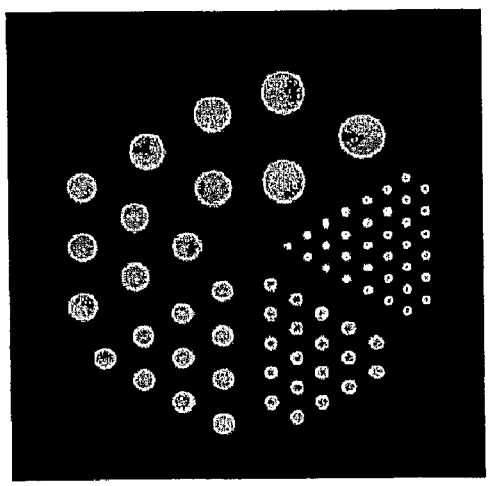
FIG. 35a shows comparison of reconstruction from simulated hot-rod projections with no shift. Pixel size was 0.2 cm. 250 iterations of MLEM were used.
Figure 35B:
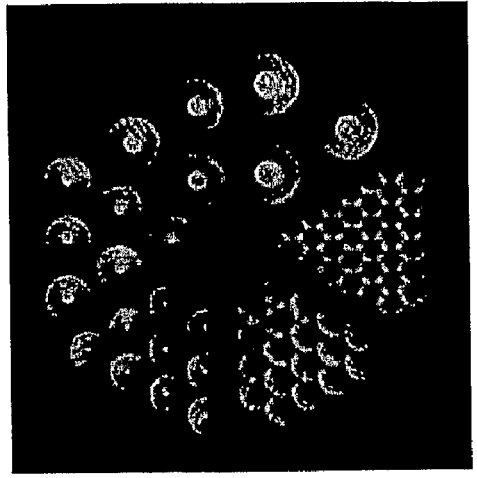
FIG. 35b shows comparison of reconstruction from simulated hot-rod projections with 1.0 mm mechanical shift. Pixel size was 0.2 cm. 250 iterations of MLEM were used.
Figure 35C:
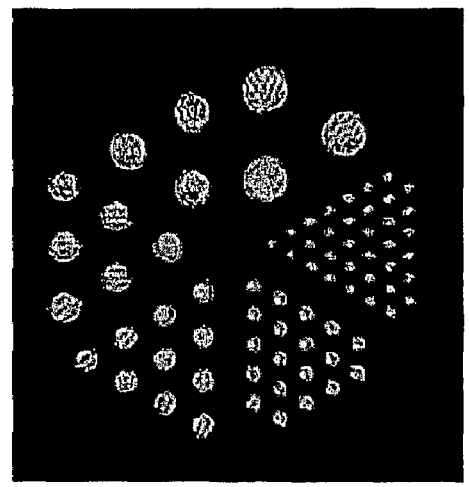
FIG. 35c shows comparison of reconstruction from simulated hot-rod projections with 1.0 mm electronic shift. Pixel size was 0.2 cm. 250 iterations of MLEM were used.
Figure 36A:
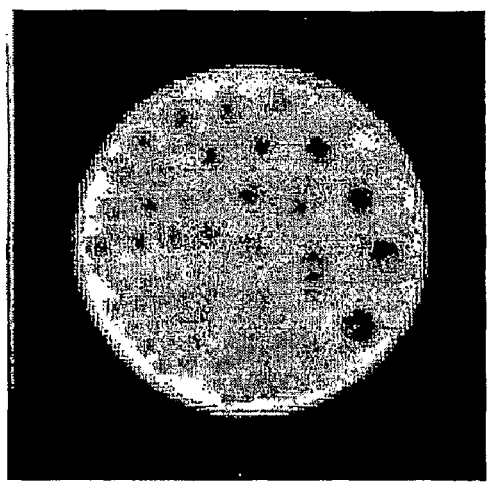
FIG. 36a shows experimental reconstructions of micro cold-rod phantom using iterative reconstruction modeling penetrative sensitivity and PSF. A transaxial slice is shown for mechanical shift correction in the correct direction. Rod diameters are about 1.2, 1.6, 2.4, 3.2, 4.0, and 4.8 mm.
Figure 36B:
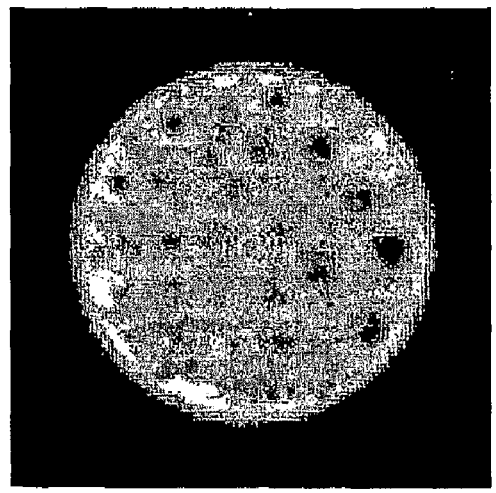
FIG. 36b shows experimental reconstructions of micro cold-rod phantom using iterative reconstruction modeling penetrative sensitivity and PSF. A transaxial slice is shown for no mechanical shift correction. Rod diameters are about 1.2, 1.6, 2.4, 3.2, 4.0, and 4.8 mm.
Figure 36C:
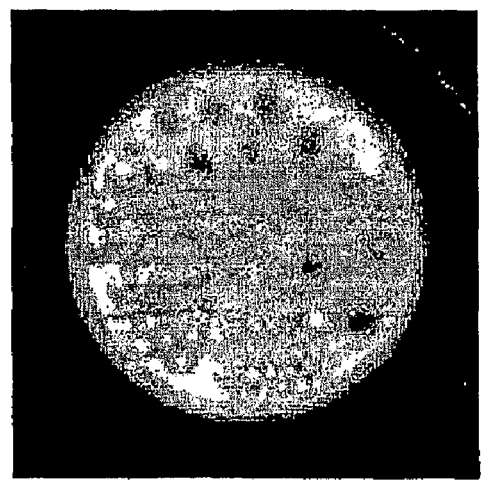
FIG. 36c shows experimental reconstructions of micro cold-rod phantom using iterative reconstruction modeling penetrative sensitivity and PSF. A transaxial slice is shown for mechanical shift correction in the wrong direction. Rod diameters are about 1.2, 1.6, 2.4, 3.2, 4.0, and 4.8 mm.
Figure 37A:
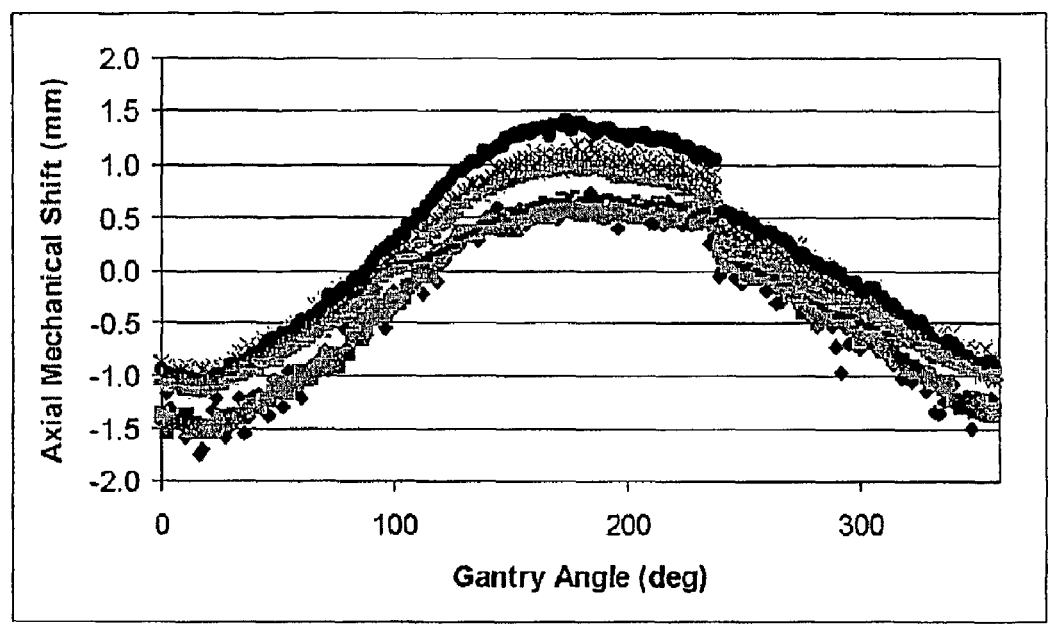
FIG. 37a shows calculated axial mechanical shift versus gantry angle for one gamma camera (Head 3). Several different data sets are shown. A large discontinuity is evident at 240 deg., which is where this camera begins and ends its motion. Head 2 shows a similar magnitude for its variation. Head 1, which is more rigidly attached, shows about half the magnitude.
Figure 37B:
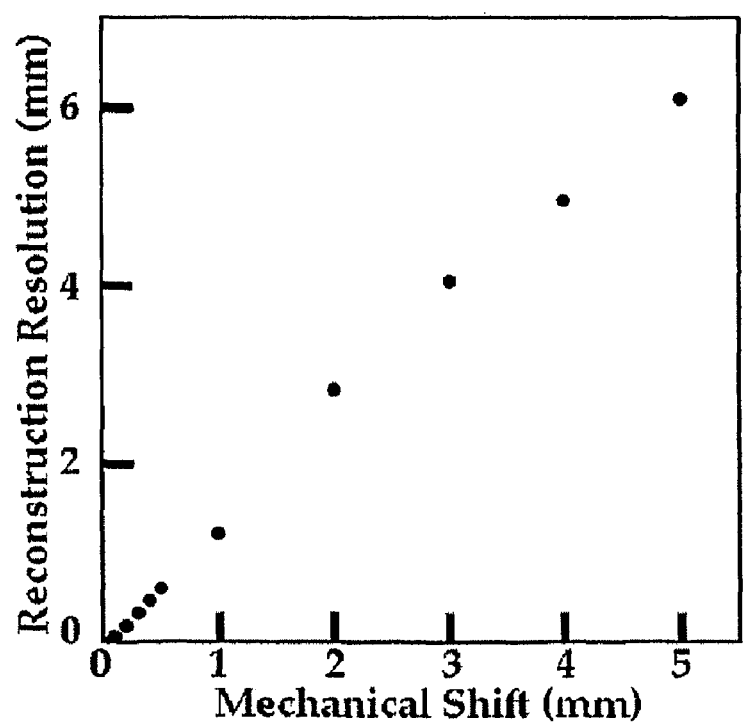
FIG. 37b shows resolution degradation (FWHM) versus mechanical shift for cold-rod phantom.
Figure 37C:
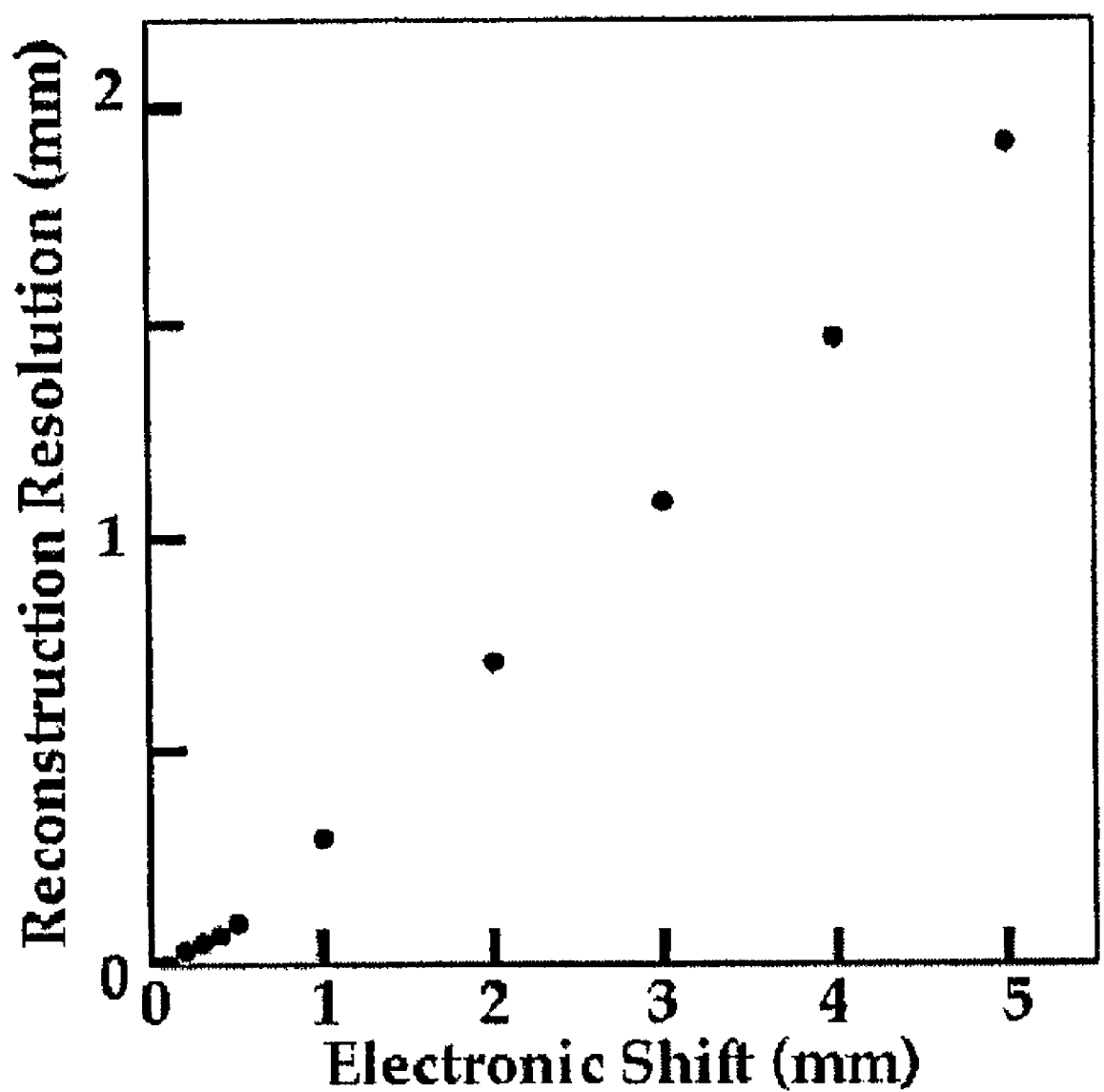
FIG. 37c shows resolution degradation (FWHM) versus electronic shift for cold-rod phantom.

A digital hot-rod phantom was used to generate simulated projection data of a pinhole collimator following a circular orbit (ROR=5.0 cm; focal length=15.0 cm). The simulation was for a single slice—equivalent to either the central slice of single-pinhole or to any axial slice of slit-slat. The simulation allowed for the introduction of both mechanical and electronic shifts in the projection data. The projections were reconstructed using MLEM without accounting for mechanical or electronic shifts. This typically introduced artifacts into the reconstruction, as may be seen in FIGS. 35a, 35b, and 35c. The effect in experimental data may be seen in FIGS. 36a, 36b, and 36c. For small shifts, the resolution degradation can be estimated by determining the least squared difference between the reconstruction and the phantom after it is convolved with Gaussian resolution. FIGS. 37b and 37c show the resolution degradation for mechanical and electronic shifts.

Point-Source Determination of Shifts

A method for measuring the mechanical ($\tau$) and electronic shifts ($\epsilon$) of a pinhole collimator system by using a point source has been developed. The point source is scanned using a parallel-beam collimator; the average value of the centroids over a 360 deg. scan is equal to the electronic shift. This scan is only needed infrequently because the electronic shift is relatively stable. After every imaging session with pinhole collimation, a point-source scan is performed. This scan, when the electronic shift is known, gives the mechanical shift of the aperture by fitting to the expected transverse (x) and axial (z) centroid locations (y measures the distance from the AOR to the detector plane). The location's (x,y,z) are:

$$\left( \tau_x + \varepsilon_x + \frac{F(\tau_x - x_0\cos\phi - y_0\sin\phi)}{ROR + x_0\sin\phi - y_0\cos\phi}, \; ROR + F, \; \tau_z + \varepsilon_z + \frac{F(\tau_z - z_0)}{ROR + x_0\sin\phi - y_0\cos\phi} \right) \quad \text{(EQ. 75)}$$

Angular-Dependent Axial Mechanical Shift

Figure 38:
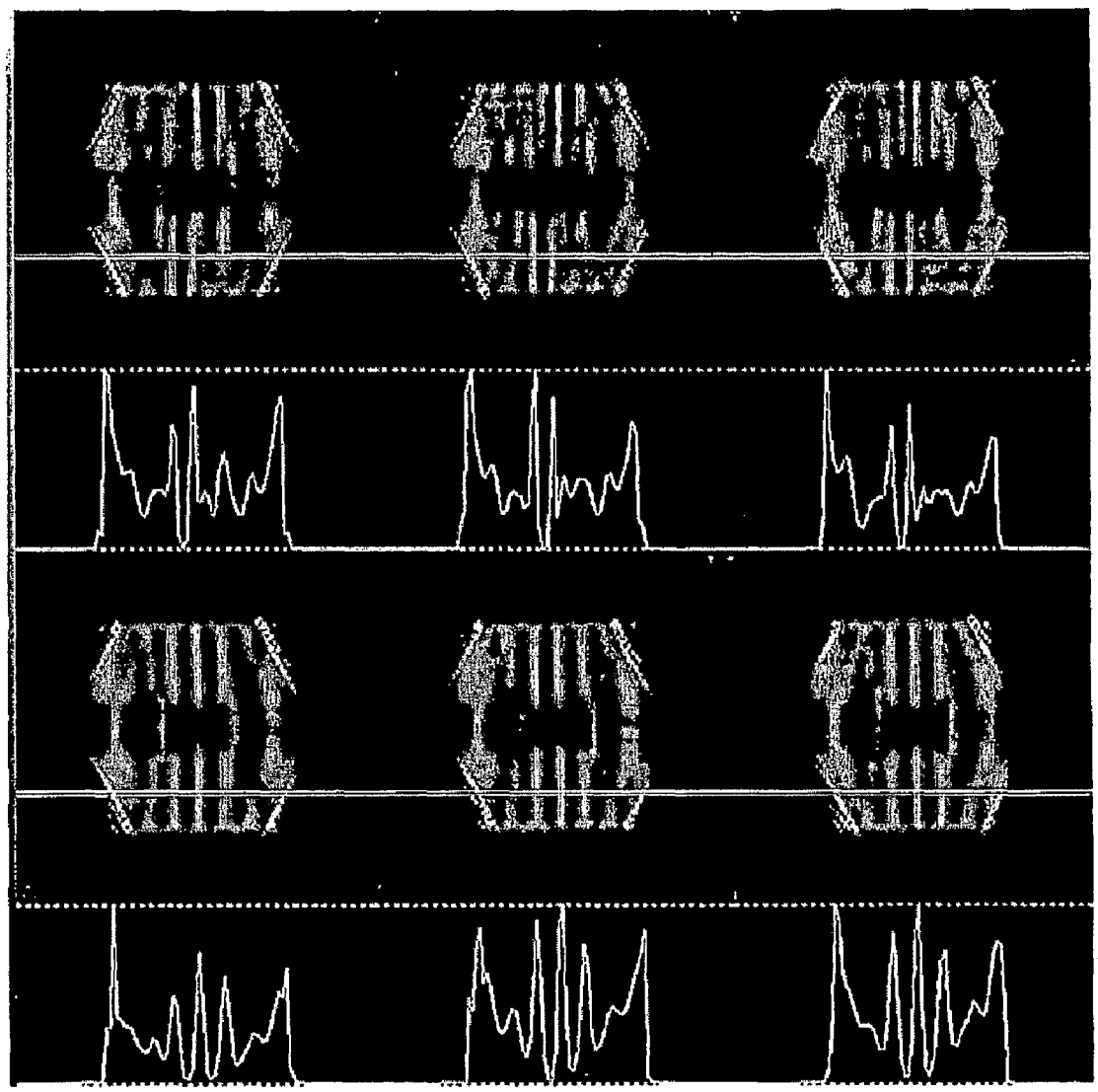
FIG. 38 shows central sagittal slices for reconstructions of an ultra-micro disk phantom without (top) and with (bottom) compensation for angular-dependent axial mechanical shift. Cameras 1-3 (left to right) are reconstructed separately. Distortions in the central three hot slices are evident without compensation. Truncation artifacts are present because of the small ROR. Disks are 1.6 mm thick.
Figure 39:
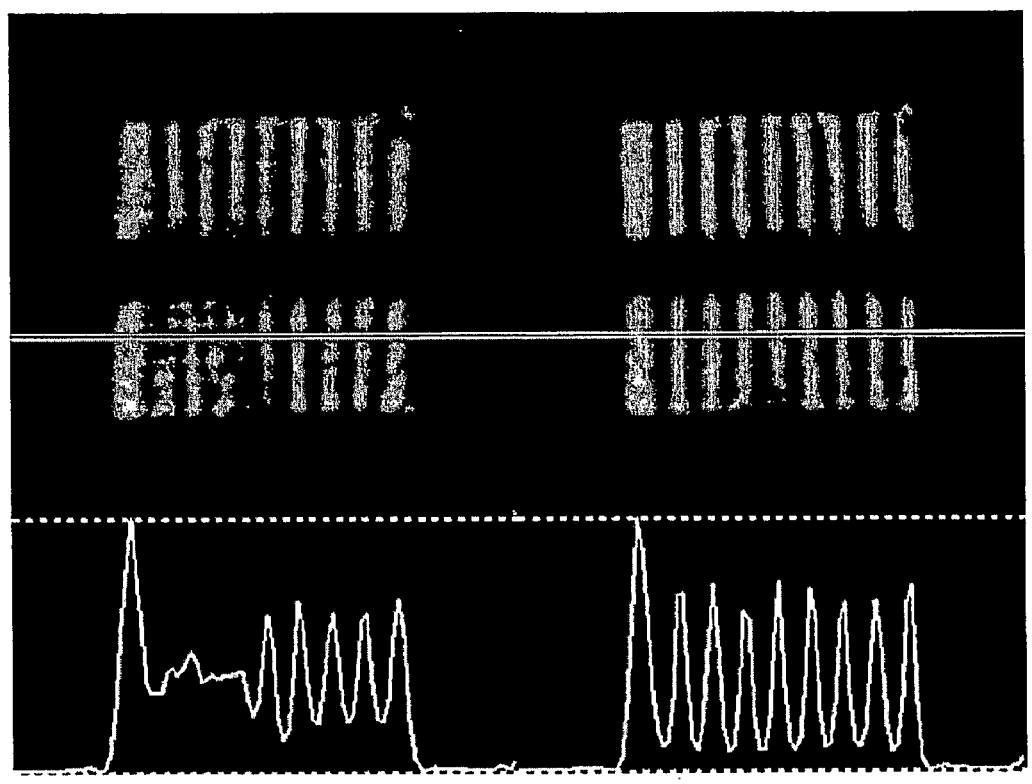
FIG. 39 shows central sagittal slice for helical orbit combining all three camera heads without (left) and with (right) compensation for angular-dependent axial mechanical shift.

It has been found that the collimators and gamma cameras shift and/or tilt during rotation. This is not surprising because of their weight. However, even a small amount of movement can have a large impact on reconstruction results. Under the assumption that the majority of image degradation from tilt is due to the axial shifting of the aperture, a point-source method for measuring the angular-dependent shift for each of the gamma cameras has been developed. The method determines the expected position of the point-source and then calculates the axial shift from the difference with the experimental axial centroid. FIG. 37a shows the measured axial mechanical shifts. FIG. 38 shows the impact on reconstruction of compensating for these shifts when a circular orbit is used. FIG. 39 combines all three heads for a helical orbit.

Example 8

Laser Determination of Axis of Rotation and Angular-Dependent ROR

A laser method for simultaneously measuring the angular-dependent radius of rotation and the axis of rotation has been determined (Metzler, S. D. and N. H. Patil: Measuring the Variation in Radius of Rotation as a Function of Gantry Angle for Ultra-High-Resolution Pinhole SPECT. IEEE Transactions on Nuclear Science, 2005. 52(5): p. 1236-1242). An important experimental aspect is that phantoms are typically contained in a cylinder, the center of which is easily identified since it has a tapped hole for mounting. The hole was aligned with the laser to have a very accurately centered phantom.

Example 9

Lessons Learned from Data

The data show several results relevant to the specific aims:

Slit-slat imaging yields better sensitivity than fan-beam at similar resolution for object diameters up to about 27 cm when using a circular orbit.

Slit-slat imaging yields better sensitivity than fan-beam at similar resolution for cardiac imaging for torso widths through 55 cm. However, at widths greater than 52 cm, fan-beam begins to truncate the cardiac region.

Incomplete sampling can lead to axial blurring for single-pinhole (or cone-beam) collimation. Incomplete sampling occurs when a circular orbit is used. Helical orbits can be used to address complete sampling.

Pinhole imaging is capable of very high resolution imaging.

Calibrating for electronic and mechanical shifts is important for high-resolution imaging.

Calibrating for angular-dependent axial shifts and angular-dependent ROR is important for obtaining high-resolution images.

It is experimentally practical to center a cylindrical phantom on the AOR using a laser.

Example 10

Reconstruction of Phantom SPECT Scans Acquired with a Slit-Slat Collimator

Figure 50:
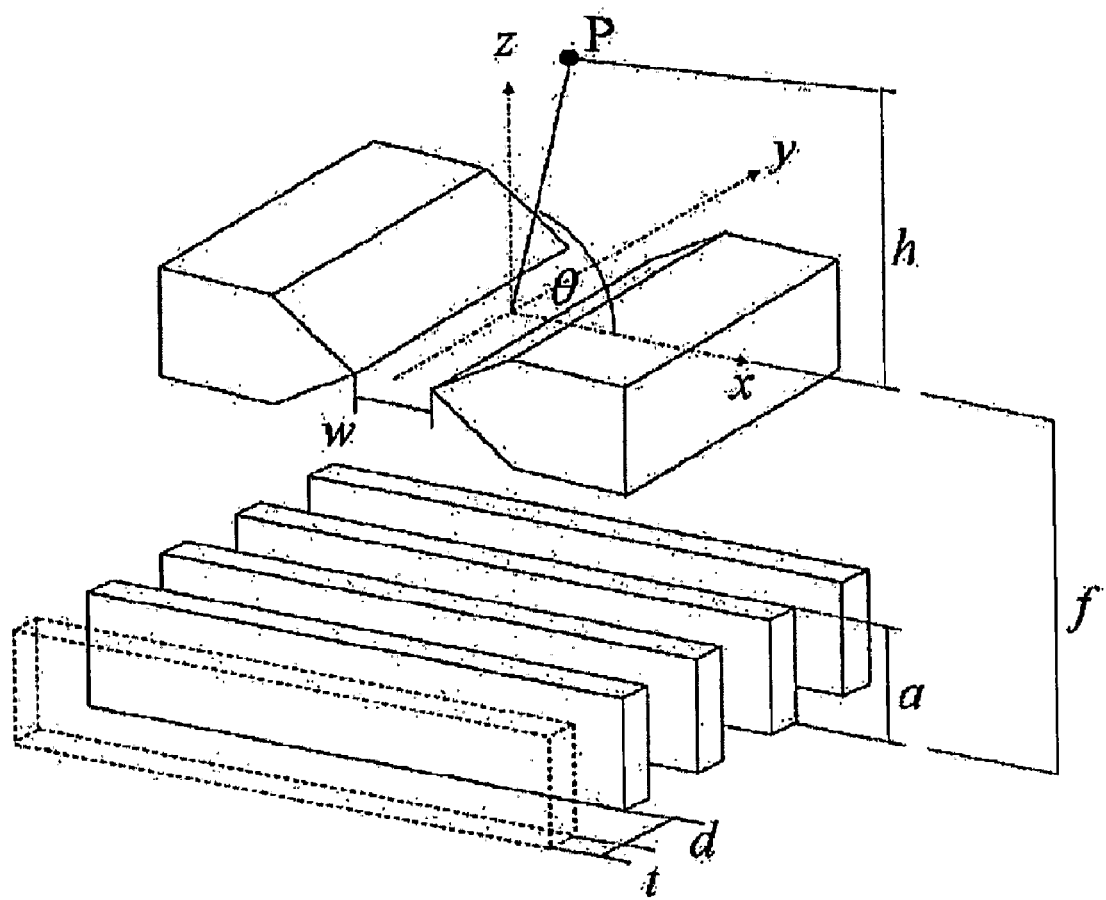
FIG. 50 shows slit-slat geometry.

The slit-slat collimator can be well characterized as a combination of a pinhole collimator in the transverse direction and a parallel-beam collimator in the axial direction. In this model, the transverse resolution behaves like a pinhole collimator and the axial resolution behaves like a parallel-beam collimator:

$$R_o(\text{tran}) = \left[ w^2 \frac{(h+f)^2}{f^2} + \frac{h^2}{f^2} R_i^2 \right]^{\frac{1}{2}} \quad \text{(EQ. 76)}$$

$$R_o(\text{axial}) = \left[ d^2 \frac{(h+f)^2}{a^2} + R_i^2 \right]^{\frac{1}{2}} \quad \text{(EQ. 77)}$$

where w is the slit width, h is the distance from a point source to the slit plane, f is the focal length, measured from the slit plane to the detector, a is the height of the slats, $R_i$ is the detector's intrinsic resolution, and d is the gap between slats. FIG. 50 shows these symbols and also defines $\theta$ as the angle between the point source and the x axis and t as the thickness of the slats. One could define a parameter c (not shown in FIG. 50) as the distance from the bottom of the slats to the detector surface. However, c does not affect the sensitivity or resolution relationships since it is already included in f.

The on-axis sensitivity is given by the geometric mean of a parallel-hole collimator and a pinhole collimator with square holes:

$$g(\text{slit}-\text{slat}) = \frac{wd^2}{4\pi(d+t)ah} \quad (\text{EQ. 78})$$

The sensitivity and resolution have been verified above theoretically, experimentally, and through Monte Carlo. These results are now applied to tomographic imaging of experimentally acquired phantom projections. The calibration and reconstruction procedures are described below. The reconstructed resolution in the transverse direction is shown to be consistent with EQ. 76.

Methods

Prototype Collimator

Figure 51A:
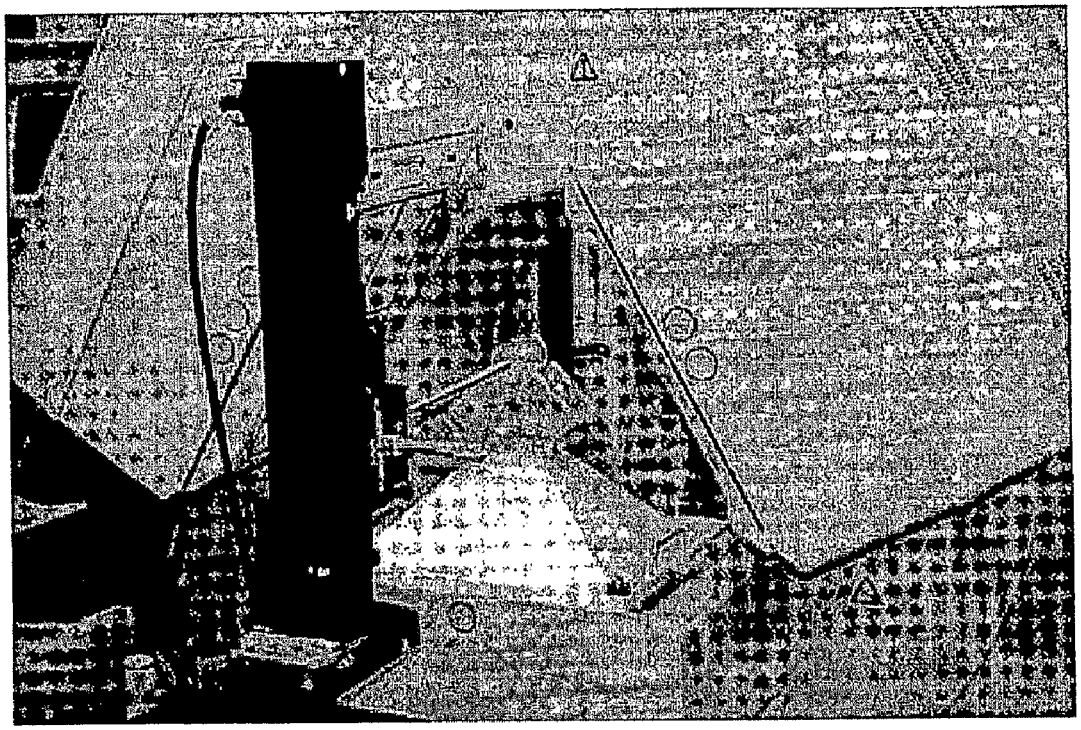
FIG. 51a shows a prototype collimator, in particular the collimator setup. A multi-pinhole collimator was used for shielding. The slit and slat assemblies were placed on this collimator. The stages positioned and rotated the phantom during the scan.
Figure 51B:
FIG. 51b shows a prototype collimator, in particular a close up of the collimator. A multi-pinhole collimator was used for shielding. The slit and slat assemblies were placed on this collimator. The stages positioned and rotated the phantom during the scan.
Figure 51C:
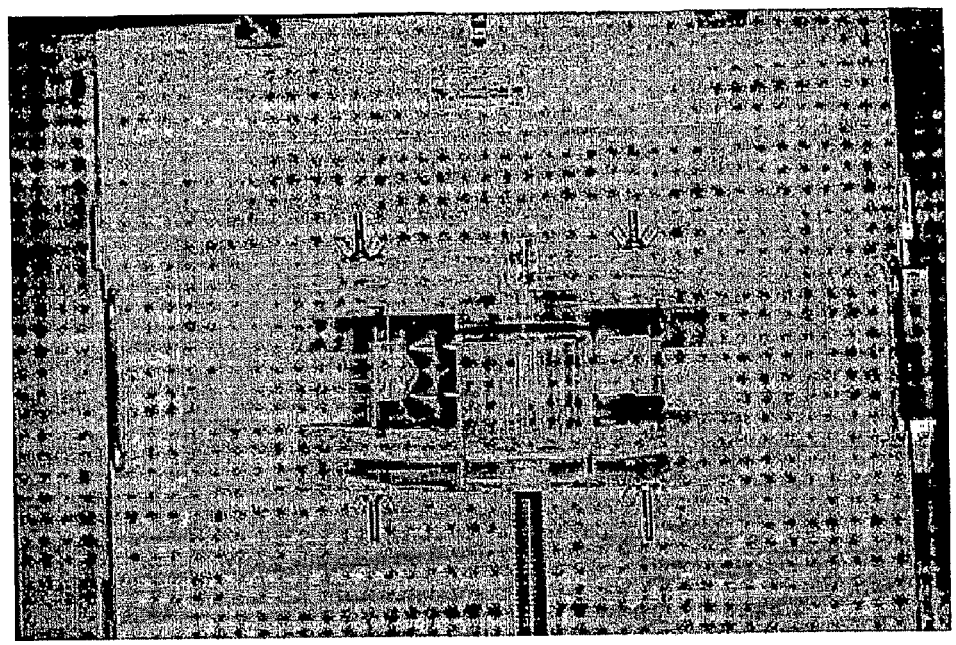
FIG. 51c shows a prototype collimator, in particular a top view with the phantom in place. A multi-pinhole collimator was used for shielding. The slit and slat assemblies were placed on this collimator.

A prototype slit-slat collimator was constructed in two pieces, the slit-assembly (FIGS. 5d and 5e) and the slat assembly (FIGS. 5a and 5b). These assemblies were placed on the lead shielding for a pre-existing multi-pinhole collimator with its aperture plate removed (FIGS. 51a, 51b, and 51c). The slit assembly was constructed from two tungsten plates held at a 90-degree acceptance angle. Two slit widths were used: 1.0 mm and 3.0 mm. The slat assembly consisted of 0.11 mm-thick tungsten strips interleaved with nylon. The height of the slats was 17 mm; the gap between slats was 1.27 mm. By placing the assemblies on the housing, a focal length (f) of 200 mm was achieved.

Phantom Acquisition

Phantom acquisitions were acquired using a micro hotrod, micro cold-rod, and a mini cold-rod phantom (Models ECT/HOT-MMP/I, ECT/DLX/MMP, ECT/DLX/MP, respectively, Data Spectrum Corp., Hillsborough, N.C.) filled with aqueous $^{99m}$Tc pertechnetate. These phantoms have six sectors of hot or cold rods. The diameters of the rods are 1.2, 1.6, 2.4, 3.2, 4.0, and 4.8 mm.

One set of experiments used a slit width of 3.0 mm. The phantom projections were acquired using 120 views (3 deg. step) with 30 s/view. The radius of rotation (ROR), measured from the slit plane to the axis of rotation, was 86 mm. The three phantoms were filled with 20 mCi, 18 mCi, and 27 mCi, respectively.

An additional experiment using only the micro hot-rod phantom was conducted. The phantom was filled with 1.8 mCi. Its projections were acquired using 240 views (1.5 deg. step) with 60 s/view. The ROR was 71 mm.

All scans were acquired using projections of 256×128 pixels (1.78 mm edge length). The energy window was centered on the $^{99m}$Tc peak and was ±10% of the central value.

Calibration

Figure 52:
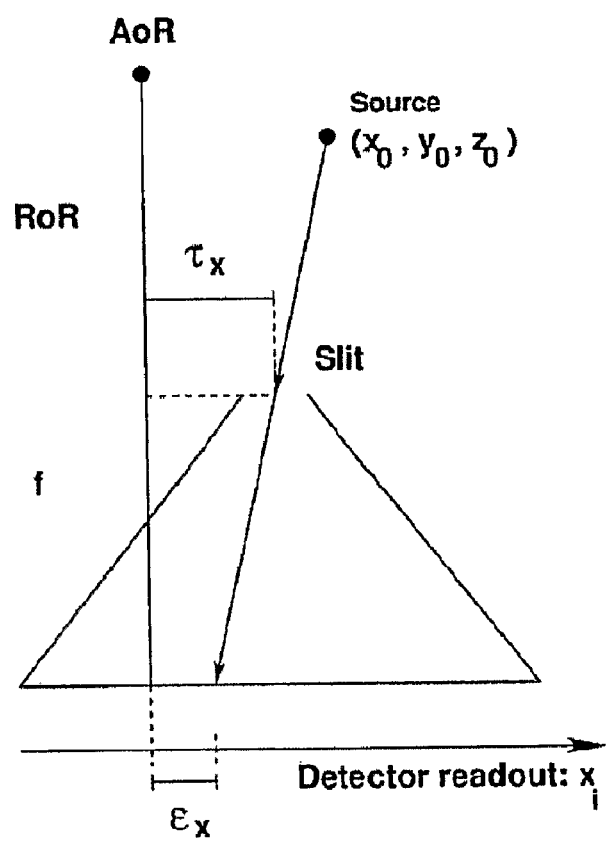
FIG. 52 shows calibration geometry.

The mechanical and electronic shifts of the system were determined using a $^{57}$Co point-source scan with the same setup as for the phantom acquisitions. The geometry is shown in FIG. 52. The mechanical shift of the system, $\tau_x$, is the distance from the center of the slit to the axis of rotation (AOR). This factor causes a magnification-dependent shift of the projection. The electronic shift, $\epsilon_x$, is the difference between the actual electronic readout of a particular physical position on the detector and the actual position. One potential source of electronic shift is the mis-positioning of the detector; the projection data may be corrected by a constant translation, unlike for mechanical shifts.

The point source was acquired using 120 views. The projections were compressed to centroids ($C_x$) and fit for to the equation:

$$C_x = \tau_x + \varepsilon_x + f\frac{\tau_x - x_0\cos\phi - y_0\sin\phi}{ROR + x_0\sin\phi - y_0\cos\phi} \quad (\text{EQ. 79})$$

where $\phi$ is the rotation angle of the source and ($x_0$, $y_0$) is the position of the point source. The output of the fit is $\tau_x$, $\epsilon_x$, and ($x_0$, $y_0$).

In the geometry of this particular experiment, the phantom and point-source were rotated instead of the detector. The rod mounting the sources (FIGS. 51a, 51b, and 51c) served as the AOR. Thus, translating the rod transaxially by an amount $\Delta x$ results in a change in $\tau_x$ by the same amount. On the other hand, $\epsilon_x$ decreases by $\Delta x$. This observation leads to a method of verification: translating the rod transaxially and re-acquiring the scan.

Reconstruction

The projection data were reconstructed using an maximum-likelihood estimation-maximization iterative algorithm that modeled the sensitivity and point-spread function based on EQ. 76 and EQ. 78. Each slice was treated independently; thus, axial resolution was not modeled. The reconstruction used 100×100×128 voxels, where the number of voxels in the axial dimension matches the number of axial pixels in the projection data. Fifty (50) iterations were performed.

Results

Calibration

Figure 53A:
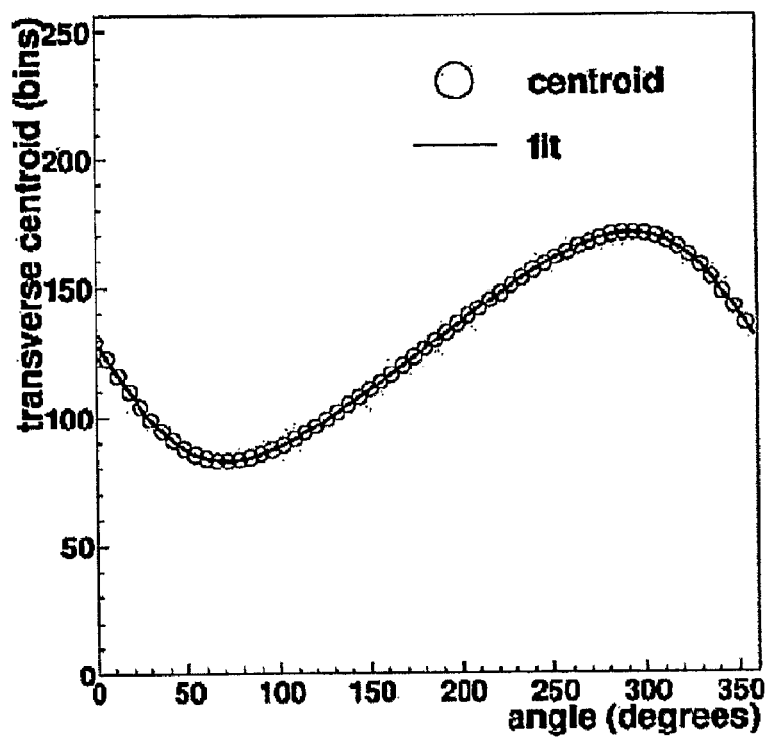
FIG. 53a shows a calibration scan. Fit (straight line) of EQ. 79 to the centroids of the point-source projections.
Figure 53B:
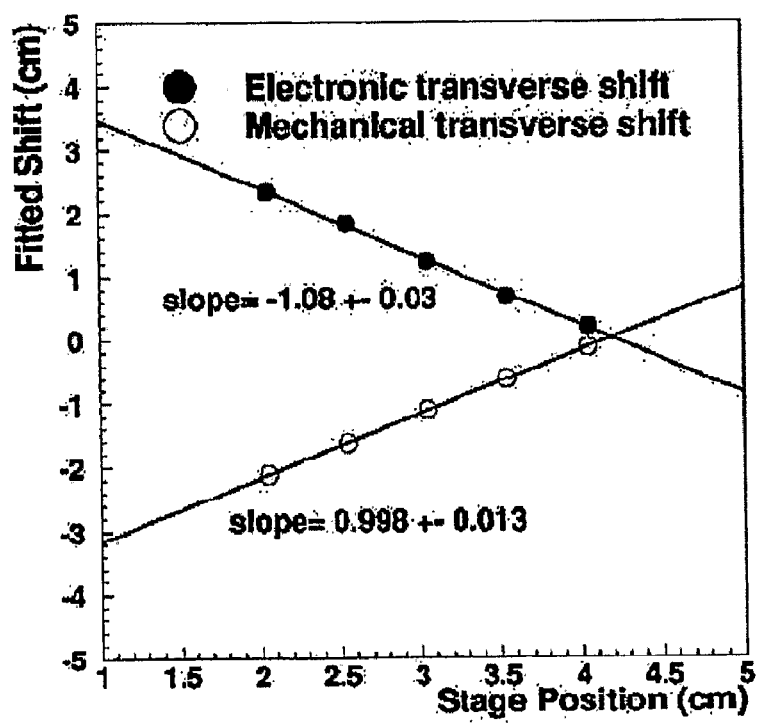
FIG. 53b shows a calibration scan. Mechanical and electronic shifts as a function of the induced transverse shift of the AOR (i.e. $\Delta x$).

FIG. 53a shows a sample fit of EQ. 79 to the point-source projection centroids. FIG. 53b shows the results from the calibration study of shifting the AOR by known amounts and re-scanning the point source.

Phantom Projections

Phantom projections for w=3.0 mm are shown in FIGS. 54a, 54b, and 54c. Phantom projections for w=1.0 mm are shown in FIG. 55a. Only one projection view per phantom and setup is shown.

Reconstructions

Reconstructions for w=3.0 mm are shown in FIGS. 54d, 54e, and 54f. Reconstructions for w=1.0 mm are shown in FIG. 55b.

Discussion

The sensitivity and resolution of slit-slat collimation have previously been validated. Those forms have been incorporated into a 2D iterative reconstruction through the use of EQ. 76, EQ. 77, and EQ. 78.

Figure 56A:
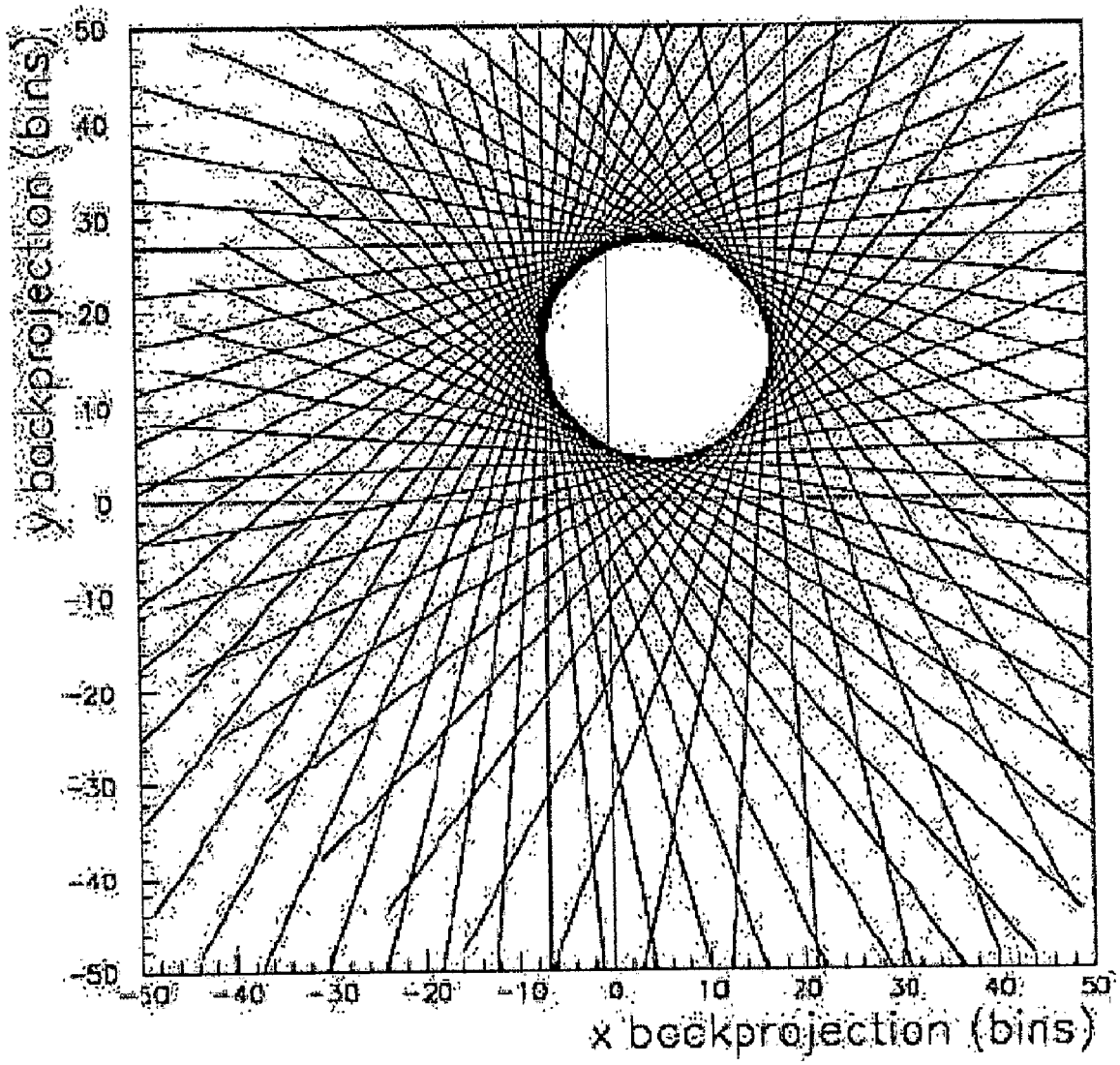
FIG. 56a shows a backprojection of point-source. Backprojection of centroids without compensating for mechanical and electronic shifts.
Figure 56B:
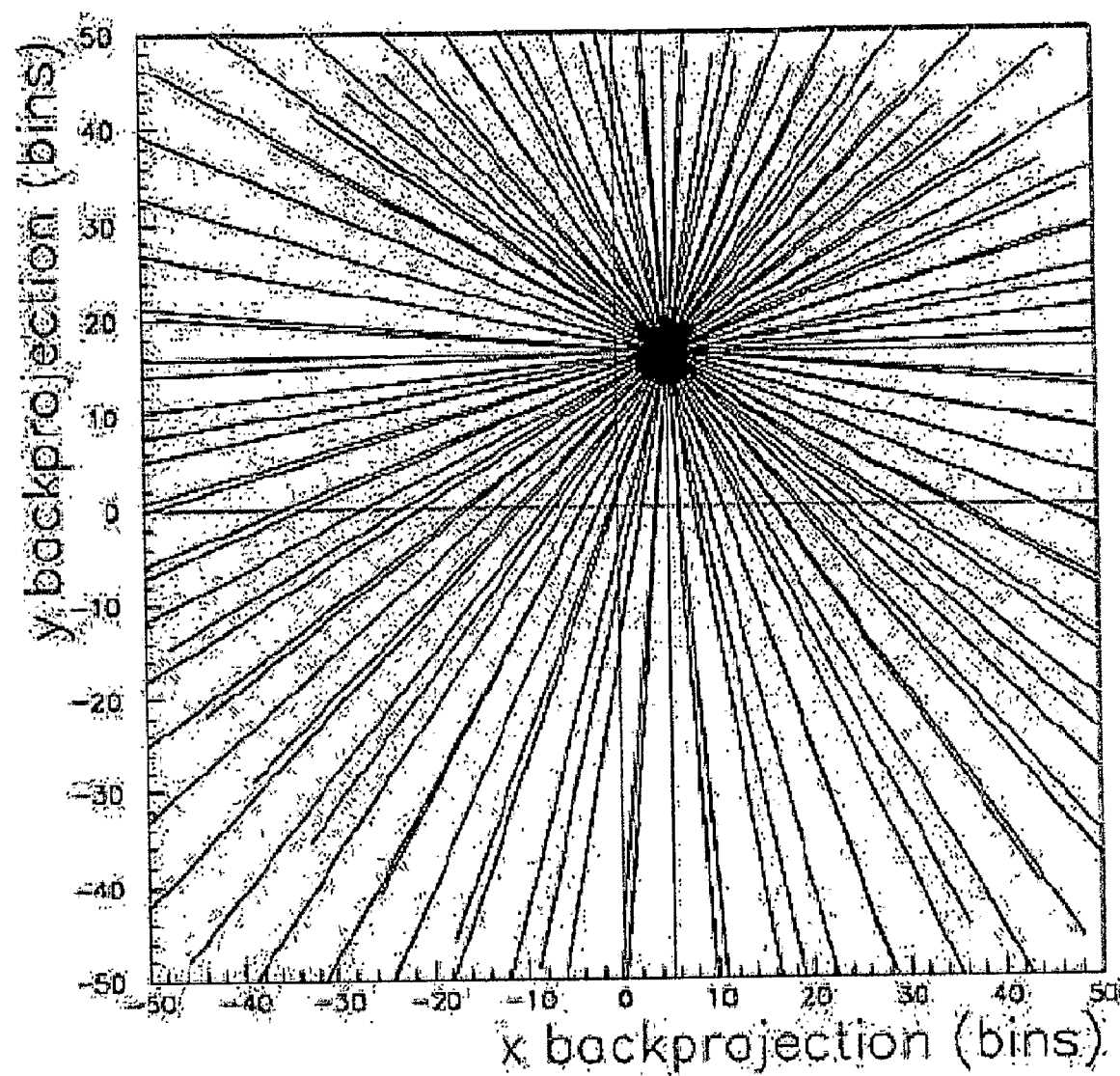
FIG. 56b shows a backprojection of point-source. Backprojection with compensation.

Determination and incorporation of calibration parameters are important for any reconstruction. The results of FIGS. 53a and 53b show that the calibration procedure, adapted from pinhole reconstruction, determines well the mechanical and electronic shifts. Future work should include this determination as a function of axial position since the slit runs along the AOR and there is the possibility that it is not exactly parallel to the AOR. FIGS. 56a and 56b show the potential impact calibration can have on reconstruction, using only a simple backprojection technique.

FIGS. 54a, 54b, 54c, and 55a show the projections and FIGS. 54d, 54e, 54f, and 55b the reconstructions. The projections themselves show better resolution for w=1 mm, as expected, although the count density is lower, which is also expected since decreasing w decreases the sensitivity and because the product of activity and view time was lower. The reconstructions show resolution consistent with expectations from EQ. 76. For FIGS. 54a-54f with w=3 mm, ROR=86 mm, and a detector intrinsic resolution of 3.5 mm, the expected resolution at the AOR is:

$$R_o(\text{tran}) = \left[3\frac{(86+200)^2}{200^2} + \frac{86^2}{200^2}3.5^2\right]^{\frac{1}{2}} = 3.7 \text{ mm} \quad \text{(EQ. 80)}$$

This is consistent with FIGS. 54a-54f, where the 3.2 mm rods are visible, but the 2.4 mm rods are not. For w=1 mm, the expected resolution is 1.8 mm. FIGS. 55a and 55b show that the 2.4 mm rods are visible and there are hints of the 1.6 mm rods. Further, one expects the resolution at the exterior of the phantom to be somewhat better than at the center. Thus, EQ. 76 makes a reasonable prediction of the reconstructed resolution.

Although the prototype collimator was not ideal for several reasons, it provided a sufficient apparatus to assess the potential for tomographic imaging with slit-slat collimation. The prototype was limited by the use of nylon as separators between the septa. This caused attenuation and scatter. Future collimators should attempt to mitigate this problem. An additional problem due to limitation in available materials was the short septa that were used. These short septa did not provide good axial resolution. Future versions of the collimator should use longer septa.

Slit-slat collimation provides a viable choice for tomographic imaging. Herein, the transaxial resolution formula has been found to well predict the transaxial resolution of reconstructions. Previous studies based on this predicted resolution have suggested that this collimator may be the best choice for mid-size (100-200 mm diameter) objects.

Example 11

Experimental Measurement of Axial and Transaxial Resolutions of a Slit-Slat Collimator and Comparison to Theoretical Expectations A slit-slat collimator may be well described as a hybrid of single-pinhole and parallel- or fan-beam collimation, combining pinhole's magnification in the transaxial direction with parallel- or fan-beam's complete-sampling properties and large field of view in the axial dimension. A conceptual drawing is shown in FIG. 50. The on-axis sensitivity g of a slit-slat collimator has been shown to equal the geometric mean of pinhole and parallel beam:

$$g = \frac{wd^2}{4\pi a h(d+t)} \quad \text{(EQ. 81)}$$

It is likely that slit-slat collimation can fill a clinical need for imaging medium-size objects, since its sensitivity improves with decreasing distance (unlike parallel beam and fan beam), but it does not drop as rapidly as single pinhole as distance increases. However, it is important to study the features of this collimator experimentally to determine the scenarios where slit-slat may be a superior collimator choice. Herein, the axial and transaxial resolution of a slit-slat collimator are investigated, and the results are compared with Monte Carlo simulation studies and analytic resolution formulas for pinhole and parallel-beam collimators.

Based on the collimator geometry one would expect that Anger's on-axis resolution formula for pinhole (PIN) collimation would apply in the direction collimated by the slit, i.e., transaxially:

$$R_o(PIN) = \sqrt{R_g^2(PIN) + \left(\frac{h}{f}R_i\right)^2} \quad \text{(EQ. 82)}$$

$$= \sqrt{\frac{w^2(h+f)^2}{f^2} + \left(\frac{h}{f}R_i\right)^2}$$

where $R_o$ is the overall system resolution, $R_g$ is the geometric (collimator) component, and $R_i$ is the intrinsic detector resolution. In addition, w is the diameter of the pinhole (edge length for a square hole), f is the distance from the slit to the detector surface, a is the septal height, and h is the distance of the point source to the plane of the slit. One could define a parameter c (not shown in FIG. 50) as the distance from the bottom of the slats to the detector surface, however c does not affect the sensitivity or resolution relationships.

In the axial dimension, one would expect that the parallel-beam (PB) resolution formula would apply:

$$R_o(PB) = \sqrt{R_g^2(PB) + R_i^2} = \sqrt{\frac{d^2(h+f)^2}{a^2} + R_i^2} \quad \text{(EQ. 83)}$$

where d is the gap between septa.

Experimental

A prototype slit-slat collimator was constructed with tungsten slats, separated by nylon spacers, forming the axial septa, and two tungsten plates forming the transaxial slit. The slats were 0.11 mm thick and 17 mm tall. The slit was formed from two tungsten plates at a 90° acceptance angle, separated by nylon spacers of either 2.03 or 4.06 mm (FIGS. 5d and 5e). Eight collimator configurations were assembled, featuring slit widths w of 2.03 and 4.06 mm, septal heights a of 17.0 and 34.0 mm, and gaps between septa d of 1.27 and 2.54 mm. 34-mm-tall septa were formed by aligning a second stack of slats on top of the first (FIGS. 5a and 5c). In all configurations the septal thickness t was 0.11 mm. The slit-slat assembly was placed on top of a large opening (39 mm×61 mm) of a pre-existing multiple pinhole mount. The axial septa were aligned perpendicular to the Axis of Rotation (AOR) of a gamma camera (Picker Prism 3000XP, Philips Medical Systems, Andover, Mass.), while the slit ran parallel to the AOR of the camera.

A point source ($^{57}$Co; 1.3 MBq (35 µCi)) in a "pen" marker was mounted on a vertical positioning stage. (FIGS. 6a and 6b). The height above the slit was determined by lowering the source until it came into contact with the support for the slats. The distance from the plane of the slit to the support was measured with calipers. The source was then centered axially over the hole in the shielding.

Source data were collected at distances of 10 to 205 mm above the aperture plane, in increments of 5 mm, for each of the collimator configurations. For the axial resolution data collection, to obtain a measurement independent of the particular relative shift between the point source and the slats, the septa were moved linearly by one period (d+t) during each projection view.

For each experimental configuration at each value of h, (distance above the aperture plane), the axial slices of a region of interest of the projection were summed to form a transverse profile and the transaxial slices of that region were summed to form an axial profile. These profiles were corrected by subtracting a background, whose level was estimated by averaging a scan without the point source present and a region of interest at each h that was far from the projection through the slit. The maximum of each adjusted profile was determined, and the full width at half maximum was then calculated by interpolating the location of the half maximums. The transverse resolutions were scaled to object space by dividing by the magnification f/h. Axial resolutions were not scaled since axial magnification is unity.

Monte Carlo

A series of Monte Carlo simulations was conducted to model the eight collimator configurations. Each run modeled $5 \times 10^8$ photons emitted isotropically from a point source at each position h; the values of h ranged from 10 to 205 mm in steps of 5 mm. One mode included the effects of slit penetration (linear attenuation coefficient of 4.95 mm$^{-1}$) and detector parallax (linear capture coefficient of 0.374 mm$^{-1}$) on the resolution, while another mode did not take into account these effects. Further, each configuration was run with and without modeling the hole at the top of the multiple-pinhole mount that was used as a support for the slit-slat assembly; this mount unintentionally truncated the axial field of view.

Results

The experimental and Monte Carlo results for transverse resolution are shown in FIG. 8. These resolutions have been scaled to object space by dividing the FWHM resolution on the detector by f/h. The statistical uncertainty was estimated through bootstrap resampling of the profiles. The Monte Carlo results show two cases. The case labeled "MC full" includes the effects of slit penetration and detector parallax on the resolution. The case labeled "MC simple" does not include these effects. The theoretical prediction EQ. 82 is also shown.

The experimental and Monte Carlo results for axial resolution are shown in FIG. 9. These resolutions are the same on the detector and object planes. The statistical uncertainty was estimated through bootstrap resampling of the profiles. The Monte Carlo results show two cases. The case labeled "MC w/trunc." is constrained to be within the shielding opening (i.e., it models truncation). The case labeled "MC no truncation" does not include this effect. The theoretical prediction EQ. 83 is also shown.

DISCUSSION

FIG. 8 shows that $R_o$(PIN) yields a reasonable prediction for both the experimental and Monte Carlo transverse resolution data. For small values of h, EQ. 82 and the "simple" MC tend to underestimate the experimental resolution because they do not include the effects of slit penetration and detector parallax, which have their greatest effects on resolution at small h; the "full" MC includes these effects and agrees well with the data even at small h. In addition, the "simple" MC slightly underestimates EQ. 82 at large h because adding the geometric and intrinsic resolutions in quadrature (as in EQ. 82) is not an accurate model for combining a rect and Gaussian function, and at large h these terms are comparable in magnitude.

FIG. 9 shows that $R_o$(PB) yields a prediction that is consistent with both the experimental and MC data. For the case of large d (d=2.54 mm) and small a (a=17 mm), axial truncation was expected from the system geometry, and, in the right plots of FIG. 9, there is indeed deviation from EQ. 83 when h is large. MC data not modeling truncation continue to agree with EQ. 83 whereas MC data modeling truncation follow the experimental data. Thus, for these experimental configurations, large values of h led to truncation that interfered with resolution measurements. Overall, the data suggest that EQ. 83 is a good model for axial resolution.

Figure 64:
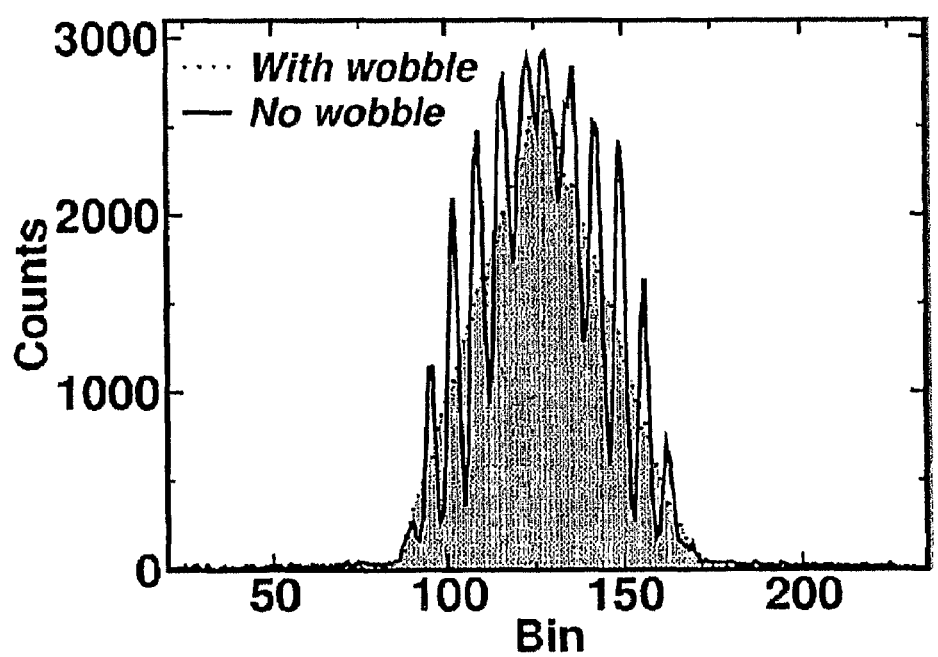
FIG. 64 shows axial profiles with and without wobbling the axial slats. The appearance of minima was due to the relatively short septa used and from the position of the septa near the slit rather than the detector. The wobbling was accomplished by moving the slats a distance of (d+t) during each projection view.

In the experimental data several local minima were seen in the axial profiles; a typical axial profile is shown in FIG. 64, labeled "No wobble." These minima resulted from the relatively short septa used and from the position of the septa near the slit rather than the detector. The appearance of the minima posed difficulties in measuring the axial resolutions with a FWHM metric. A dedicated experiment was performed to measure axial resolution by wobbling the axial slats. That is, the slats were moved axially by (d+t) during each projection view. Although this did not increase the FWHM, it did average out the septal shadowing, producing the expected triangular shape of the profiles. A profile from the wobbled data set is the shaded area shown in FIG. 64, labeled "With wobble."

Limitations in the experimental apparatus caused truncation for large values of h when the axial resolution was large (d=1.27 mm; a=17 mm). Materials used to set up the experimental apparatus were chosen because they were available. Indeed, the measured axial resolution is not indicative of the performance of a future system; the amount of tungsten available was limiting in the construction of slats in this prototype. Future versions of this collimator should have taller slats yielding improved axial resolution. In addition, future experiments should be conducted by either removing the nylon spacers or replacing them with a less attenuating material. In the current measurement, the use of nylon spacers was a convenient and readily available method for keeping the slats straight and evenly spaced.

The implications of the sensitivity and resolution behavior of slit-slat collimation suggest that this collimator may be less useful for small-organ and small-animal imaging than a pinhole collimator, because the sensitivity does not increase as rapidly for a small radius of rotation and the axial resolution does not improve as rapidly due to the lack of axial magnification. However, this collimator is likely to have a niche between pinhole and parallel-/fan-beam collimation because the sensitivity improves with decreasing distance, but does not drop as rapidly as pinhole as distance increases. Further, transaxial magnification aids transaxial resolution by mitigating the effect of intrinsic detector resolution. Lastly, since the collimator provides complete data with just a circular orbit, there are no artifactual axial blurring as in pinhole SPECT with a simple circular orbit.

Both the experimental and Monte Carlo data suggest that the transverse resolution of a slit-slat collimator is well described by Anger's on-axis formula for pinhole collimation, and the axial resolution is well described by the parallel-beam resolution relationships. Due to its sensitivity and resolution characteristics, slit-slat collimation is likely to be useful in intermediate scenarios such as imaging of limbs, the breast, medium-sized animals and the brain.

What is claimed is:
1. A slit-slat collimator, comprising:
a collimator frame having a frusto-pyramidal housing disposed thereon, said frusto-pyramidal housing having a rectangular base, a rectangular top and open sides defined by a trapezoidal shape, wherein said housing provides lead shielding;
a plurality of axial septa;
a plurality of spacers;
a means for alignably stacking said axial septa and said spacers; and
an adjustable aperture plate mounted on said rectangular top comprising at least one adjustable aperture members.

2. The collimator of claim 1, wherein said collimator frame is detachably attached to a detector head on a scanner.

3. The collimator of claim 1, wherein said adjustable aperture plate defines pinholes therein.

4. The collimator of claim 3, wherein said pinholes are aligned axially.

5. The collimator of claim 1, wherein said adjustable aperture plate defines an axial slit therein.

6. The collimator of claim 1, wherein said aperture plate defines apertures comprising a variety of geometric diameters, pitches, acceptance angles, hole shapes, or a combination thereof.

7. The collimator of claim 1, wherein said axial septa have a trapezoidal shape.

8. The collimator of claim 7, wherein said axial septa have holes disposed thereon along the sides of said trapezoid.

9. The collimator of claim 1, wherein said axial septa are less than 1 mm thick.

10. The collimator of claim 1, further comprising a plurality of Rohacall strips between said axial septa.

11. The collimator of claim 1, wherein said adjustable aperture members form at least one slit.

12. The collimator of claim 1, wherein said adjustable aperture members form an elevated central slit.

13. The collimator of claim 1, wherein said adjustable aperture members form an elevated side slit.

14. The collimator of claim 1, wherein said adjustable aperture members form a focused aperture slit.

15. The collimator of claim 1, wherein said axial septa form a focused slat assembly.

16. The collimator of claim 1, further comprising a plurality of slits disposed transaxially from said aperture plate and aligned along the sides of said collimator frame.

17. A slit-slat collimator, comprising:
a collimator frame having a frusto-pyramidal housing disposed thereon, said frusto-pyramidal housing having a rectangular base, a rectangular top and open sides defined by a trapezoidal shape, wherein said housing provides lead shielding;
an aperture forming unit selected from the group consisting of a pair of symmetric aperture forming members, an axial septum or both;
a means for alignably stacking said aperture forming unit; and
an adjustable aperture plate mounted on said rectangular top comprising at least one aperture forming unit.

18. The collimator of claim 17, wherein said collimator frame is detachably attached to a detector head on a scanner.

19. The collimator of claim 17, wherein said adjustable aperture plate defines pinholes therein.

20. The collimator of claim 19, wherein said pinholes are aligned axially.

21. The collimator of claim 17, wherein said adjustable aperture plate defines an axial slit therein.

22. The collimator of claim 17, wherein said aperture plate defines apertures comprising a variety of geometric diameters, pitches, acceptance angles, hole shapes, or a combination thereof.

23. The collimator of claim 17 wherein said axial septum has a trapezoidal shape.

24. The collimator of claim 23, wherein said axial septum has holes disposed thereon along the sides of said trapezoid.

25. The collimator of claim 17, wherein said axial septum is less than 1 mm thick.

26. The collimator of claim 17, wherein said aperture forming members have a pentagonal shape.

27. The collimator of claim 26, wherein said aperture forming members vary in thickness and pentagon angles, thereby varying the geometric diameter, pitch, acceptance angle, hole shape, or a combination thereof of the apertures of said aperture plate.

28. The collimator of claim 17, further comprising a plurality of slits disposed transaxially from said aperture plate and aligned along the sides of said collimator frame.

29. A method of collimating electromagnetic radiation, comprising the steps of:
selecting a particular electromagnetic radiation for collimation, said radiation output from a specimen of interest;
positioning a detector of said particular radiation in a location useful for gathering information about said specimen and associated with said particular radiation;
using a slit-slat collimator, comprising: a collimator frame having a frusto-pyramidal housing disposed thereon, said frusto-pyramidal housing having a rectangular base, a rectangular top and open sides defined by a trapezoidal shape, wherein said housing provides lead shielding; a plurality of axial septa; a plurality of spacers; a means for alignably stacking said axial septa and said spacers; and an adjustable aperture plate mounted on said rectangular top comprising at least one adjustable aperture members; and
adjusting said aperture plate to adjust collimation aperture.

30. The method of claim 29, wherein said collimator frame is detachably attached to a detector head on a scanner.

31. The method of claim 29, wherein said adjustable aperture plate defines pinholes therein.

32. The method of claim 31, wherein said pinholes are aligned axially.

33. The method of claim 29, wherein said adjustable aperture plate defines an axial slit therein.

34. The method of claim 29, wherein said aperture plate defines apertures comprising a variety of geometric diameters, pitches, acceptance angles, hole shapes, or a combination thereof.

35. The method of claim 29, wherein said axial septa have a trapezoidal shape.

36. The method of claim 35, wherein said axial septa have holes disposed thereon along the sides of said trapezoid.

37. The method of claim 29, wherein said axial septa are less than 1 mm thick.

38. The method of claim 29, further comprising a plurality of Rohacall strips between said axial septa.

39. The method of claim 29, wherein said adjustable aperture members form at least one slit.

40. The method of claim 29, wherein said adjustable aperture members form an elevated central slit.

41. The method of claim 29, wherein said adjustable aperture members form an elevated side slit.

42. The method of claim 29, wherein said adjustable aperture members form a focused aperture slit.

43. The method of claim 29, wherein said axial septa form a focused slat assembly.

44. The method of claim 29, further comprising a plurality of slits disposed transaxially from said aperture plate and aligned along the sides of said collimator frame.

45. An imaging system, comprising:
   an electromagnetic radiation point source;
   a detector panel having an array of detector elements disposed thereon; and
   a slit-slat collimator, comprising: a collimator frame having a frusto-pyramidal housing disposed thereon, said frusto-pyramidal housing having a rectangular base, a rectangular top and open sides defined by a trapezoidal shape, wherein said housing provides lead shielding; a plurality of axial septa; a plurality of spacers; a means for alignably stacking said axial septa and said spacers; and an adjustable aperture plate mounted on said rectangular top comprising at least one adjustable aperture members.

46. The method of claim 45, wherein said collimator frame is detachably attached to a detector head on a scanner.

47. The method of claim 45, wherein said adjustable aperture plate defines pinholes therein.

48. The method of claim 47, wherein said pinholes are aligned axially.

49. The method of claim 45, wherein said adjustable aperture plate defines an axial slit therein.

50. The method of claim 45, wherein said aperture plate defines apertures comprising a variety of geometric diameters, pitches, acceptance angles, hole shapes, or a combination thereof.

51. The method of claim 45, wherein said axial septa have a trapezoidal shape.

52. The method of claim 51, wherein said axial septa have holes disposed thereon along the sides of said trapezoid.

53. The method of claim 45, wherein said axial septa are less than 1 mm thick.

54. The method of claim 45, further comprising a plurality of Rohacall strips between said axial septa.

55. The method of claim 45, wherein said adjustable aperture members form at least one slit.

56. The method of claim 45, wherein said adjustable aperture members form an elevated central slit.

57. The method of claim 45, wherein said adjustable aperture members form an elevated side slit.

58. The method of claim 45, wherein said adjustable aperture members form a focused aperture slit.

59. The method of claim 45, wherein said axial septa form a focused slat assembly.

60. The method of claim 45, further comprising a plurality of slits disposed transaxially from said aperture plate and aligned along the sides of said collimator frame.

* * * * *